(12) United States Patent
Ishihara et al.

(10) Patent No.: US 6,522,379 B1
(45) Date of Patent: Feb. 18, 2003

(54) LIQUID CRYSTAL DISPLAY ELEMENT WITH ZIGZAG DATA OR SCAN LINES ADJACENT ZIGZAG EDGED PIXEL ELECTRODES

(75) Inventors: Shoichi Ishihara, Osaka (JP); Yoshinori Tanaka, Osaka (JP); Kenji Nakao, Osaka (JP); Katsuji Hattori, Hyogo (JP); Tsuyoshi Uemura, Osaka (JP); Junichi Kobayashi, Ishikawa (JP); Keisuke Tsuda, Ishikawa (JP); Hirofumi Wakemoto, Ishikawa (JP); Yoneharu Takubo, Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 284 days.

(21) Appl. No.: 09/678,775

(22) Filed: Oct. 4, 2000

(30) Foreign Application Priority Data

Oct. 5, 1999 (JP) ............................... 11-284363
Jul. 7, 2000 (JP) ........................................ 2000-206466
Sep. 20, 2000 (JP) ........................................ 2000-284722
Sep. 28, 2000 (JP) ........................................ 2000-295756

(51) Int. Cl.$^7$ .............................................. G02F 1/1343
(52) U.S. Cl. ........................................ 349/139; 349/146
(58) Field of Search ................................ 349/139, 146; 345/95, 96

(56) References Cited

FOREIGN PATENT DOCUMENTS

JP        11-7018       1/1999

*Primary Examiner*—Toan Ton
*Assistant Examiner*—Timothy Rude
(74) *Attorney, Agent, or Firm*—McDermott, Will & Emery

(57) ABSTRACT

In a liquid crystal display element comprising at least one substrate and a liquid crystal layer, a different orientation direction area of an orientation direction locally different from an orientation direction of the other area is present.

4 Claims, 61 Drawing Sheets

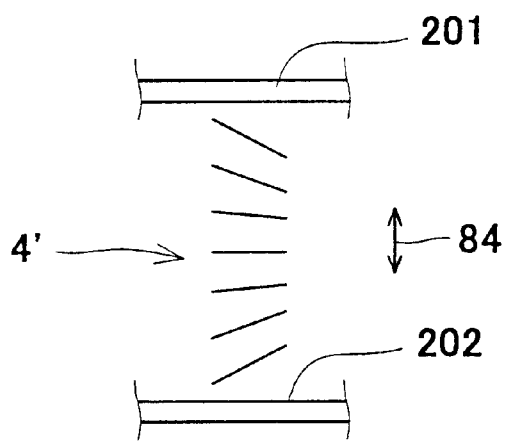 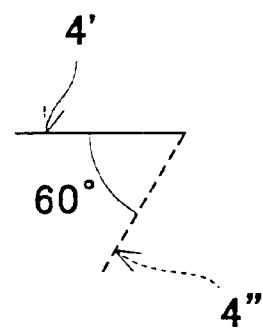
FIG. 24a  FIG. 24b
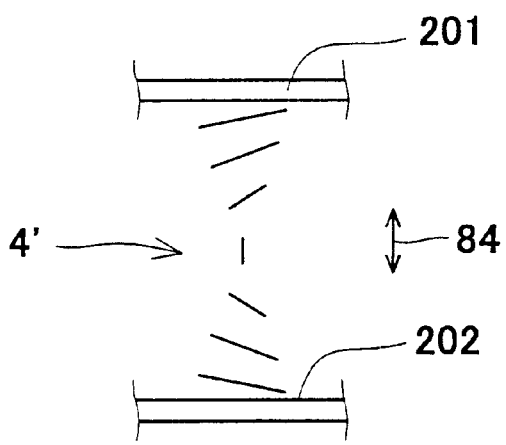 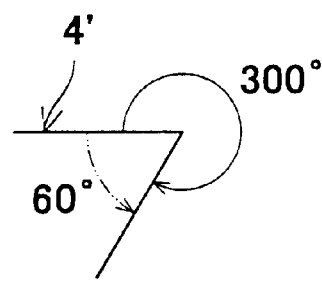
FIG. 24c  FIG. 24d

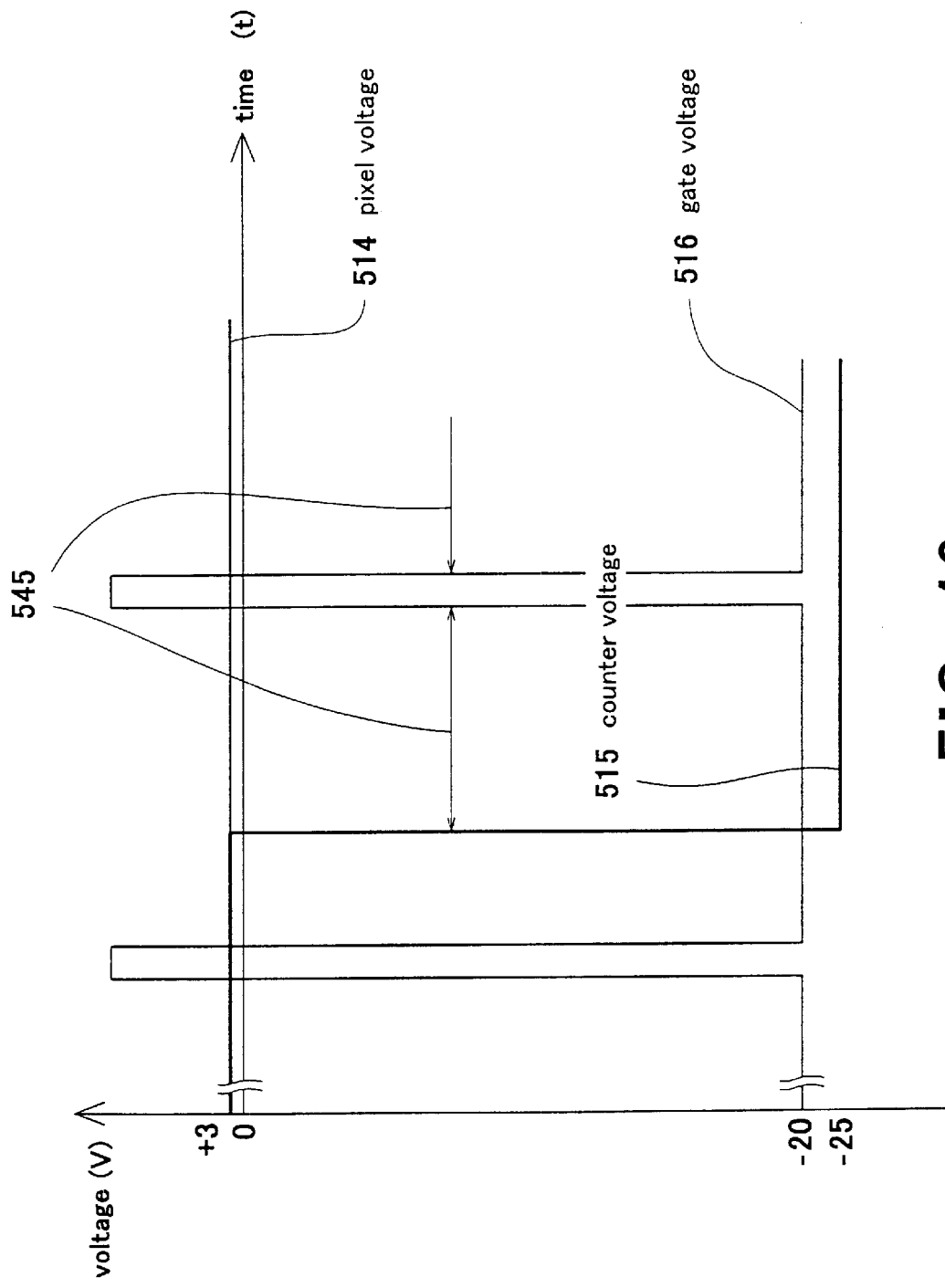

202

202

LIQUID CRYSTAL DISPLAY ELEMENT WITH ZIGZAG DATA OR SCAN LINES ADJACENT ZIGZAG EDGED PIXEL ELECTRODES

FIELD OF THE INVENTION

The present invention relates to a liquid crystal display element, a substrate for the liquid crystal display element, a liquid crystal display, a method for fabricating the liquid crystal display element, and a method for driving the liquid crystal display element, which have a display capability of a high-speed response and a wide viewing angle. More particularly, the present invention relates to a liquid crystal display element, a substrate for the liquid crystal display element, a liquid crystal display, a method for fabricating the liquid crystal display element, and a method for driving the liquid crystal display element, which are of an optically self-compensated birefringence mode cell type and facilitate spray to bend transition.

BACKGROUND OF THE INVENTION

With advance of multimedia technologies, image information has greatly occupied a position in multimedia. In recent years, a liquid crystal display with high contrast and a wide viewing angle has been developed and put to practical use, with development of liquid crystal technologies. Now, the liquid crystal display is equal to a CRT (Cathode Ray Tube) display in performance.

However, in the current liquid crystal display, an image is blurred due to image retention because of a low response speed in display of a moving image. In this respect, the current liquid crystal display is inferior to the CRT display.

In the past, many attempts have been made to provide a high-speed responsive liquid crystal display. While various liquid crystal display systems of the high-speed response are arranged by Wu et al. (C. S. Wu and S. T. Wu, SPIE, 1665, 250 (1992)), a system and method that realizes a response characteristic required for display of a moving image is limited.

Specifically, in the current NTSC (National Television Standard Committee) system, it is required that a liquid crystal follow a video signal in one frame (16.7 msec). While the current liquid crystal display has satisfactorily high-speed responsiveness between white and black values, it has responsiveness as slow as not less than 100 msec in a response between gray scales in multiple gray scale display. In particular, the response between gray scales in an area where a driving voltage is low is noticeably slow.

Currently, as potential liquid crystal displays having high-speed responsiveness suitable for display of the moving image, there are an OCB (Optically Compensated Birefringence) mode liquid crystal display element, a ferroelectric liquid crystal display element, and an antiferroelectric liquid crystal display element.

In actuality, however, the ferroelectric liquid crystal display element and the antiferroelectric liquid crystal display element having a layer structure have many problems associated with their practical use: low shock resistance, a limited range of available temperatures, high temperature dependency of property, and so forth. Hence, the OCB mode liquid crystal display element using a nematic liquid crystal is considered to be promising as the liquid crystal display element suitable for display of the moving image.

The OCB mode liquid crystal display element is a display system, the responsiveness of which was demonstrated by J. P. Bos in 1983. Thereafter, it was demonstrated that combination of the OCB mode liquid crystal display element and a film retardation film brought about a display with a wider viewing angle and a high-speed responsiveness, and the OCB mode liquid crystal display element has been studied and developed actively.

Referring to FIG. 14, the OCB mode liquid crystal display element comprises a glass substrate 1 on which a transparent electrode 2 is formed, a glass substrate 8 on which a transparent electrode 7 is formed, and a liquid crystal layer 4 disposed between the substrates 1 and 8. Alignment layers 3, 6 are formed on the electrodes 2 and 7, respectively, and have been subjected to alignment treatment to orient liquid crystal molecules in parallel with one another and in the same direction. Polarizers 13 and 16 are provided in cross nicol on the outsides of the substrates 1 and 8, respectively. A retardation film 17 is interposed between the polarizer 13 and the substrate 1 and a retardation film 18 is interposed between the polarizer 16 and the substrate 8.

A liquid crystal cell so structured is characterized in that bend orientation or bend orientation including twist orientation is induced in a central portion of the cell by application of a voltage and the retardation films 17 and 18 are provided for driving a low voltage and enlarging a viewing angle. The cell has a capability of a high-speed response in a medium gray scale display area and a wide viewing angle characteristic.

In a normal state, the OCB mode liquid crystal display element is operated at a voltage at which a liquid crystal in a liquid crystal panel maintain the bend orientation. Below a given voltage, since the spray orientation state is more stable than the bend orientation state, transition to the spray orientation takes place. This transition is irreversible. A pixel with the spray orientation is thereafter left on the liquid crystal display element as a display defect (luminescent spot), which impedes its normal display operation.

In the OCB mode, an initialization process for transitioning from an initial spray orientation state 4a to a bend orientation state 4b by application of a voltage is essential.

However, the application of the voltage at approximately several volts requires some minutes for the initialization process, which is one of the problems with the OCB mode. Accordingly, there is a need for a liquid crystal display element with a high transition speed in which the bend orientation is easily formed by applying a voltage at several volts.

Japanese Patent Application Publication No. 11-7018 discloses techniques for high-speed transition from the spray orientation to the bend orientation (hereinafter referred to as "spray to bend transition") in the OCB liquid crystal display mode. The techniques are a technique for adding a chiral agent to a liquid crystal, a technique for uniformly forming twist over the entire surface of a liquid crystal panel at an angle of 180 degrees, and a technique for uniformly forming twist over the entire surface of the liquid crystal panel at an angle of 10 degrees. However, these techniques are not useful in achieving the high-speed spray to bend transition. When the spray to bend transition unreliably takes place and thereby an area of the spray orientation is locally left, the area becomes a luminescent spot, which looks like a spot defect.

SUMMARY OF THE INVENTION

The present invention is directed to solving aforesaid problems and an object of the present invention is to provide a liquid crystal display element, a substrate for the liquid crystal display element, a liquid crystal display, a method for fabricating the liquid crystal display element, and a method for driving the liquid crystal display element, which are capable of high-speed and reliable transition of spray orientation to bend orientation.

To solve the aforesaid problem, the inventors observed the behavior of the spray to bend transition. The observation result is that a nucleus of the bend orientation is generated from a specific portion and is grown. After intensive study, the inventors discovered that a twist orientation locally formed becomes a nucleus, from which bend transition occurs.

A first aspect of the present invention is based on this knowledge. According to a first aspect of the present invention, there is provided a liquid crystal display element comprising at least one substrate and a liquid crystal layer, wherein a different orientation direction area of an orientation direction locally different from an orientation direction of the other area is present on the liquid crystal layer. More specifically, the liquid crystal display element comprises a pair of substrates and a liquid crystal layer, wherein the pair of substrates have been subjected to substantially parallel alignment treatment and a different orientation direction area of an orientation direction locally different from an orientation direction of the other area is present on the liquid crystal layer.

With such a configuration, since the nucleus of the bend orientation is generated from the different orientation direction area by utilizing a nematic liquid crystal and is grown, causing the spray to bend transition to occur, high-speed and reliable spray to bend transition becomes possible. The substrate as defined herein refers to a plate-shaped member having an inner surface contact with a liquid crystal layer in a constructed liquid crystal display element, including an upper substrate, a lower substrate, a color filter substrate, a TFT substrate, and the like.

The different orientation direction area may be stationary or nonstationary. The nonstationary different orientation direction area includes an area having a transient orientation state or an orientation state formed by the lateral electric field.

The stationary different orientation direction area is formed by an orientation capability of the member contact with the liquid crystal with respect to the liquid crystal molecules. The orientation capability is realized by alignment treatment performed on the member contact with the liquid crystal and the orientation capability of the member with respect to the liquid crystal molecules.

As the alignment treatment performed on the member contact with the liquid crystal, rubbing, a photo-alignment treatment, formation of grooves on the surface of the member, and formation of a scratch on the surface of the substrate can be employed.

As the orientation capability of the member contact with the liquid crystal with respect to the liquid crystal molecules, water-repellency and hydrophilicity of a material of which the member is made, and a shape of the member may be employed.

The rubbing treatment is performed in a variety of manners A second aspect of the present invention is preferred manners of the rubbing treatment. In the liquid crystal display element according to the second aspect of the present invention, at least one substrate has been subjected to alignment treatment such that a different orientation direction area of an orientation direction locally different from an orientation direction of the other area is present in the liquid crystal layer and the alignment treatment is a rubbing treatment.

To form the different orientation direction area by rubbing, the steric obstacle is formed on the inner surface of the substrate and rubbing is performed on the substrate having the steric obstacle. Thereby, rubbing is controlled by the steric obstacle to thereby form the area subjected to alignment treatment differently from the other area around the steric obstacle on the inner surface of the substrate. The portion of the liquid crystal situated on the area becomes the different orientation direction area.

The steric obstacle has a shape to control rubbing, including a column-shaped body, a cone-shaped body, or a convex body.

The steric obstacle may be a complex body constituted by a plurality of steric obstacles formed as being contact with each other. With such a configuration, a portion where the different orientation direction areas are contact with each other is generated and functions as a nucleus of transition. Consequently, higher-speed and more reliable spray to bend transition is achieved.

The steric obstacle serves as the column spacer. With such a structure, the column spacers can be saved.

Next, the inventors found the following knowledge. When the applied voltage is set to zero volt momently after transition of the liquid crystal to the bend orientation, the liquid crystal is transformed into twist orientation of 180 degrees. When the voltage is applied again while the twist orientation of 180 degrees remains, the liquid crystal transitions to the bend orientation in a very short time and at an extremely low voltage.

A third aspect of the present invention is based on the above knowledge. According to the third aspect of the present invention, there is provided a liquid crystal display element comprising a liquid crystal that is in a first orientation state under a no-voltage condition and in a second orientation state under a display voltage and has an energy barrier between the first and second orientation states and voltage application means for applying a voltage to the liquid crystal, wherein the liquid crystal partially includes an area in a third orientation state in which an energy barrier existing between the second and third orientation states is smaller than an energy barrier existing between the first and second orientation states under the no-voltage condition. With such a configuration, since the area in the third orientation state becomes transition nucleus, it is possible to transition the liquid crystal to the second orientation state more quickly, at a lower voltage, and more reliably.

The third orientation state may be a stationary state under the no-voltage condition. This includes the orientation state of the stationary different orientation direction area described in the first aspect.

The aim of the third aspect of the present invention is that the third orientation state is a non-stationary state, i.e., the transient state of transition between the first and second orientation states.

When the transient state is the transient state from the second orientation state to the first orientation state, it is possible to transition the liquid crystal to the second orientation state by far more quickly, at a much lower voltage, and more reliably.

When the transient state is preserved by the incomplete surrounding body, it is possible to appropriately preserve the transient state.

The third orientation state may be at least a portion of the second orientation state preserved under the no-voltage condition. With such a configuration, it is possible to transition the liquid crystal to the second orientation state by far more quickly, at a much lower voltage, and more reliably.

When at least a portion of the second orientation state is preserved by liquid crystal molecule orientation capability of the steric object existing in the liquid crystal or the net structure existing in the liquid crystal, it is possible to appropriately preserve at least a portion of the second orientation state.

A fourth aspect of the present invention is to form the different orientation direction area by a lateral electric field. That is, the fourth aspect is aimed at forming the nonstationary different orientation direction area. According to the fourth aspect of the present invention, there is provided a liquid crystal display element comprising a liquid crystal layer disposed between a pair of opposite substrates wherein a source line, a gate line, and a pixel electrode are formed on one of the substrates and a counter electrode is formed on the other substrate, wherein adjacent edge portions of the pixel electrode and one of the source and gate lines are engaged with each other as having a predetermined gap seen in a plan view. With such a configuration, the lateral electric field is generated in the engaged portion by application of a predetermined voltage to form the different orientation direction area in the liquid crystal layer, thereby facilitating the transition.

The portions engaged with each other may be zigzag-shaped. With such a configuration, two twist-oriented areas in opposite directions and contact with each other are formed in the liquid crystal layer by the lateral electric field formed in the zigzag-shaped portion, thereby enabling quick and reliable bend transition.

The potions engaged with each other may be convex. With such a configuration, by suitably selecting the rubbing direction, the twist-oriented area having a larger twist angle is formed in the liquid crystal layer by the lateral electric field formed in the convex portion, thereby enabling the high-speed and reliable bend transition.

In this case, it is preferable that the lateral electric field formed in the convex portion has an intersection angle of 45 to 135 degrees with respect to a direction of a parallel alignment treatment performed on the pair of substrates.

This object, as well as other objects, features and advantages of the invention will become more apparent to those skilled in the art from the following description taken with reference to the accompanying drawings.

BRIEF DESCRIPTION OF THE DRAWINGS

FIGS. 24(a)–24(d) are views schematically showing behavior of liquid crystal molecules adjacent to twist-oriented liquid crystal molecules, wherein FIG. 24(a) is a cross-sectional view showing a state in which a voltage is not applied, FIG. 24(b) is a plan view showing a state in which a voltage is not applied, FIG. 24(c) is a cross-sectional view showing a state in which a predetermined voltage is applied, and FIG. 24(d) is a plan view showing a state in which a voltage is applied;

FIGS. 34(a) and 34(b) are conceptual views showing a stability condition of a liquid crystal of a liquid crystal display element, wherein FIG. 34(a) is a view showing a basic stability condition of the liquid crystal and FIG. 34(b) is a view showing a stability condition of the liquid crystal in parallel orientation and in twist orientation;

FIGS. 35(a)–35(c) are conceptual views schematically showing a process for spray to bend transition of a liquid crystal display element in which twist-oriented areas are locally formed, wherein FIG. 35(a) is a view showing a case where two twist-oriented areas in opposite directions are contact with each other, FIG. 35(b) is a view showing a case where a twist angle of one of two twist-oriented areas is 90 degrees, FIG. 35(c) is a view showing a case where a twist angle of one of two twist-oriented areas is 90 degrees or larger, and FIG. 35(d)) is a view showing a case where two twist-oriented areas in the same direction are contact with each other;

FIGS. 36(a) and 36(b) are plan views schematically showing an alignment treatment of one substrate of a liquid crystal display element according to an eighth embodiment of the present invention, wherein FIG. 36(a) is a view showing a state after first rubbing and FIG. 36(b) is a view showing a state after second rubbing;

FIG. 43 is a graph showing a waveform of a driving voltage applied to the liquid crystal display element of FIG. 42;

FIGS. 54(a) and 54(b) are views showing transition from spray to bend orientation of a liquid crystal, wherein FIG. 54(a) is a cross-sectional view of a liquid crystal display element showing spray orientation and FIG. 54(b) is a cross-sectional view of a liquid crystal display element showing bend orientation;

FIGS. 59(a)–59(c) are views showing a structure of a lower substrate of a liquid crystal display element according to a tenth example of the twentieth embodiment of the present invention, wherein FIG. 59(a) is a plan view showing a configuration in which bead spacers are gathered in an annular configuration partially opened, FIG. 59(b) is a plan view showing a configuration in which bead spacers are arranged in a substantially annular configuration having a clearance between adjacent two spacers, and FIG. 59(c) is a plan view showing a configuration in which bead spacers are gathered in a closed annular configuration;

FIG. 60(a) is a perspective view showing a configuration in which the incomplete surrounding body having a through hole as a lack portion is provided, FIG. 60(b) is a perspective view showing a configuration in which the incomplete surrounding body having a notch portion opened upward as the lack portion is provided, and FIG. 60(c) is a perspective view showing a configuration in which the incomplete surrounding body having a notch portion opened downward as the lack portion is provided.

FIGS. 72(a) and 72(b) are conceptual views schematically showing orientation of a liquid crystal of a lower substrate of a liquid crystal display element according to a twenty-fifth example of the present embodiment, wherein FIG. 72(a) is a plan view and FIG. 72(b) is a cross-sectional view in the direction of arrow XXXXXXXIIb—XXXXXXXIIb of FIG. 72(a).

DETAILED DESCRIPTION OF THE PREFERRED EMBODIMENTS

Now, preferred embodiments of the present invention will be described with reference to accompanying drawings.
Embodiment 1

A first embodiment of the present invention illustrates a parallel orientation liquid crystal display element having an area (hereinafter referred to as "different direction orientated area") in which an orientation direction thereof is different from orientation directions of the other areas, or a twist-orientated area.
[Test Cell]

In first to third examples described below, a liquid crystal display element is fabricated as a test cell, and spray to bend transition time of the fabricated test cell is evaluated. Retardation films are unnecessary for evaluation of the spray to bend transition time and are therefore omitted in the first to third examples.

EXAMPLE 1

Figure 1:
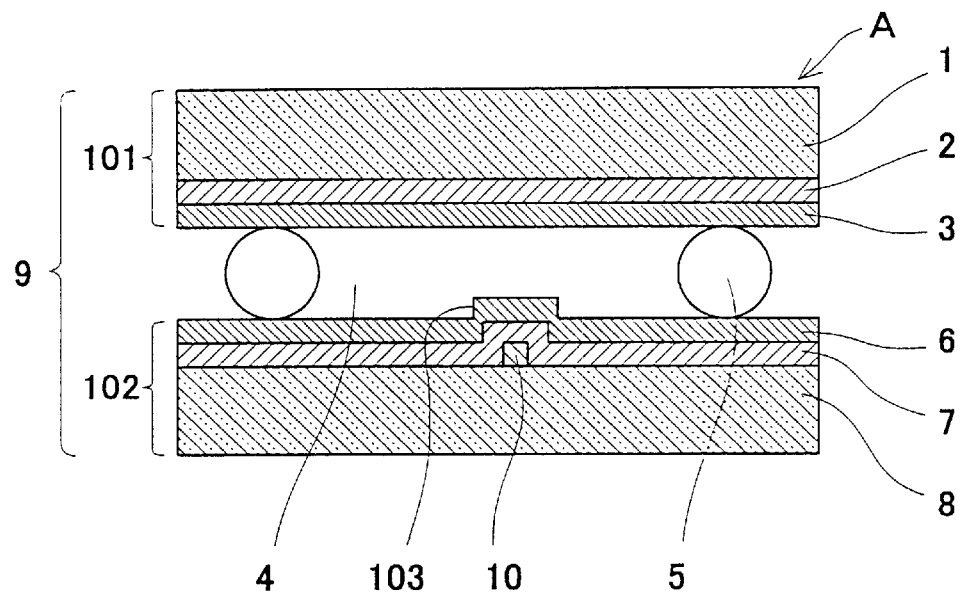
FIG. 1 is a cross-sectional view schematically showing a structure of a test cell according to a first example of a first embodiment of the present invention.
Figure 5:
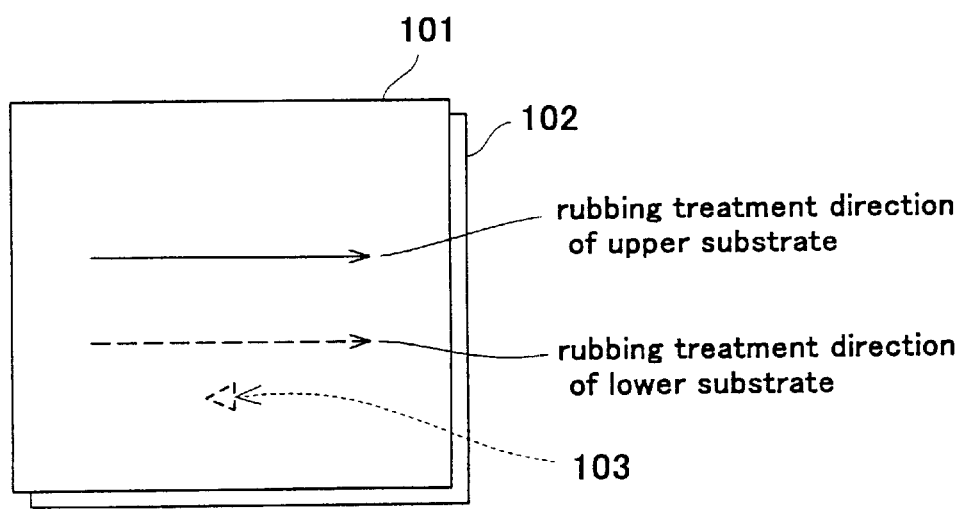
FIG. 5 is a view showing a rubbing direction of a substrate of FIG. 1.
Figure 15:
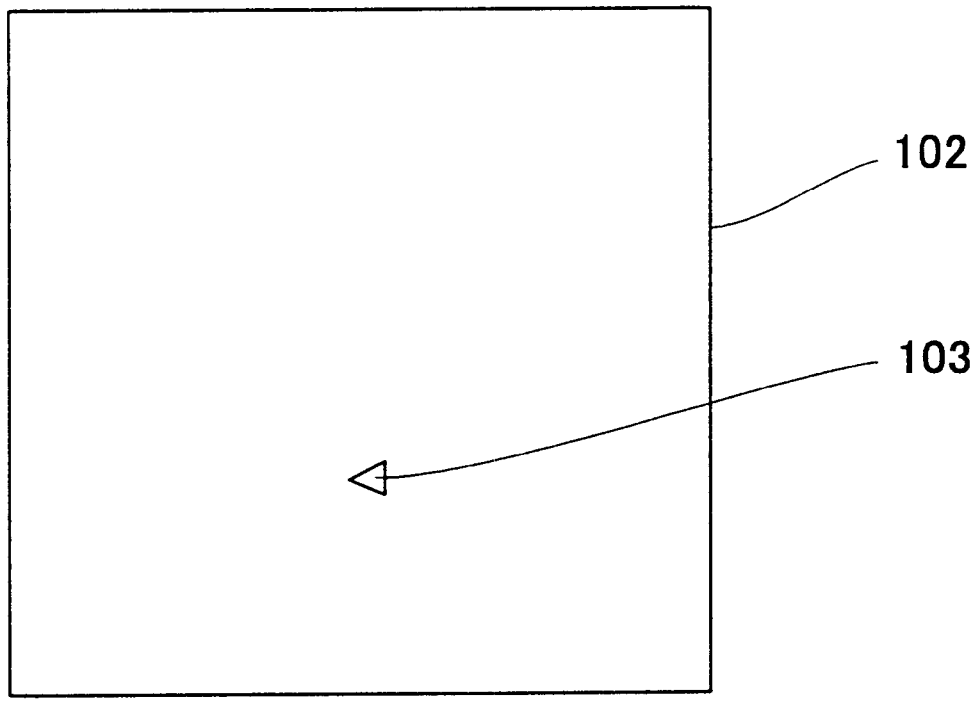
FIG. 15 is a plan view showing placement of a protrusion of a lower substrate of the test cell of FIG. 1.

FIG. 1 is a cross-sectional view schematically showing a structure of a test cell according to a first example of the present embodiment. FIG. 5 is a plan view schematically showing placement of a protrusion of a lower substrate of the test cell of FIG. 1. FIG. 15 is a view showing a rubbing direction of the substrate of FIG. 1.

Referring now to FIGS. 1 and 15, there is shown a test cell A in which a pair of substrates, i.e., an upper substrate 101 and a lower substrate 102 are disposed opposite to each other through bead-shaped spacers 5 and a liquid crystal layer 4 comprising a nematic liquid crystal is disposed in a space between the upper and lower substrates 101 and 102.

The upper substrate 101 is structured such that a transparent electrode 2 and an alignment layer 3 are laminated on a lower surface of the glass substrate 1 in this order. The lower substrate 102 is structured such that a triangular prism shaped protrusion 10 is formed on an upper surface of a glass substrate 8, and a transparent electrode 7 and an alignment layer 6 are laminated on an upper surface of the glass substrate 8 having the protrusion 10 in this order. Therefore, a protrusion (steric obstacle) 103 is formed on the upper surface of the lower substrate 102.

Referring to FIG. 5, the protrusion 103 is formed to direct a vertex of its triangular cross section toward a rubbing direction. Thereby, a twist-orientated area is formed around the protrusion 103 as will be described in the second embodiment in greater detail.

In actuality, a number of spacers 5 are interposed between the substrates 102 and 103 at irregular intervals, although two spacers 5 are illustrated in FIG. 1.

Figure 3:
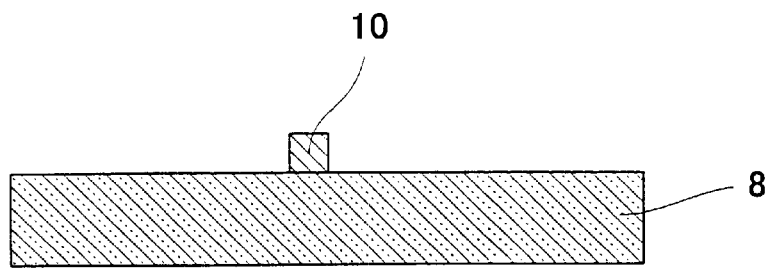
FIG. 3 is a cross-sectional view showing a process for fabricating the test cell of FIG. 1.
Figure 4:
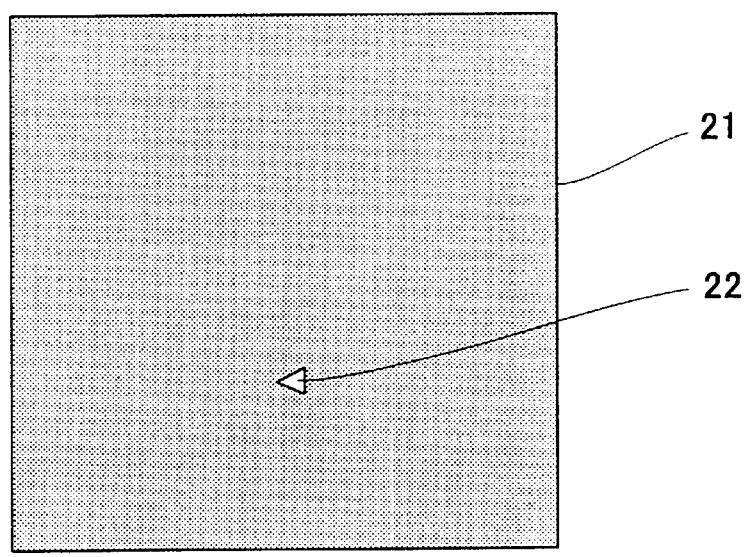
FIG. 4 is a plan view showing a photomask.

A method for fabricating so structured test cell will be explained with reference to FIGS. 2 through 4. FIGS. 2 and 3 are cross-sectional views each showing a process for fabricating the test cell of FIG. 1 and FIG. 4 is a plan view showing a photomask.

Figure 2A:
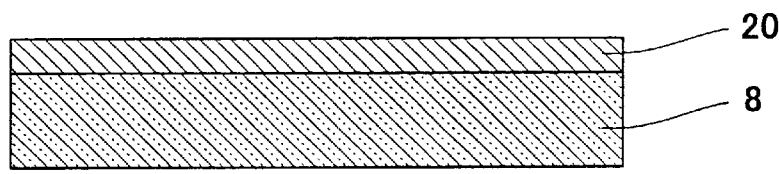
FIG. 2 is a cross-sectional view showing a process for fabricating the test cell of FIG. 1.
Figure 2B:
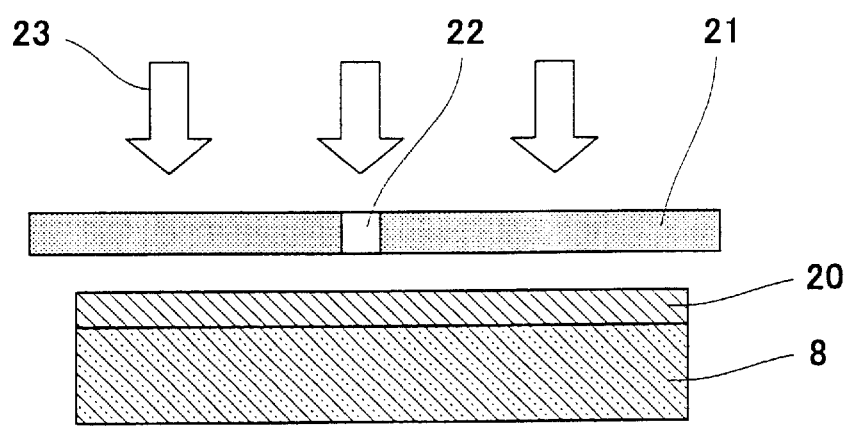

Initially, as shown in FIG. 2(a), a PC based resist material manufactured by JSR Corp. is applied to the glass substrate 8 to form a photoresist thin film 20 of 0.5 μm thickness. Then, the photoresist thin film 20 is irradiated with a parallel ultraviolet ray 23 through a photomask 21 having a triangular pattern opening 22 shown in FIG. 4 to expose the photoresit thin film 20. The exposed photoresist thin film 20 is developed and rinsed. Then, the thin film 20 is prebaked at a temperature of 90° C. Thereby, as shown in FIG. 3, the column-shaped protrusion 10 having the triangular cross section (see FIG. 15) and comprising the photoresist thin film is formed on the glass substrate 8.

Subsequently, a film of 2000 Å thickness comprising ITO(indium tin oxide) is formed on the glass substrate 8 having the protrusion 10 by a predetermined method to thereby form the transparent electrode 7. Then, alignment layer coating compositions SE-7492 manufactured by Nissan Chemical Industry is applied to the glass substrate 8 having the transparent electrode 7 by a spin coating method and heated in a thermostat at 180° C. for one hour to be cured to form the alignment layer 6, whereby the lower substrate 102 having the protrusion 103 on the upper surface thereof is completed.

Like the glass substrate 8 having the protrusion 10, the transparent electrode 2 and the alignment layer 3 are formed on the glass substrate 1, whereby the upper substrate 101 is completed.

Then, the upper and lower substrates 101 and 102 are rubbing-treated in the direction shown in FIG. 5 by using a rubbing cloth made of rayon.

Thereafter, the upper and lower substrates 101 and 102 are bonded by means of the spacers 5 manufactured by Sekisui Fine Chemical Corp. and struct bond 352A (bond made of seal resin manufactured by Mitsui Toatsu Chemical Corp.) in such a manner that there is a spacing of 6.5 μm between them, thereby fabricating a liquid crystal display cell 9. The rubbing treatment is performed such that a liquid crystal pretilt angle is about 5 degrees at an interface of the alignment layer of the liquid crystal cell 9.

A liquid crystal MJ96435 (refractive index anisotropy Δt=0.138) is filled into the liquid crystal cell 9 by a vacuum filling method to thereby seal the same, whereby the test cell A is completed.

Subsequently, evaluation of the spray to bend transition of the test cell A fabricated by the above-described fabrication method will be explained.

Two polalizers are bonded to the upper and lower surfaces of the test cell A in such a manner that polarization axes make an angle of 45 degrees with respect to the rubbing direction of the alignment layers and are orthogonal to each other. Then, a square wave voltage is applied across the transparent electrodes 2 and 7 at 7V. In this state, the transition from the spray to bend orientation is observed. The observation result is that the spray orientation has transitioned to the bend orientation over the entire surfaces of the electrodes 2 and 7 in about 5 seconds.

Specifically, in the area in the vicinity of the protrusion 103 of the test cell A, the orientation direction of the liquid crystal is different from that of the liquid crystal in its surrounding area. In the area in the vicinity of the protrusion 103, the liquid crystal layer 4 is somewhat twist-orientated. On application of the voltage, the spray to bend transition quickly proceeds in this area, and the bend orientation spreads from this area to its surrounding area. In this way, reliable and high-speed spray to bend transition is achieved.

For comparison, a test cell R having the same structure as the test cell A except that it does not have the protrusion 103 is fabricated in the same process as the test cell A and the spray to bend transition time is measured. The square wave voltage is applied to the test cell R at 7V and time required for transition from the spray orientation to the bend orientation over the entire areas of the electrodes is measured. The measurement result is about 42 seconds. As evident from these results, the present invention provides excellent effects as compared to the conventional case.

While the protrusion 103 is formed only on the substrate 102 in this example, it is obvious that the protrusion 103 may be formed on both of the substrates 101 and 102. While the protrusion 103 having the triangular cross section is used in this example, a protrusion having another shape may be employed provided that an area having the orientation direction of the liquid crystal different from that of its surrounding area is formed by the rubbing treatment. For example, it is preferable that the shape of the cross section is a circle, an ellipse, a rhombus, a triangular prism, a convex body, or a cone.

EXAMPLE 2

Figure 6:
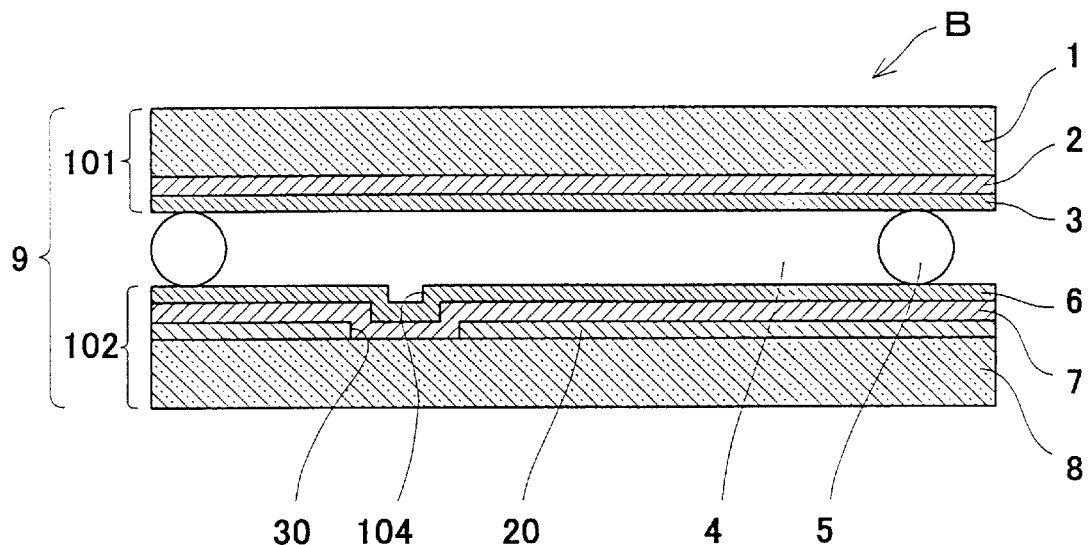
FIG. 6 is a cross-sectional view schematically showing a structure of a test cell according to a second example of the first embodiment of the present invention.
Figure 16:
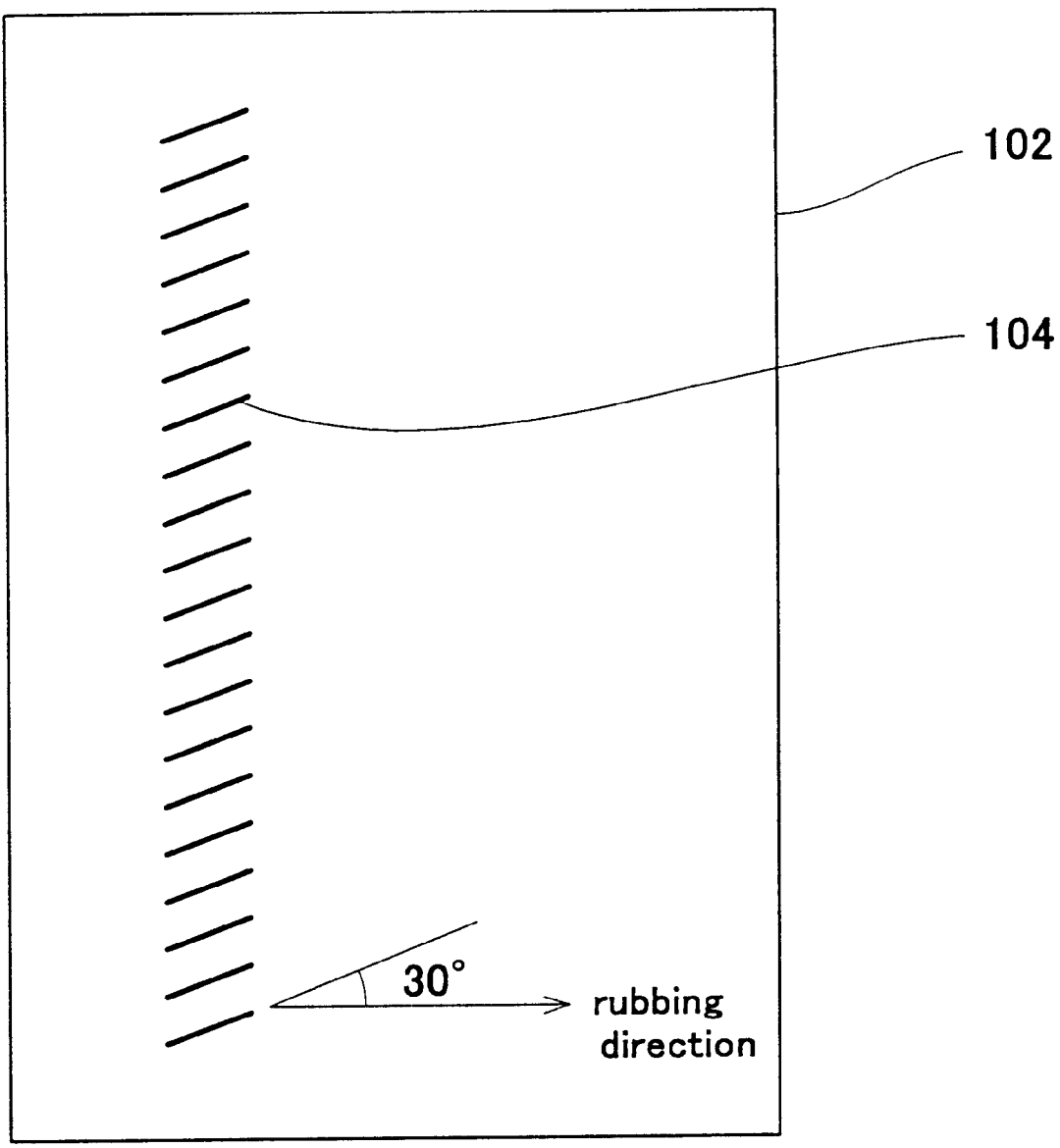
FIG. 16 is a plan view showing placement of grooves provided at the lower substrate of the test cell of FIG. 6.

FIG. 6 is a cross-sectional view schematically showing a structure of a test cell according to a second example of the present embodiment and FIG. 16 is a plan view schematically showing placement of grooves provided on a lower substrate of the test cell of FIG. 6.

Referring to FIGS. 6 and 16, there is shown a test cell B which is different from the test cell A of the first example in that groves 104 are formed on the lower substrate 102. More specifically, the lower substrate 102 is structured in such a manner that the grooves 30 are formed on the upper surface of the glass substrate 8 and the transparent electrode 7 and the alignment layer 6 are laminated in this order such that they cover the upper surface of the glass substrate 8 having the grooves 30 to thereby form the grooves 104 on the upper surface of the alignment layer 6. The plurality of grooves 104 (in this case 20) are inclined at an angle of 30 degrees with respect to the rubbing direction: (the direction of overall alignment treatment) and are provided at a pitch of 500 Å in a direction orthogonal to the rubbing direction. The grooves 104 are formed as microgrooves each having a width to have liquid crystal orientation effect. Specifically, the groove 104 has the width to fit the liquid crystal molecule of the liquid crystal layer 4 thereinto and orient it in the direction thereof, that is, approximately 100 Å in this example. Thereby, the twist-orientated area is formed in the area on which the groves 104 are provided. The other respects are identical to those of the first example. In FIG. 6, the grooves 30 and the grooves 104 are enlarged.

Figure 7:
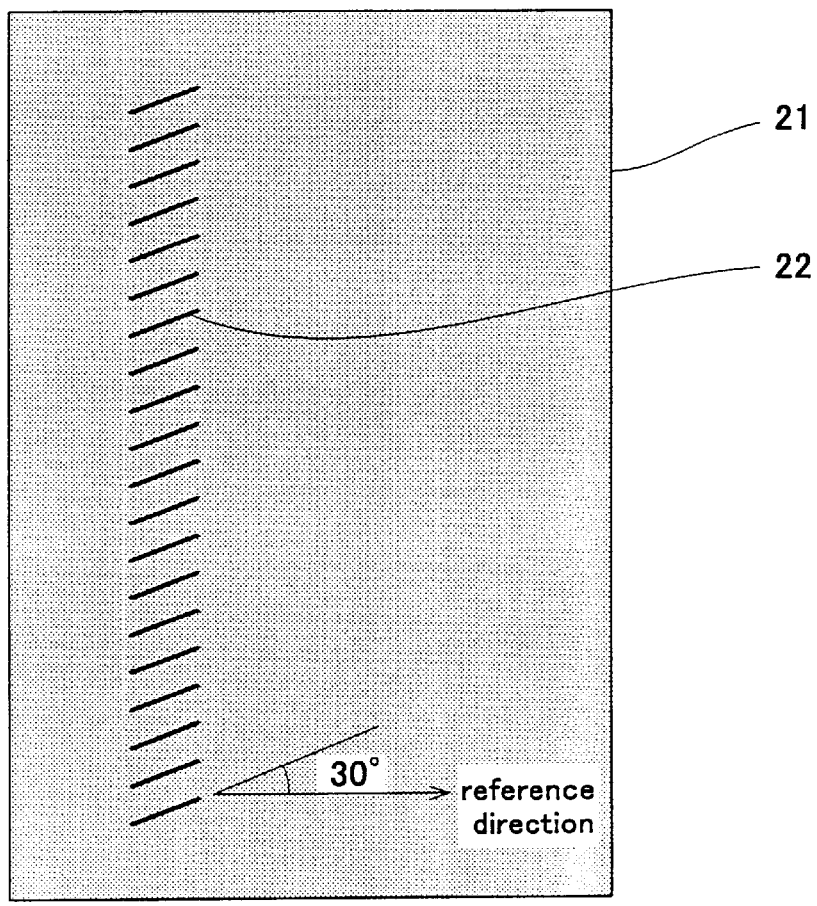
FIG. 7 is a plan view showing a photomask.

Subsequently, a method for fabricating the test cell B so structured will be explained with reference to FIGS. 6, 7, and 16. FIG. 7 is a plan view showing a photomask.

Initially, the photoresist thin film 20 of 0.5 μm thickness is formed on the glass substrate 8 and the groves 30 are formed on the photoresist thin film 20 by using the photomask 21 like the first example. As shown in FIG. 7, twenty slit openings 22 are formed in the photomask 21 such that they are inclined at an angle of 30 degrees with respect to a reference direction and provided at a pitch of 500 Å in the direction orthogonal to the reference direction. The opening 22 has a width so that the groove 104 finally formed on the alignment layer 6 through subsequent steps will have a width of approximately 100 Å. The reference direction is a direction in which the grooves 104 formed on the lower substrate 102 by using the photomask 21 are to be rubbing-treated.

Following this, the transparent electrode 7 and the alignment layer 6 are formed on the glass substrate 8 having the grooves 30 on the upper surface thereof like the first example, whereby the lower substrate 102 having the grooves 104 on the upper surface thereof is completed. The upper substrate 101 is fabricated in the same manner as the first example.

Then, the upper substrate 101 and the lower substrate 102 so fabricated are rubbing-treated like the first example. The rubbing direction of the lower substrate 102 is shown in FIG. 16. The grooves 104 are not subjected to rubbing because their depth (0.5 μm) is larger than their width. It is required that the grooves 104 have the small width to fit the liquid crystal molecule of the liquid crystal layer 4 thereinto and orient it in the direction of the groove 104 and have the depth not to be subject to rubbing in the rubbing treatment. The rubbing direction of the upper substrate 101 is parallel to the rubbing direction of the lower substrate 102 when they are constructed into the liquid crystal cell.

Thereafter, like the first example, a liquid crystal cell 9 is fabricated and a liquid crystal is filled into the liquid crystal cell 9 to seal the same, whereby the test cell B is completed. The liquid crystal pretilt angle at the interface of the alignment layer has approximately 5 degrees like the first example.

Subsequently, evaluation of the spray to bend transition time of the test cell B fabricated by the above method will be explained.

Two polarizers are bonded to the upper and lower surfaces of the test cell B in such a manner that polarization axes make an angle of 45 degrees with respect to the rubbing direction of the alignment layers and are orthogonal to each other. Then, the square wave voltage is applied across the transparent electrodes 2 and 7 at 7V. In this state, the transition from the spray to the bend orientation is observed. The observation result is that the spray orientation has transitioned to the bend orientation over the entire surfaces of the electrodes 2 and 7 in about 7 seconds.

In the area where the grooves 104 are provided, the orientation direction of the liquid crystal is different from that of the liquid crystal in its surrounding area. In the area, the liquid crystal layer 4 is somewhat twist-oriented. Like the first example, on application of the voltage, the spray to bend transition quickly proceeds in this twist-oriented area, and the resulting bend orientation spreads from this area to its surrounding area. In this way, reliable and high-speed spray to bend transition is achieved. In this example, the grooves 104 having the liquid crystal orientation effect are partially provided in the display pixel area to partially form the twist-orientated area to thereby facilitate the reliable and high-speed spray to bend transition, and its practical value is extremely high.

While the grooves 30 and 104 are formed by a photolithographic method, it is obvious that they may be formed by another methods such as a stamp method (for example, E. S. Lee et. al., "Control of Liquid Crystal Alignment Using Stamped-Morphology Method", Jpn.J.Appl.Phys., Part 2, vol.32, pp.L1436–L1438, 1993).

While the grooves 104 are inclined at an angle of 30 degrees with respect to the rubbing direction, this inclination angle is set to 90 degrees or smaller, and is preferably set to 60–90 degrees. The reason why the angle is thus set will be discussed in greater detail in the second embodiment. The plurality of grooves 104 may have angles different from one another with respect to the rubbing direction, and may be disposed in an arbitrary configuration instead of in a row. Furthermore, they may be disposed irregularly.

EXAMPLE 3

Figure 8:
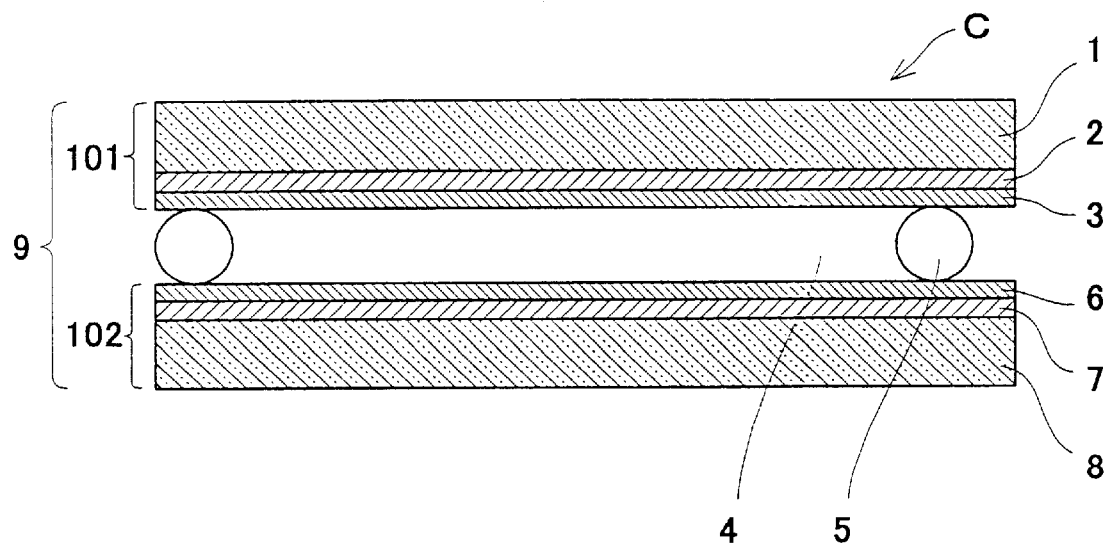
FIG. 8 is a cross-sectional view schematically showing a structure of a test cell according to a third example of the first embodiment of the present invention.
Figure 17:
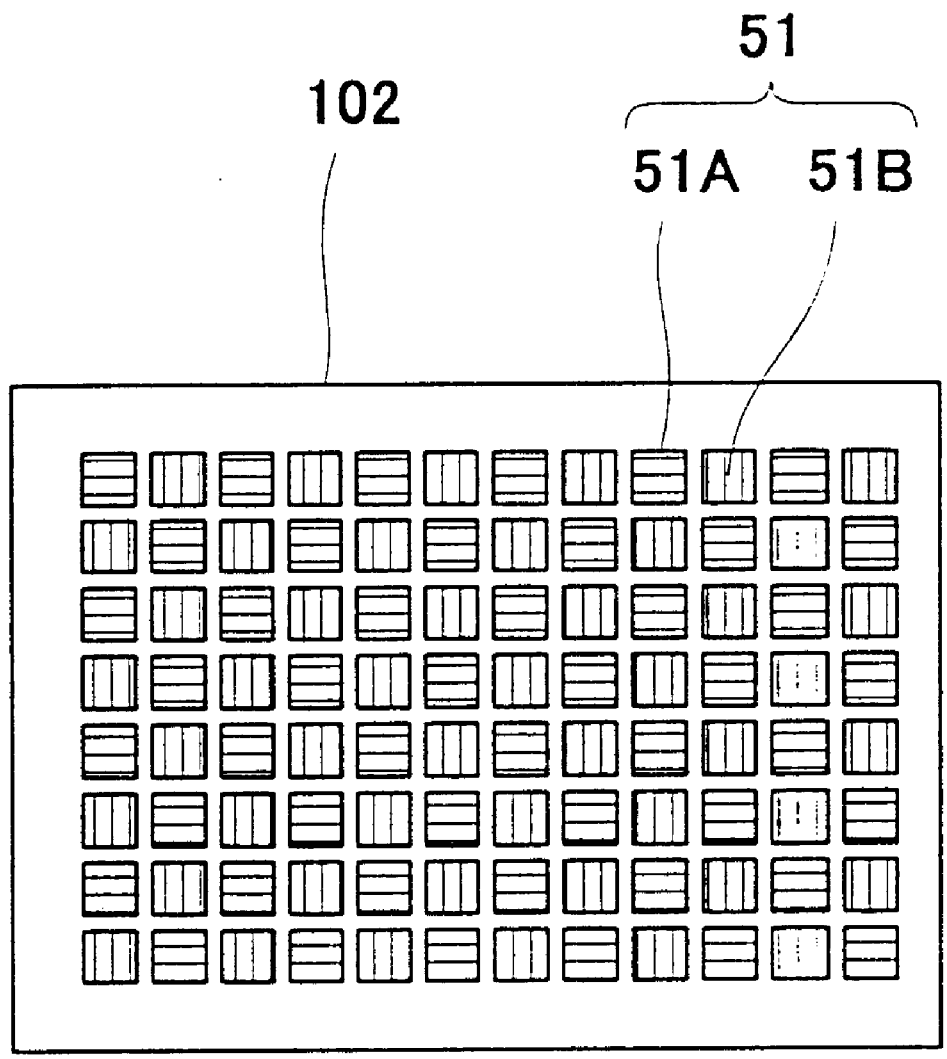
FIG. 17 is a plan view showing an alignment treatment state of the lower substrate of the test cell of FIG. 8.

FIG. 8 is a cross-sectional view schematically showing a structure of a test cell according to a third example of the present embodiment and FIG. 17 is a plan view schematically showing an alignment treatment state of a lower substrate of the test cell of FIG. 8.

Referring to FIGS. 8 and 17, there is shown a test cell C of the third example which is different from the test cell A of the first example in that the upper and lower substrates 101 and 102 have been subjected to alignment treatment by photo-alignment. The upper substrate 101 is structured such that the transparent electrode 2 and the alignment layer 3 are laminated on the glass substrate 1 in this order. The lower substrate 102 is structured such that the electrode 7 and the alignment layer 6 are laminated on the glass substrate 8 in this order. As shown in FIG. 17, the lower substrate 102 has a number of unit alignment-treated areas (different direction alignment-treated areas) 51 formed on an upper surface thereof in a grid pattern. In the unit alignment-treated areas 51, adjacent areas, for example, areas 51A and 51B are subjected to alignment treatment to have orientation directions differentiated 90 degrees from each other. In the upper substrate 101, respective unit alignment-treated areas corresponding to unit alignment-treated areas in the lower substrate 102 have been subjected to alignment treatment to have the same orientation directions as those of the corresponding areas in the lower substrate 102. That is, the liquid crystal layer 4 on the unit alignment-treated areas 5 has parallel orientation rather than twist orientation. It should be noted that orientation directions of liquid crystal molecules in a central portion of the liquid crystal layer 4 on each of the unit alignment-treated areas may have a variation (distribution). The alignment layers 3 and 6 are each constituted by an alignment layer having. photosensitivity and have been subjected to alignment treatment by photo-orientation. The other respects are identical to those of the first example.

Figure 9:
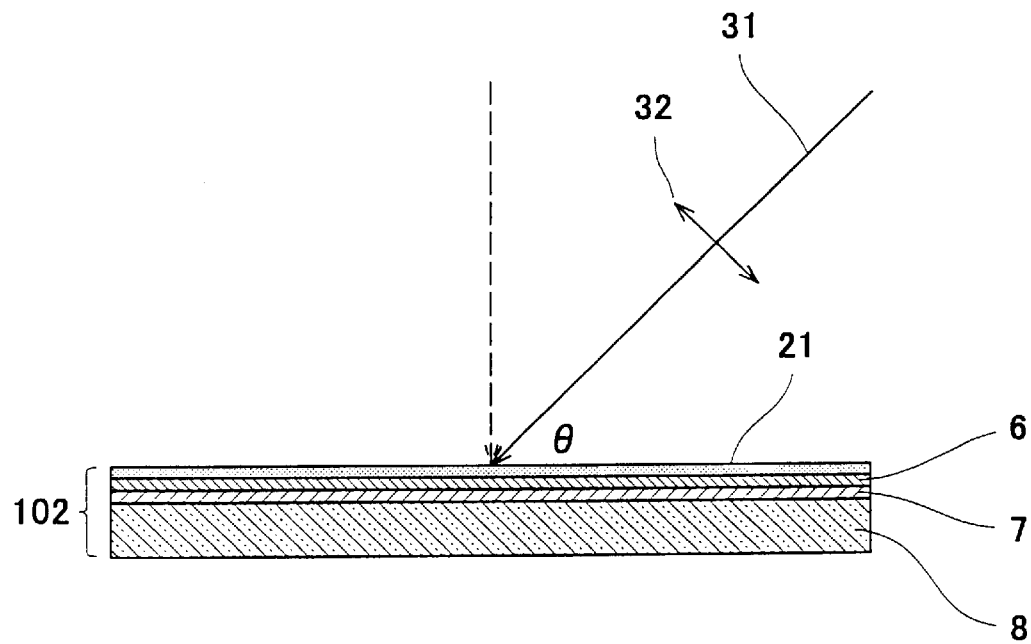
FIG. 9 is a cross-sectional view showing a process for fabricating the test cell of FIG. 8.
Figure 10:
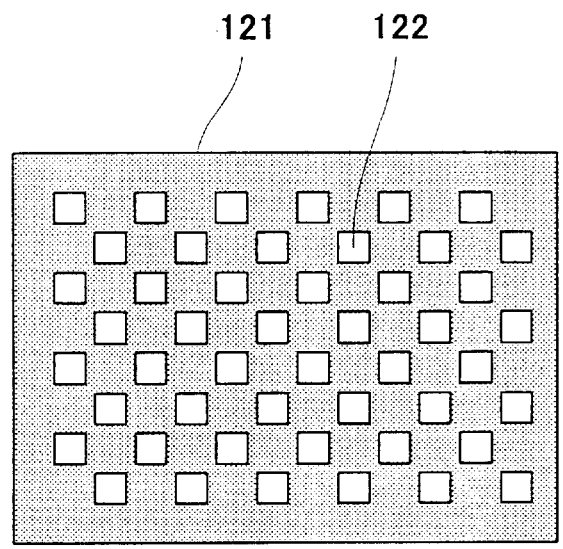
FIG. 10 is a plan view showing a mask.

Subsequently, a method for fabricating the cell C so structured will be explained with reference to FIGS. 8, 9, and 10. FIG. 9 is a cross-sectional view showing a process for fabricating the test cell of FIG. 8 and FIG. 10 is a plan view showing a mask.

Like the first example, initially, the transparent electrode 7 is formed on the glass substrate 8. Then, polyvinylcinnamate 2 wt. % solution (diluted into a 1:1 mixed solution of monochlorobenzene and dichloromethane) is applied to the glass substrate 8 having the transparent electrode 7 by the spin coating method and dried in the thermostat at a temperature of 100° C. for one hour to form the alignment layer 6 having photosensitivity, thereby fabricating the lower substrate 102. In the same manner, the upper substrate 101 is fabricated.

Then, the alignment layer 6 of the lower substrate 102 is treated by photo-orientation as described below by using a polarized ultraviolet ray irradiation device (not shown). In the alignment treatment, the alignment layer 6 is irradiated with the polarized ultra violet ray having a wavelength of 365 nm at irradiation light intensity of 1 mW/cm$^2$. More specifically, the alignment layer 6 is irradiated with a polarized ultraviolet ray having a plane of polarization extending in the direction indicated by reference numeral 32 in FIG. 9 through the mask 21 (processing A). In this case, the irradiation angle θ of the polarized ultraviolet ray is 90 degrees. The mask 21 has the openings 122 to have shapes and positions adapted to those of the unit alignment-treated areas 51A of the unit alignment-treated areas 51 where the areas 51A and 51B are alternately disposed in a grid pattern as shown in FIG. 17.

Then, the mask 21 is displaced by one unit alignment-treated area of the lower substrate 102 and the plane of polarization is rotated 90 degrees, that is, with the plane of polarization extending in the direction as indicated by the arrow of FIG. 9, the film 6 is irradiated with the polarized ultraviolet ray for 30 minutes (processing B). The irradiation angle θ of the polarized ultra violet ray is 90 degrees.

Then, the processing A and the processing B are performed at the irradiation angle of 45 degrees for 3 minutes (processing A' and processing B'). Thereby, the photo-alignment treatment of the lower substrate 102 is completed.

Like the lower substrate 102, the processing A, the processing B, the processing A' and the processing B' are performed on the upper substrate 102, whereby the photo-alignment treatment of the lower substrate 102 is completed.

Then, like the first example, the liquid crystal cell 9 is fabricated and the liquid crystal is filled into the liquid crystal cell 9 to seal the same, whereby the test cell C is completed. In this case, the liquid crystal pretilt angle at the interface of the alignment layer is approximately 3 degrees as the result of the processing A' and the processing B' of the upper and lower substrates 101 and 102.

Subsequently, evaluation of the spray to bend transition time of the test cell C fabricated by the fabrication method will be explained.

Two polarizers are bonded to the upper and lower surfaces of the test cell C in such a manner that polarization axes make an angle of 45 degrees with respect to an averaged orientation direction of the liquid crystal molecules of the unit orientation areas having orientation directions differentiated 90 degrees from each other and are orthogonal to each other. Then, a square wave voltage is applied across the transparent electrodes 2 and 7 at 7 V. In this state, the transition from the spray to the bend orientation is observed. The observation result is that the spray orientation has transitioned to the bend orientation over the entire surfaces of the electrodes 2 and 7 in about 4 seconds.

Specifically, a transition nucleus is generated from the area on the unit alignment-treated areas 51, i.e., from the different direction oriented areas and is grown and the spray to bend transition proceeds. Therefore, the high-speed transition is possible. Since a number of different direction orientated areas are formed, reliable transition is possible.

Each of the unit alignment-treated areas may correspond to a pixel, although this is not discussed in the third example.

[Liquid Crystal Display Element]

EXAMPLE 4

Figure 11:
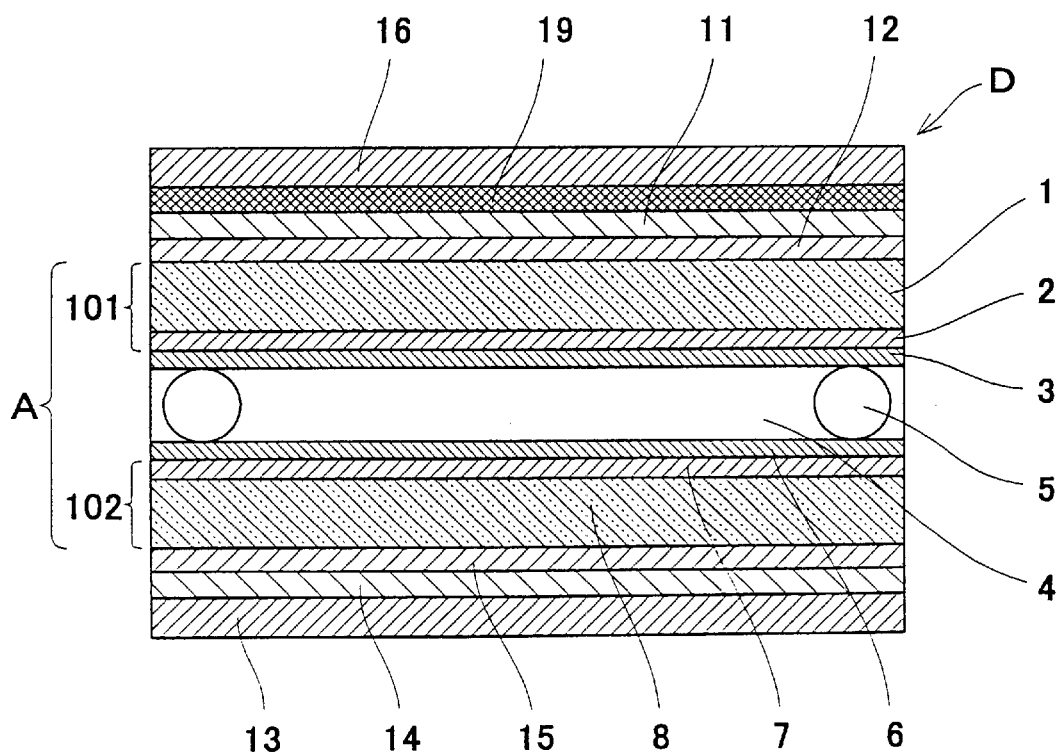
FIG. 11 is a cross-sectional view showing a structure of a liquid crystal display element according to a fourth example of the first embodiment of the present invention.
Figure 12:
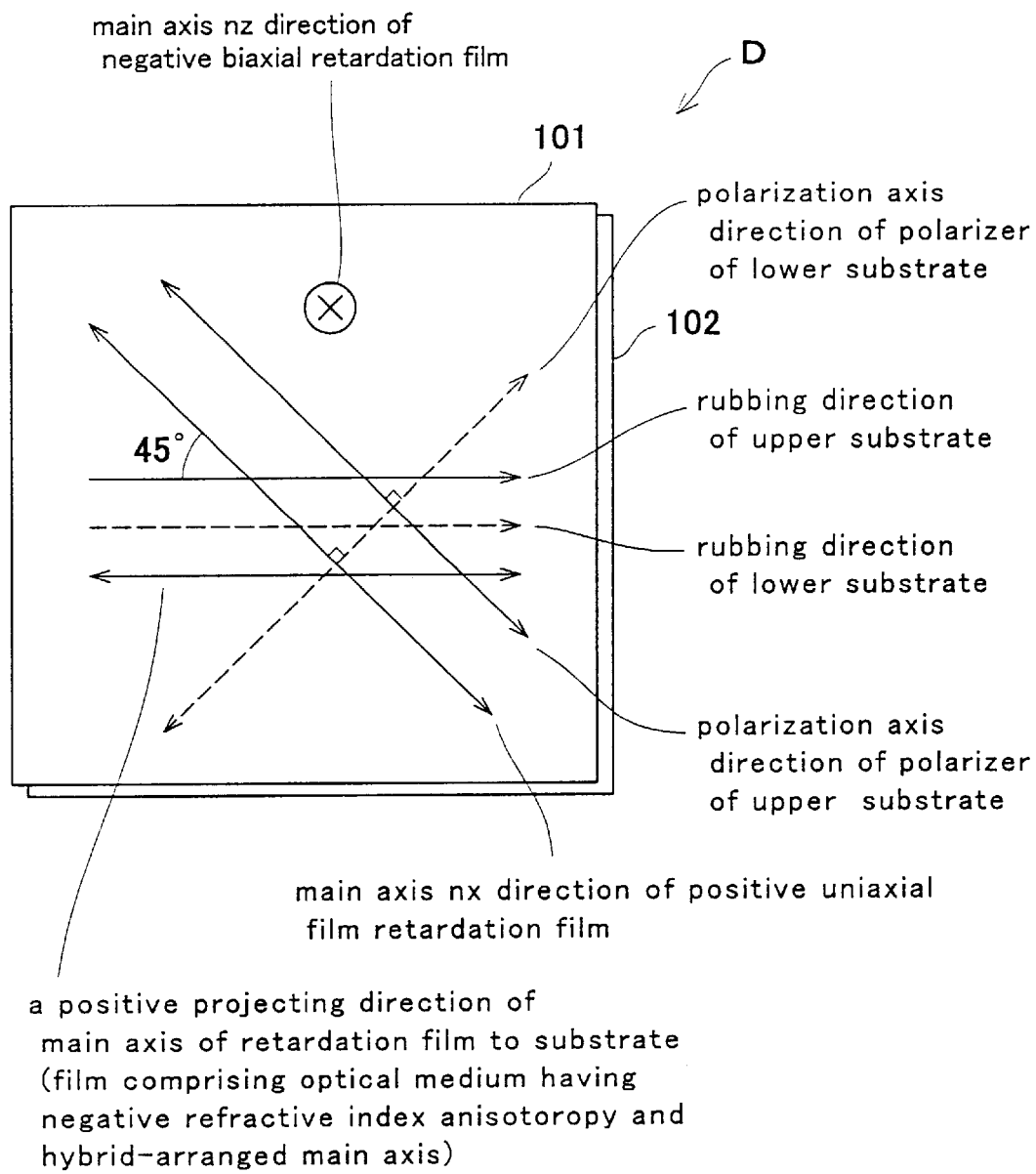
FIG. 12 is a plan view showing placement directions of respective optical elements of the liquid crystal display element of FIG. 11.

FIG. 11 is a cross-sectional view showing a structure of a liquid crystal display element according to a fourth example of the present embodiment. FIG. 12 is a plan view showing placement directions of respective optical elements of the liquid crystal display element of FIG. 11. In FIG. 11, the protrusion (see FIG. 1) of the lower substrate 102 is omitted. As shown in FIG. 11, a liquid crystal display element D is structured such that a retardation film (retardation film) 12 comprising an optical medium having negative refractive index anisortropy in which a main axis is hybrid-arranged, a negative uniaxial retardation film (retardation film) 11, a positive uniaxial retardation film (retardation film)19, and a polarizer 13 are disposed on an upper surface of the test cell A of the first example in this order, and a retardation film (retardation film) 15 comprising an optical medium having negative refractive index anisortropy in which a main axis is hybrid-arranged, a negative uniaxial retardation film (retardation film) 14, and a polarizer 16 are disposed on a lower surface of the test cell A in this order. These retardation films 12, 15, 11, 14, and 19 and the polarizer 16 are disposed in the direction shown in FIG. 12 with respect to the rubbing direction of the test cell A.

The retardation values of the retardation films 12, 15, 11, 14, and 19 are 26 nm, 26 nm, 350 nm, 350 nm, and 150 nm, respectively, with respect to a light having a wavelength of 550 nm.

Subsequently, evaluation of performance of the liquid crystal display element D so structured will be explained.

Figure 13:
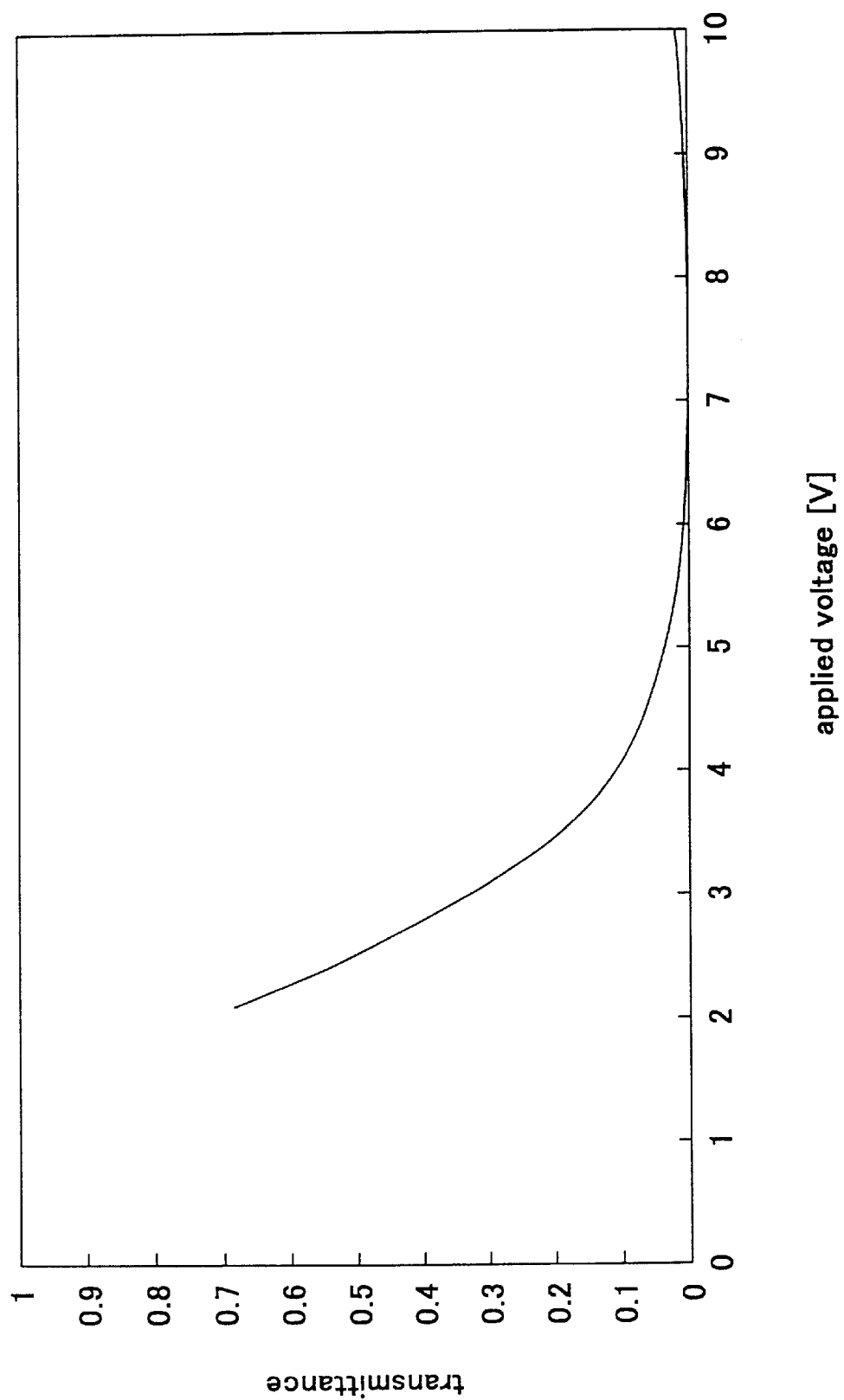
FIG. 13 is a graph showing a voltage-transmittance characteristic of a front surface of the liquid crystal display element of FIG. 11.
Figure 14:
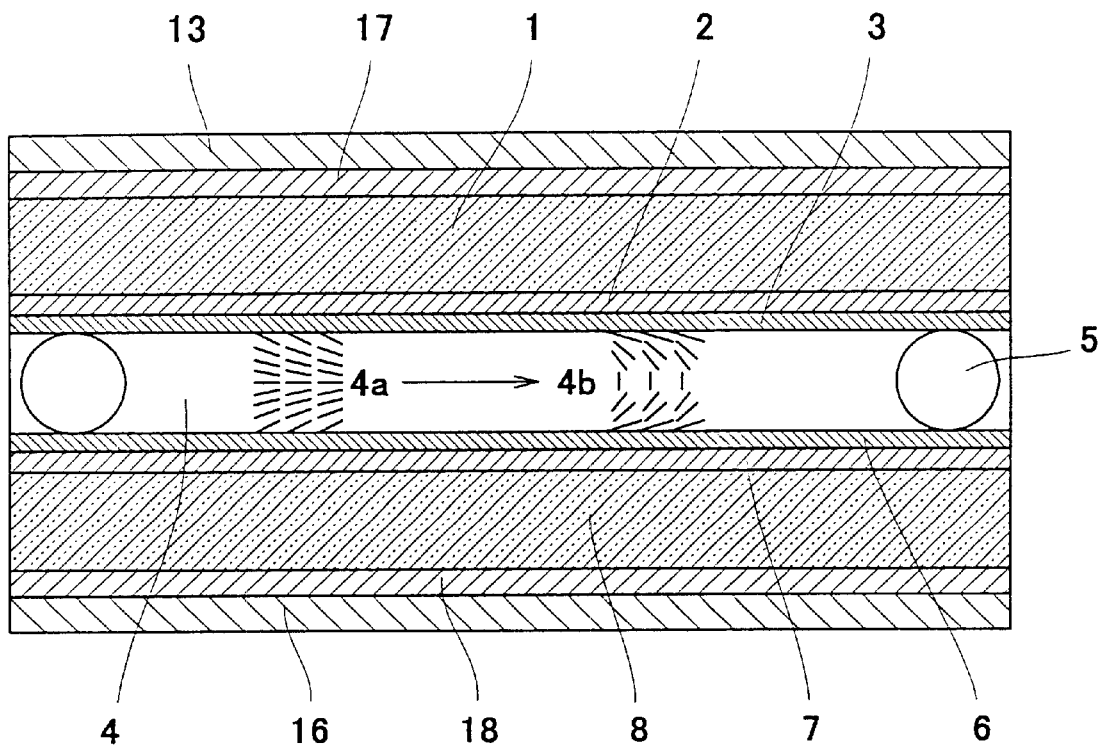
FIG. 14 is a cross-sectional view showing a structure of the conventional OCB mode liquid crystal display element.

FIG. 13 is a graph showing a voltage-transmittance characteristic in a front surface of the liquid crystal display element D at 25° C. The voltage-transmittance characteristic is obtained by measuring transmittance while reducing a voltage after confirming that transition to the bend orientation has occurred by applying the square wave voltage to the liquid crystal display element D at 10V. Since the transition from the bend to the spray orientation occurs at 2.1V in the liquid crystal display element D, it is necessary to display at 2.2 V or more in practice. As can be seen from the voltage-transmittance characteristic, transmittance has a minimum value around 7.2V. Hence, setting a white level voltage at 2.2V and a black level voltage at 7.2V, viewing angle dependency of a contrast ratio is measured. As a result, the contrast ratio 10:1 is achieved in the range of 126 degrees in the vertical direction and 160 degrees in the horizontal direction and it is verified that a satisfactorily wide viewing angle characteristic is maintained if a portion having a direction of the liquid crystal director different from that of a surrounding portion is partially formed on the alignment layer of the substrate. Unsatisfactory orientation and low display quality are not visually observed.

When the applied voltage is changed from 3V to 5V, the measurement result of response time is that rising time is 5 milliseconds. When the applied voltage is changed from 5V to 3V, the measurement result of the response time is that fall time is 6 milliseconds.

EXAMPLE 5

In a liquid crystal display element (not shown) according to a fifth example of the present embodiment, the test cell A of the liquid crystal display element D of the fourth example has been replaced by the test cell B of the second example (not shown). With such a structure, the same effects as described in the fourth example is obtained.

EXAMPLE 6

Figure 18:
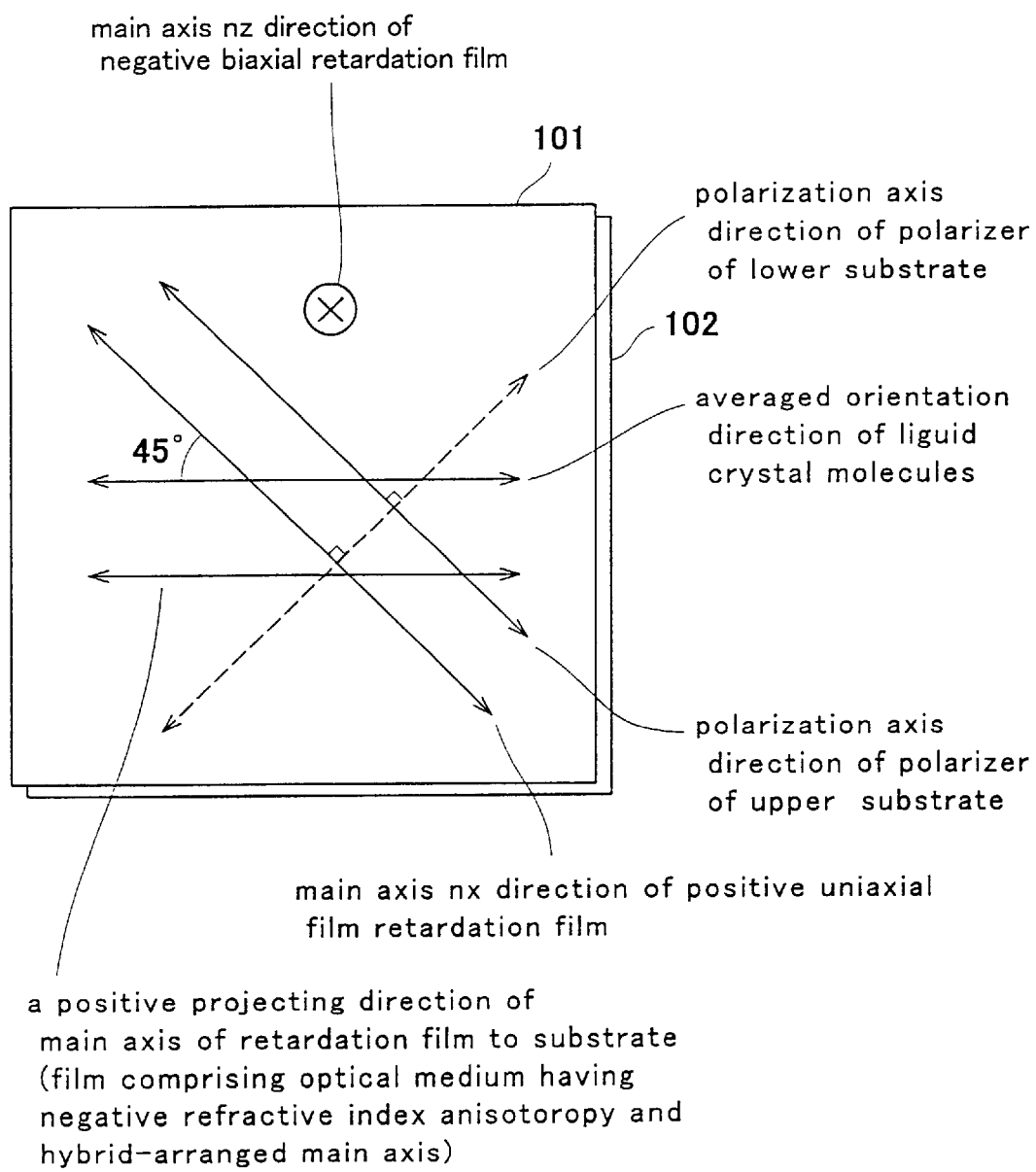
FIG. 18 is a plan view showing placement directions of respective optical elements of a liquid crystal display element according to a sixth example of the first embodiment of the present invention.

In a liquid crystal display element (not shown) according to a sixth example of the present embodiment, the test cell A of the liquid crystal display element D of the fourth example, has been replaced by the test cell C of the third example (not shown). It should be noted that the optical elements are disposed in the direction shown in FIG. 18.

With such a structure, the same effects as described in the fourth example is obtained.

As should be appreciated from the forgoing, the liquid crystal display element of the first embodiment achieves high-speed spray to bend orientation transition without degrading the wide viewing angle characteristic or response characteristic of the conventional OCB mode and its practical value is extremely high.

Embodiment 2

A second embodiment of the present invention illustrates a preferred embodiment of a protrusion (steric obstacle) for controlling an alignment treatment by rubbing.

Figure 19:
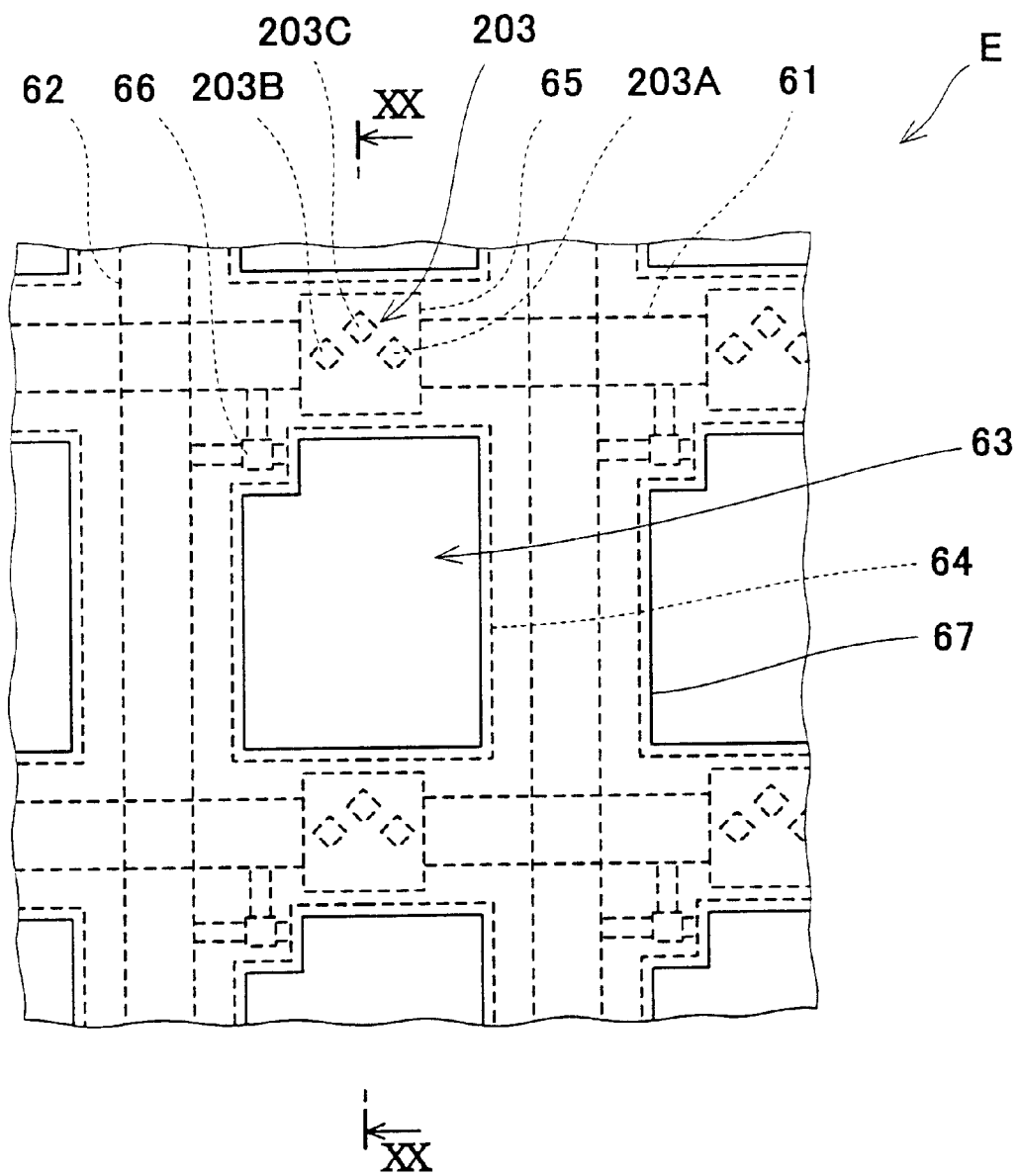
FIG. 19 is a plan view showing a structure of a liquid crystal display element according to a second embodiment of the present invention.
Figure 20:
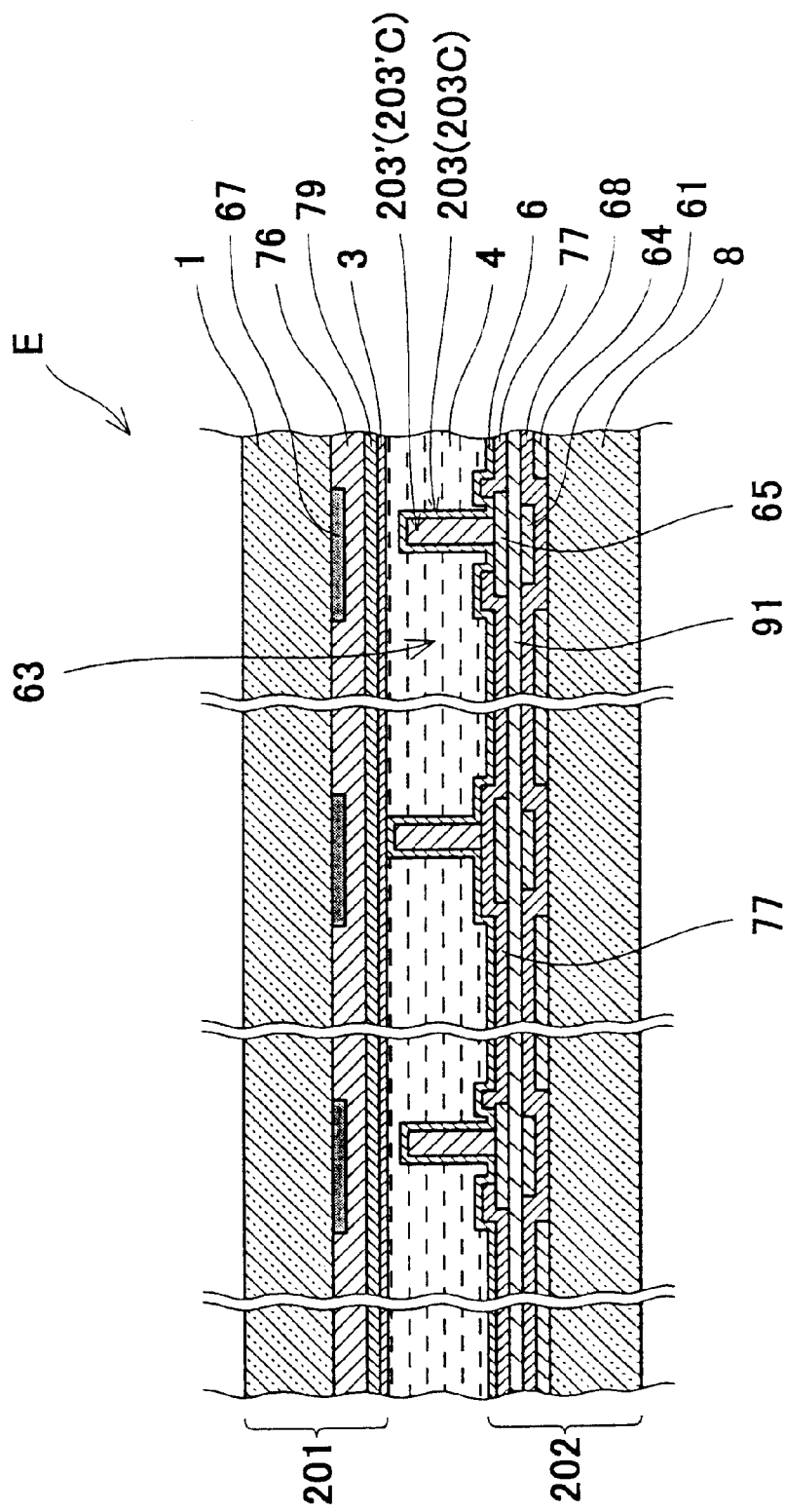
FIG. 20 is a cross-sectional view in the direction of the arrow XX—XX of FIG. 19.

FIG. 19 is a plan view showing a structure of a liquid crystal display element according to the second embodiment of the present invention and FIG. 20 is a cross-sectional view in the direction of the arrow XX—XX of FIG. 19.

Referring to FIGS. 19 and 20, an OCB mode liquid crystal display element E of the second embodiment is a liquid crystal display element of an active matrix type and is structured such that a liquid crystal layer 4 comprising a nematic liquid crystal is disposed in a space formed between a TFT substrate (array substrate) 202 and a color filter substrate 201 disposed opposite to the TFT substrate 202. In FIGS. 19 and 20, the optical elements such as the retardation films, the polarizers, and the like are omitted.

The TFT substrate 202 comprises a glass substrate 8. A pixel electrode 64 is formed on an upper surface of the glass substrate 8 and covered by an insulating layer 68. A gate line 61 and a source line 62 are formed in matrix on the insulating layer 68 and covered by an insulating layer 91. The gate line 61 and the source line 62 are formed to position the pixel electrode 64 in an area of a pixel 63 defined by these lines. A storage capacitor electrode 65 is formed on the insulating layer 91 such that it is situated above the gate line 61. The surface of the insulating layer 91 with the storage capacitor electrode 65 is covered by an insulating layer 77. A complex column spacer 203' comprising photoresist is formed above the storage capacitor electrode 65. The complex column spacer 203' is disposed such that the ratio of the number of the column spacers immediately formed on the electrode 65 and the number of the column spacers formed through the insulating layer 77 is 2:1 in the direction in which the source line 62 extends. An alignment layer 6 is formed such that it covers surfaces of the complex column spacer 203, the pixel electrode 64, the insulating layers 68, 77, and the electrode 65. Reference numeral 203 denotes the complex column spacer 203' having the alignment layer 6 formed on the surface thereof, and reference numerals 203A, 203B, 203C denote column spacers 203A', 203B' 203C' having the alignment layer 6 on the surfaces thereof, respectively. A tip end of the complex column spacer 203 formed on the electrode 65 through the insulating layer 77 abuts against a lower surface of the color filter substrate 201. There is a clearance corresponding to a thickness of the insulating layer 77 between a tip end of the complex column spacer 203 immediately formed on the electrode 65 and a lower surface of the color filter substrate 201. In FIGS. 19 and 20, the complex column spacer 203 is enlarged. The complex column spacer 203 will be mentioned in greater detail later. Reference number 66 denotes a TFT (Thin Film Transistor).

The color filter substrate 201 is structured such that a black matrix 67, a color filter 76, a counter electrode 79, an alignment layer 3 are laminated on a lower surface of the glass substrate 1 in this order. The black matrix 67 is disposed above the gate and source lines 61 and 62. The color filter substrate 201 and the TFT substrate 202 including the complex column spacer 203 are fabricated by a well-known photolithographic method, and will not be discussed. The color filter substrate 201 and the TFT substrate 202 are constructed into the liquid crystal display element in the same manner as the first example of the first embodiment.

Figure 21:
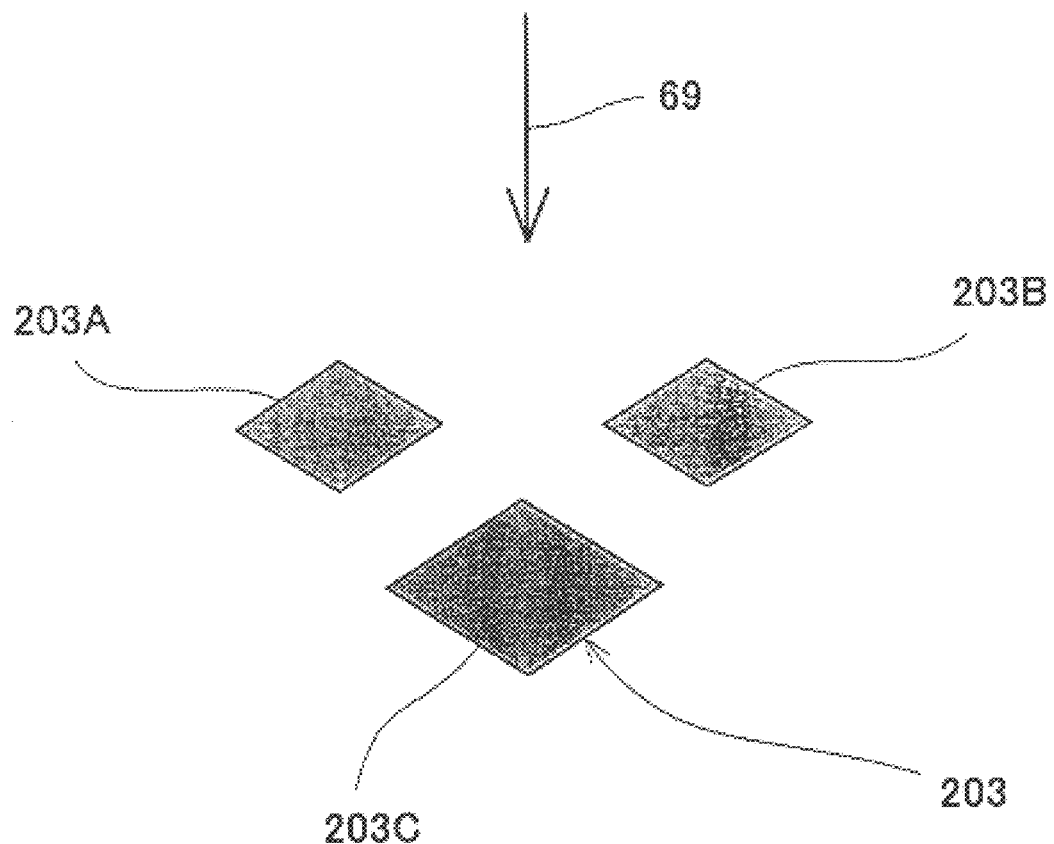
FIG. 21 is a plan view showing configuration of a complex column spacer of FIG. 19.
Figure 22:
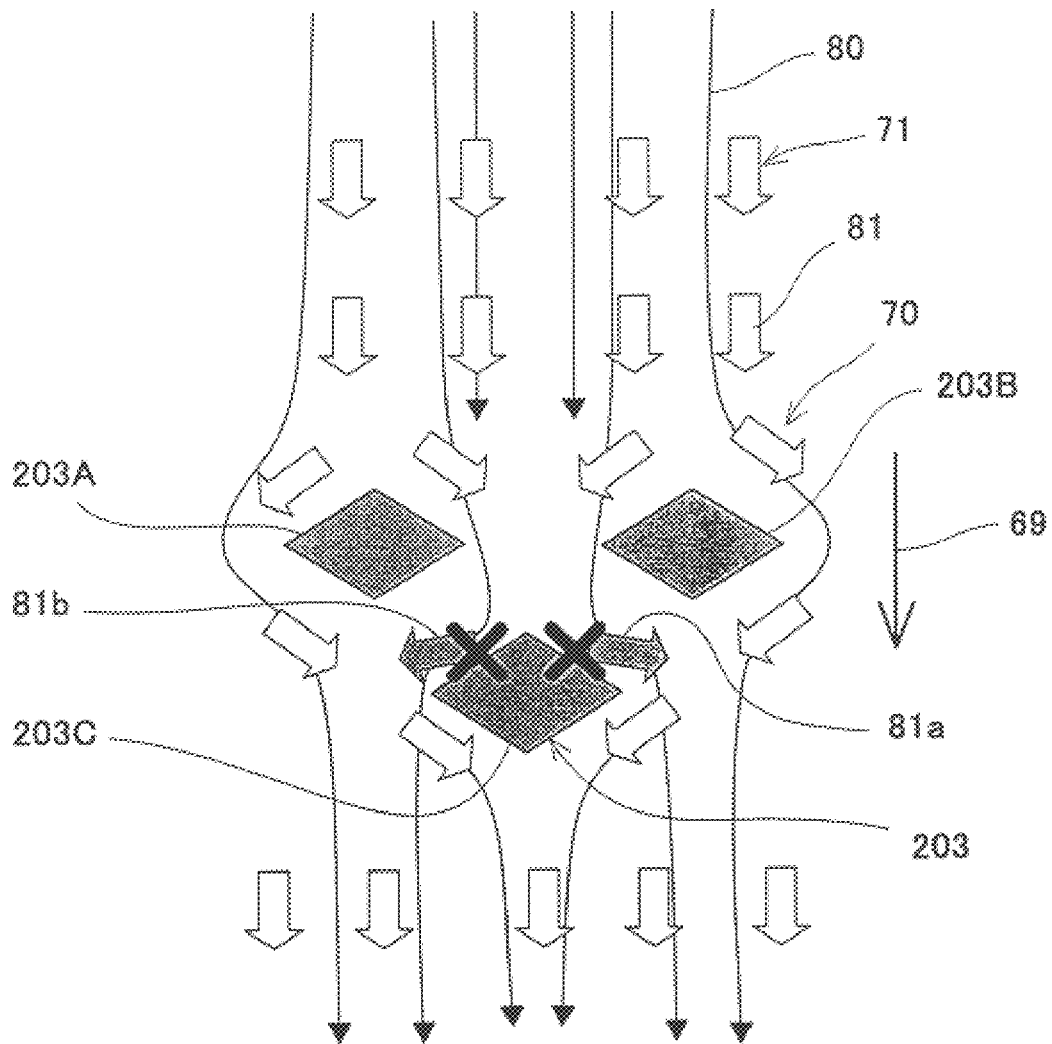
FIG. 22 is a conceptual view showing an alignment treatment state provided by the complex column spacer of FIG. 21.

The complex column spacer 203 will be explained in detail with reference to FIGS. 19 through 22. FIG. 21 is a plan view showing configuration of the complex column spacer 203 and FIG. 22 is a conceptual view showing an alignment-treated state formed by the complex column spacer of FIG. 21.

In the liquid crystal display element E, a liquid crystal 4 are filled into the space between the substrates 201 and 202 to seal these substrates. The substrates 201 and 202 have been subjected to alignment treatment by rubbing, in which case the rubbing direction 69 is the same for the upper substrate (color filter substrate) 201 and the lower substrate (TFT substrate) 202. The present invention is characterized in that the column spacer (steric obstacle) is formed on one of the substrates (lower substrate 202 in this embodiment) by photoresist and is specifically configured. In general, in the conventional liquid crystal display element, resinous beads dispersed in the space between the substrates correspond to the spacer that keeps the spacing between the substrates. Instead of the resinous beads, the column spacer comprising the photresist is used as the spacer. While the column spacers 203A, 203B, 203C are formed on the electrode (electrode 65) in this embodiment, the electrode may cover the surfaces of the column spacers 203A, 203B, 203C. In this case, it is necessary to remove portions of the electrode (counter electrode 79) of the opposite substrate (color filter substrate 201) that abut against the column spacers 203A, 203B, 203C. If not, a short-circuit reaction might occur between the electrodes.

As an example of configuration of the column spacer of the present invention, as shown in FIG. 21, the column spacers 203A, 203B, 203C each having a rhombic cross section whose sides are inclined with respect to the rubbing direction 69 are formed. These spacers are considered as a set (hereinafter referred to as the complex column spacer 203) and formed for each pixel 63 regularly. The complex column spacer as defined herein refers to a column spacer group constituted by a plurality of column spacers disposed close to one another.

In the complex column spacer 203, the column spacers 203A, 203B, 203C are formed such that shorter diagonal lines of the rhombic cross sections are parallel with the rubbing direction 69. It is preferable that the cross sections (planar sections) of the column spacers 203A, 203B, 203C have anisotropy. Since the aim of this embodiment is to control the flow of the rubbing, it is important that the cross section makes rubbing easily flow. In view of these respects, the rhombic shapes are adopted as the shapes of the cross sections of the column spacers 203A, 203B, 203C. The rubbing direction 69 as defined herein refers to a relative movement direction of a rubbing cloth with respect to the substrate. i.e., the direction of the overall alignment treatment. The column spacers 203A, 203B, 203C are disposed in such a manner that the column spacers 203A, 203B are laterally arranged at a predetermined interval with respect to the rubbing direction 69, and the column spacer 203C is disposed behind the spacers 203A, 203B and equally spaced apart from the spacers 203A, 203B. The column spacer 203C situated behind (rear column spacer) has a cross sectional area larger than cross sectional areas of the column spacers 203A, 203B (front column spacers).

When the substrate 202 having the complex column spacer 203 is rubbing-treated, the alignment treatment direction, i.e., the direction in which rubbing is actually performed, is locally controlled according to the configuration of the complex column spacer 203. The alignment treatment state is shown in FIG. 22.

Referring to FIG. 22, reference numeral 69 denotes the rubbing direction. A solid line arrow indicates the actual flow of rubbing, i.e., the alignment treatment direction. An arrow 81 indicates a local alignment treatment direction. What is important is the rear column spacer 203C. Fibers of the rubbing cloth (not shown) that collided with the spacer 203C are repelled rightward and leftward. Thereby, as indicated by arrows 81*a*, 81*b*, rubbing is performed rightward and leftward. To prevent the rubbing from being performed in a normal direction (rubbing direction 69) over the rubbing thus performed rightward and leftward, the front column spacers 203A, 203B are formed. Consequently, as shown in the same Figure, local different direction alignment-treated areas 70 which are subjected to alignment treatment in the direction different from the alignment treatment direction of surrounding areas 71 are formed around the complex column spacer 203. The upper substrate 201 is subjected to alignment treatment in the same direction as the surrounding areas 71. Therefore, the liquid crystal layer 4 situated above the different direction alignment-treated areas 70 of the lower substrate 202 is in twist-orientated state. The twist-orientated state (hereinbelow referred to as a twist-oriented area) of the liquid crystal layer 4 becomes a nucleus and the spray to bend transition proceeds. Particularly in the twist-orientated area, a portion that becomes the nucleus of the spray to bend transition is represented by X in FIG. 22, and the twist occurs in this area.

Preferred conditions of the configuration of the complex column spacer 203 will now be explained. If the distance between the front column spacers 203A, 203B and the rear column spacer 203C is too large, then a shading effect of the column spacers 203A, 203B is reduced. In order to exhibit the shading effect efficiently, it is necessary to shade the different direction rubbing area in the vicinity of the column spacer 203C so as not to be subject to rubbing in the normal direction. The relationship between a height and a shading distance of the complex column spacer 203 is investigated. According to the investigation, in case of the complex column spacer 203 of this embodiment, an area where a distance from the complex column spacer 203 is five times or less as large as the height of the complex column spacer 203 provides the shading effect. An area where the distance is three times or less provides a reliable shading effect. On the other hand, in an area where the distance is five times or larger, the shading effect is not provided. When the height of the complex column spacer 203 is reduced to half, the shading distance is correspondingly reduced to half. That is, the shading distance is expressed as a function of the height of the complex column spacer 203.

It is required that the spacing between the column spacers 203A, 203B situated forward be larger than a fiber diameter of the rubbing cloth. In this embodiment, the spacing is preferably 10 $\mu$m or larger. In the areas between the front column spacers 203A, 203B and the rear column spacer 203C, shades of rubbing due to the front column spacers 203A, 203B are generated and in the shade areas, the rubbing direction is different from that of the surrounding area 71. It is confirmed that a pretilt angle is changed in the shade areas. For efficient transition, it is required that the shade reach the column spacer 203C. In this embodiment, the reaching distance of the shades is five times or less as high as the complex column spacer 203 and is approximately 25 $\mu$m or less. Therefore, when the distance between the front column spacers 203A, 203B and the rear column spacer 203C is too large, the transition does not efficiently takes place. Also, like this embodiment, when the cross-sectional areas of the front column spacers 203A, 203B are larger than the cross-sectional area of the rear column spacer 203C, the effect of the shades is remarkable. This is because it is highly probable that the shades of the front column spacers 203A, 203B make contact with the rubbing (alignment treatment) formed by the rear column spacer 203C.

It is preferable that the shorter diagonal line of the rhombic cross sections of each of the spacers 203A, 203B, 203C has a length of 5 $\mu$m or larger. If the length is smaller than 5 $\mu$m, the column spacer is liable to fall. When the column spacer has a cross section of an arbitrary shape, its minimum diameter is preferably 5 $\mu$m or larger. The diameter of the column spacer (steric obstacle) as defined herein refers to a distance between two points on an outer periphery of a cross section, between which a center of the cross section of the column spacer is situated.

To generate the nucleus of the spray to bend transition, it is imperative that twist orientation have occurred in the liquid crystal layer 4. The transition tends to occur in the portion where different direction orientation states contact with each other and the portion where twist-orientated areas of different twist directions tends to become the nucleus. This portion is, as described above, represented by X in FIG. 22 (more accurately, a liquid crystal on the portion represented by X) and in this portion, a clockwise twist area and a counter-clockwise twist area are contact with each other. Accordingly, it is desirable that the column spacers be configured to form the portion where such different direction orientated areas are contact with each other. It is more desirable that the column spacer be configured to form the portion where the areas with opposite twist directions are contact with each other.

The transition nucleus tends to be generated in the vicinity of the protrusions formed on the substrate, including the column spacers 203A, 203B, 203C of the second embodiment and the protrusion 103 (see FIG. 1) of the first example of the first embodiment. The reason for this is as follows. In rubbing, the shade of rubbing is generated rearward of the protrusion and causes a portion with a low rubbing strength to be formed, while the pretilt angle depends on the strength of rubbing. For this reason, the rubbing strength is high and the pretilt angle is small forward of the protrusion, while the rubbing strength is low and the pretilt angle is relatively large rearward of the protrusion. That is, the pretilt angles forward and reward of the protrusion differ from each other, and thereby the defect tends to occur. If the defect occurs, the defect tends to become the nucleus.

This defect is a defect constituting a boundary between a spray state in which liquid crystal molecules are directed upward or downward and another state in a central portion in a direction of a cell thickness when a transition voltage is applied.

The protrusion tends to become the transition nucleus when it has a height more than half of the thickness of the liquid crystal layer 4 (referred to as a cell thickness in the specification). In order to reliably make this protrusion become the transition nucleus, it is desirable that the height of the protrusion be equal to the cell thickness or be larger or smaller than the cell thickness by 1 $\mu$m or less.

In this embodiment, as shown in FIG. 21, the twist angle in the twist-oriented area is approximately 60 degrees. The twist-oriented area tends to become the transition nucleus when the twist angle is 45 degrees or larger and is more effective if the twist angle is 60 degrees. In a twist-oriented area with a twist angle of 90 degrees, transition takes place from the area even at a voltage as low as 5V. This is because the clockwise twist and the counter-clockwise twist coexist in this area, which will be discussed in the eighth embodiment in detail. Hence, the twist angle of the twist-oriented area is preferably set to 45–90 degrees and is more preferably set to 60–90 degrees. In this embodiment, the distribution of orientation directions of the liquid crystal in the twist-oriented area need not be uniform. It is observed that the transition tends to occur when the orientation direction of the liquid crystal has a distribution and is gradually changed.

While the column spacers 203A, 203B, 203C have vertical planes as side faces, the reliability of the spray to bend transition is enhanced when they have tapered planes, i.e., planes in which upper portions are inwardly inclined.

In this embodiment, the TFT substrate 202 having the TFT 66 is used. Because light leaks in the twist-oriented area characteristic of this invention during black display, it is important to mask this area to thereby obtain high contrast. In general, the black matrix is formed around the pixel electrode. So, if the twist-oriented area is formed in the area masked by the black matrix, then the present invention is implemented without reducing an aperture ratio. It is necessary to apply a voltage to the area where the transition nucleus is to be formed, in order to bring about the spray to bend transition. Accordingly, in this embodiment, the complex column spacer 203 is formed on the electrode 65 situated below the black matrix 67 to thereby ensure the spray to bend transition nucleus area without reducing the aperture ratio.

In this embodiment, the complex column spacer 203 is formed for each pixel 63 to reliably bring about the transition for each pixel and thereby prevent the occurrence of a point defect per pixel. For this reason, unfavorably, spacer density of the column spacer of this embodiment is higher than that of the general column spacer. Because the liquid crystal layer 4 is contracted at low temperatures, the substrates 201, 202 cannot follow the contraction of the liquid crystal layer 4 if the spacer density is thus high. For this reason, bubbles might be generated if the liquid crystal display element E is left at low temperatures for a long time. In this embodiment, the complex column spacers 203 are divided into units each constituted by three spacers in the direction in which the source line 62 extends and heights of portions where three complex column spacers 203 belonging to each unit are formed are adjusted. Specifically, a central spacer is formed on the higher portion and the other two spacers are formed on the lower portions so that only the central spacer abuts against the opposite substrate (color filter substrate) 201. Accordingly, only the central complex column spacer 203 functions as the spacer, and therefore, the spacer density is substantially reduced to about ⅓. Thereby, the occurrence of the bubbles at low temperatures is avoided.

Figure 23:
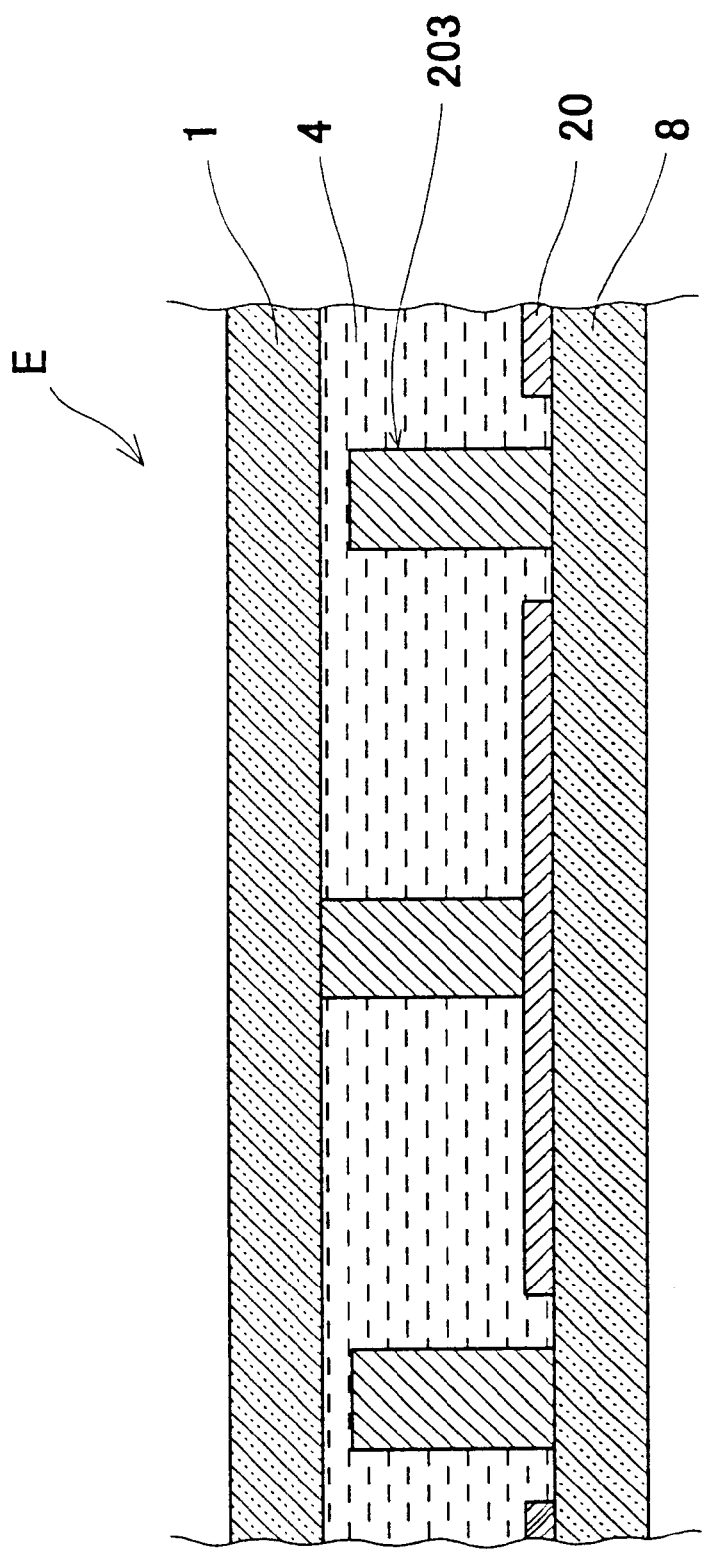
FIG. 23 is a cross-sectional view schematically showing convex and concave portions provided on a TFT substrate to form the complex column spacer.

In this embodiment, the heights of the portions where the complex column spacers 203 are to be formed are adjusted depending on whether or not to form the insulating layer 77 on the electrode 65. Alternatively, this may be performed by utilizing convex and concave portions inherently present on the surface of the TFT substrate 202. Also, alternatively, as shown in FIG. 23, the convex and concave portions may be intentionally formed by forming the photoresist layer 20 on the glass substrate 8 and partially removing the photoresist layer 20. In FIG. 23, the wiring layer comprising the pixel electrode and the like of the TFT substrate, the layer comprising a color filter and the like of the TFT substrate and the alignment layer of the color filter substrate are omitted.

In general, the insulating layer 77 is formed on the electrode 65. In this embodiment, there exist portions where the insulating layer 77 is removed for adjustment of height. Such removal of the insulating layer 77 gets rid of the voltage loss in the insulating layer 77 and facilitates the application of a voltage to the liquid crystal layer 4. The height of the complex column spacer 203 may be adjusted by another method to remove the portion of the insulating layer 77 where the complex column spacer 203 is to be formed, on each of the electrodes 65. This further reduces the voltage loss in the insulating layer 77.

Subsequently, an operation of so structured liquid crystal display element E will be explained with reference to FIGS. 19 through 26.

As shown in FIGS. 19 through 22, when a transition voltage is applied to the liquid crystal display element E, the transition nucleus is generated in the twist-oriented area of the liquid crystal layer 4 formed around the complex column spacer 203 on the electrode 65 of each pixel 63. The bend orientation proceeds from the transition nucleus to its surrounding area. For this reason, the spray to bend transition easily takes place. Consequently, the spray to bend transition takes place at low voltages. Since the transition nucleus is formed in each pixel 63, the transition reliably takes place for each pixel 63 and the occurrence of the point defect per pixel is avoided.

Theoretically consider the reason why the spray to bend transition easily takes place. Because an energy barrier exists when the transition from the spray to the bend orientation is to take place, a transition voltage used for surpassing the energy barrier is needed. The transition nucleus is necessary for the spray to bend transition.

As shown in FIG. 24(b), suppose that liquid crystal molecules 4' are adjacent to twist-oriented liquid crystal molecules 4". Also suppose that the twist angle of the liquid crystal molecules 4" is 60 degrees. The liquid crystal molecules 4', when the voltage is not applied, are spray-oriented as shown in FIG. 24(a). On application of the voltage to the liquid crystal molecules 4', they are transformed by the voltage. In this case, since the liquid crystal molecules 4' are adjacent to the twist-oriented liquid crystal molecules 4", the liquid crystal molecules 4' are twist-transformed in addition to the transformation in a cell thickness direction 84. In this case, at voltages up to approximately 2.1V, the liquid crystal molecules 4' are easily transformed in the cell thickness direction 84 rather than twist-transformed, while at voltages grater than 2.1V, the molecules 4' are easily twist-transformed rather than transformed in the cell thickness direction 84. Hence, when the voltage greater than 2.1V is applied, the liquid crystal molecules 4' twist as shown in FIG. 24(d)). The liquid crystal molecules 4' twist 300 degrees in the opposite direction to a rotary direction of the molecules 4' without an applied voltage. The liquid crystal molecules 4' in the middle of twist, for example, the liquid crystal molecules 4' twisted 180 degrees, look like bend orientation as shown in FIG. 24(c), when seen in a cross-sectional view. It is therefore considered that this twisted state easily transitions to the bend orientation.

The voltage at which the liquid crystal molecules 4' are easily twist-transformed rather than transformed in the cell thickness direction 84 is lower than the voltage for direct transition from the spray to the bend orientation. Hence, the liquid crystal molecules 4' bring about spray to bend transition at lower voltages. The transitioned liquid crystal molecules 4' becomes the nucleus, causing the spray to bend transition to proceed. Consequently, the spray to bend transition easily takes place.

Figure 25:
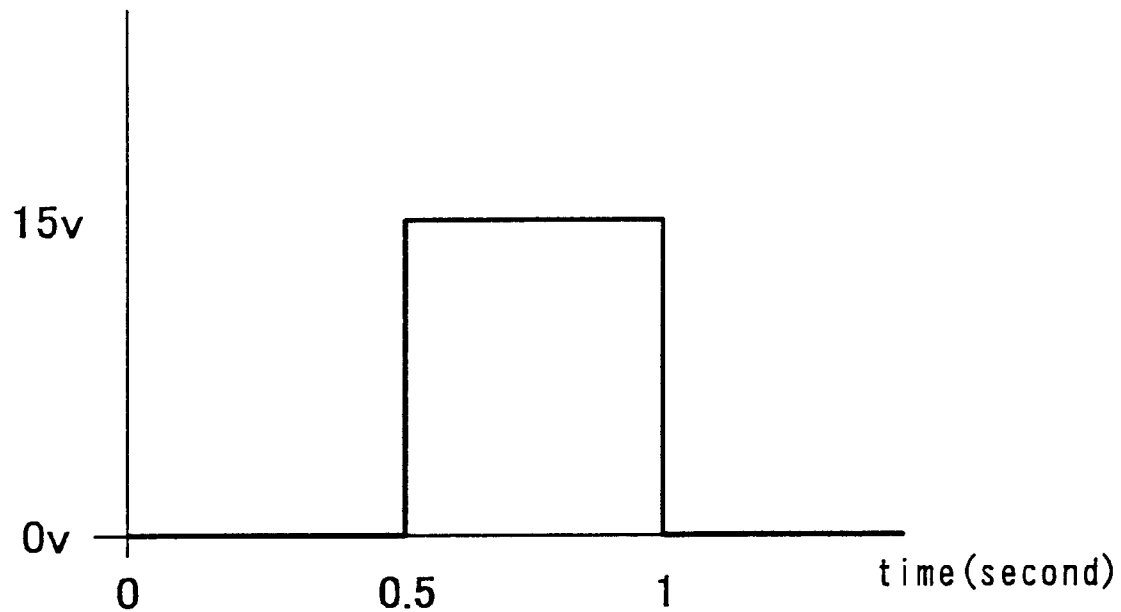
FIG. 25 is a view showing a waveform of a transition voltage used for transitioning the liquid crystal display element of FIG. 19.

The above-described effects will be explained in specific. FIG. 25 is a view showing a waveform of a transition voltage used for transitioning the liquid crystal display element E. When a one-pulse square wave voltage (FIG. 25) having a voltage value of 15V and a pulse width of 0.5 second is applied to the liquid crystal element E, the liquid crystal display element E transitions from the spray orientation to the bend orientation. According to study of the inventors, conventionally, the transition voltage of approximately 25V is necessary. This means that the liquid crystal display element E can be transitioned at an extremely low voltage and in a very short time as compared to the conventional liquid crystal display element. The square voltage in FIG. 25 may be applied several times. The use of the square voltage allows the element E to be reliably transitioned even at a temperature of −10° C.

Figure 26:
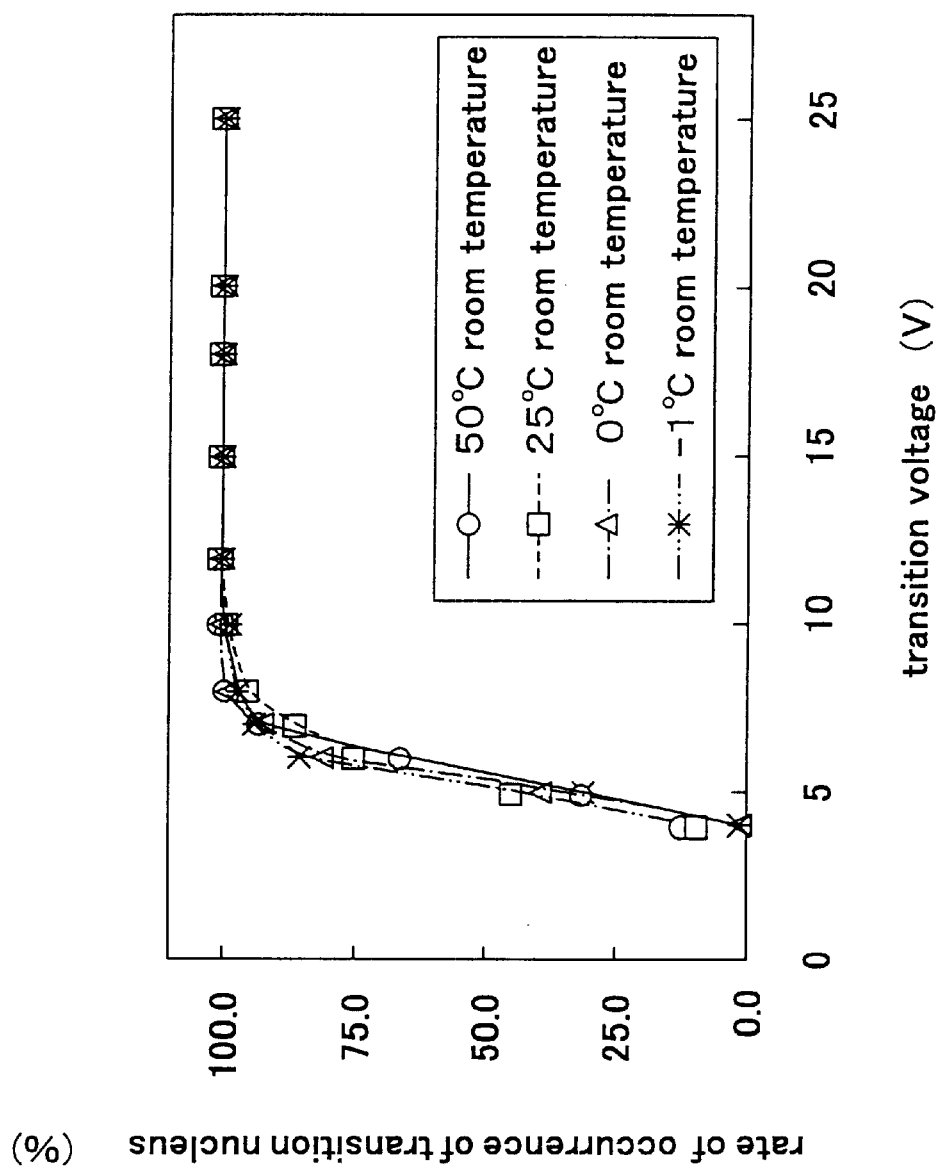
FIG. 26 is a view showing change of a rate of occurrence of a transition nucleus with respect to a transition voltage.
Figures 27A, 27B:
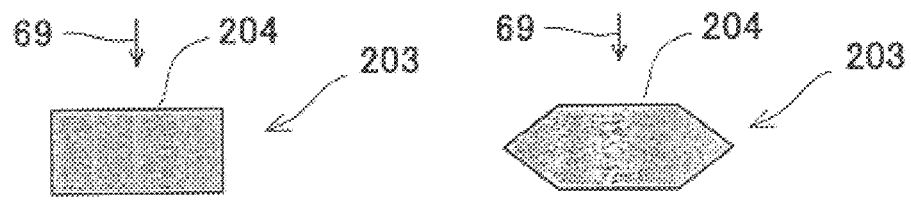
FIGS. 27(a)–27(i) are plan views showing a modification of the complex column spacer.
Figures 27C, 27D:
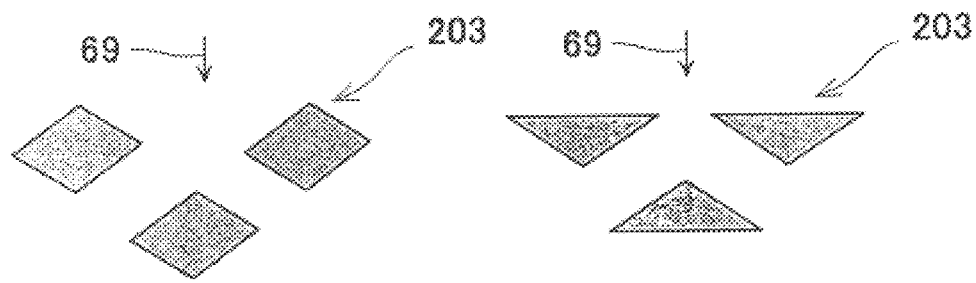
Figure 27E:
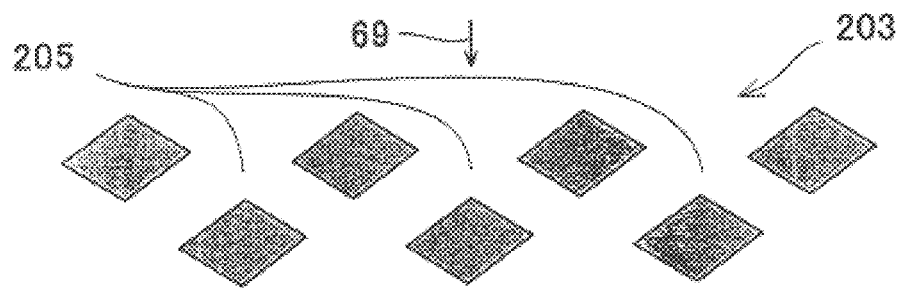
Figure 27F:
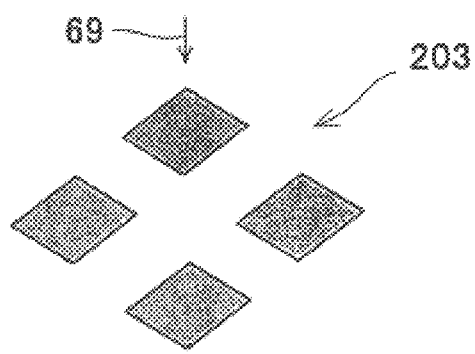
Figure 27G:
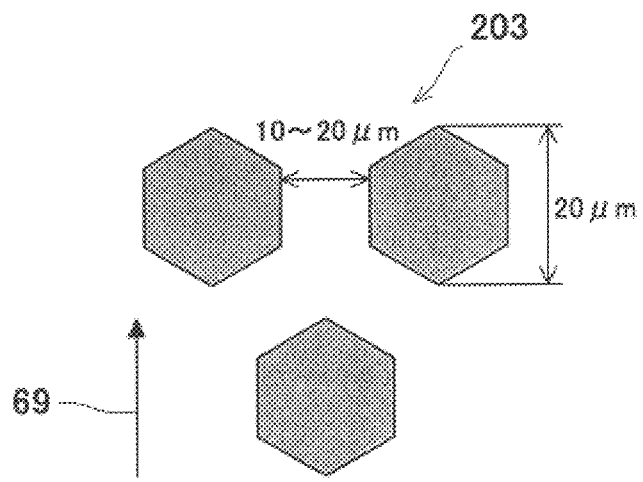
Figure 27H:
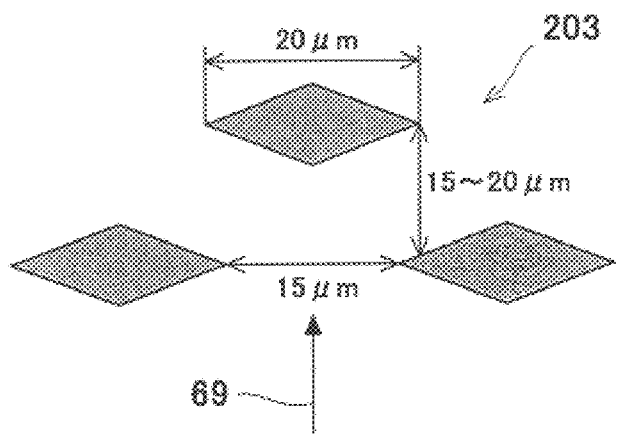
Figure 27I:
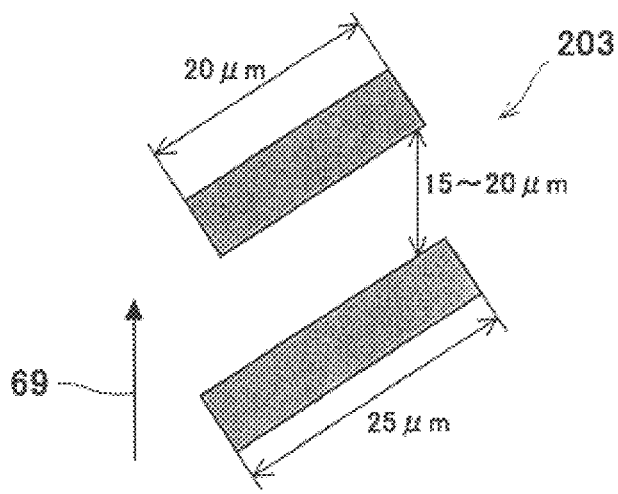

FIG. 26 is a view showing change of a rate of occurrence of the transition nucleus with respect to the transition voltage. Shown in FIG. 26 is the change of the rate of occurrence of the transition nucleus in a pixel with the transition voltage changed, and at temperatures of −10° C., 25° C. (room temperature), and 50° C. As can be seen in FIG. 26, the rate of occurrence of the transition nucleus is 100% at a transition voltage of about 10V or more irrespective of temperatures. This fact shows that by the application of the transition voltage of about 10V, the transition reliably takes place and the occurrence of the point defect per pixel is avoided. Also, since the transition nucleus is generated at 4V, the transition occurs at 4V if much time is taken.

Subsequently, a modification of a liquid crystal display device according to this embodiment will be explained.

The complex column spacer has the configuration shown in FIG. 21 in the above structure, but the configuration of the complex column spacer is not limited to this and may be as shown in FIG. 27. FIGS. 27(a)–27(i) are plan views showing modifications of the complex column spacer. The complex column spacers 203 shown in FIGS. 27(a), 27(b) are each constituted by a single column spacer and have cross sections having sides perpendicular to the rubbing direction 69. Since the actual rubbing direction (alignment treatment direction) is laterally divided in the vicinity of the sides 204 perpendicular to the rubbing direction 69 of the column spaces 203, the transition nucleus is generated in the vicinity of the sides 204, causing transition to occur at a high speed. The complex column spacer 203 in FIG. 27(c) differs from the complex column spacer of FIG. 22 in that the respective column spacers have the same rhombic cross sections. The complex column spacer 203 in FIG. 27(d)) is constituted by column spacers each having a triangular cross section. Basically, the column spacers of this embodiment need to have cross sections having inclinations oblique or lateral with respect to the rubbing direction 69 in order to control the alignment treatment direction. The complex column spacer of FIG. 27(e) is configured such that the complex column spacer of FIG. 27(c) is laterally repeated. With such configuration, there are formed a number of areas 205 where rubbing collides from right and left sides. Hence, portions where the clockwise twist areas and the counter-clockwise areas are contact with each other are efficiently formed in the areas 205, thereby facilitating the occurrence of the transition nucleus. The complex column spacer 203 of FIG. 27(f) is configured such that four column spacers having rhombic cross sections are disposed to be adapted to respective vertexes of imaginary rhombuses each having a diagonal line parallel to the rubbing direction 69. A complex column spacer 203 of FIG. 27(g) is constituted by a plurality of column spacers having cross sections of apparently circular shapes or apparently circular polygons. A complex column spacer 203 of FIG. 27(h) has shapes and placement of column spacers similar to those of the complex column spacer 203 of FIG. 21. A complex column spacer 203 of FIG. 27(i) is configured such that a plurality of (two) column spacers having rectangular cross sections are placed in parallel with each other and are inclined with respect to the rubbing direction 69 so that linear side faces of the column spacers seen in a plan view are arranged as being inclined with respect to the rubbing direction 69. The illustrated examples of FIGS. 27(g)–27(i) have typical dimensions. When the complex column spacers 203 have such dimensions, transition of the liquid crystal preferably takes place. The rubbing direction 69 may be reversed in FIGS. 21, and 27(a)–27(i).

Figure 28:
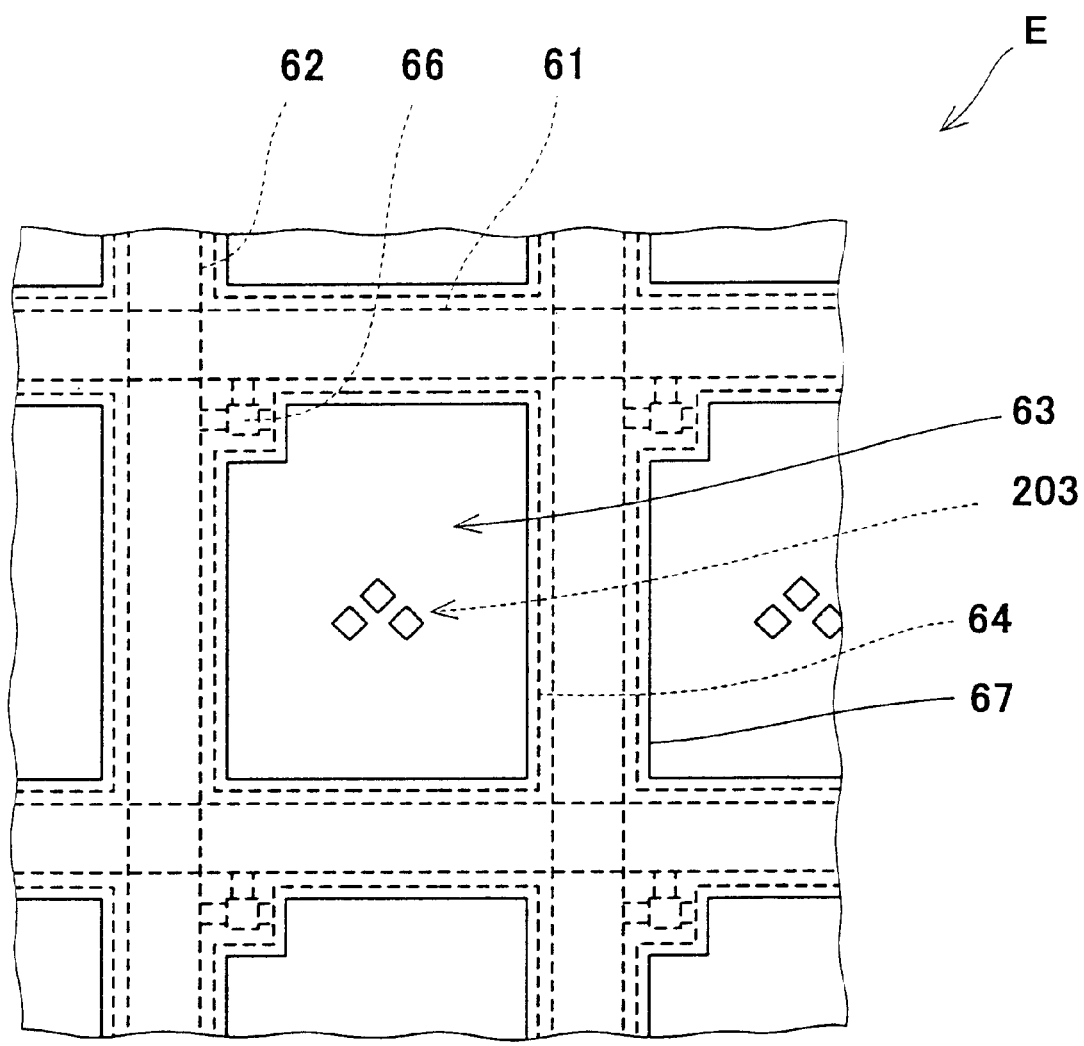
FIG. 28 is a plan view schematically showing a modification in which the complex column spacer is formed on a pixel electrode.
Figure 29:
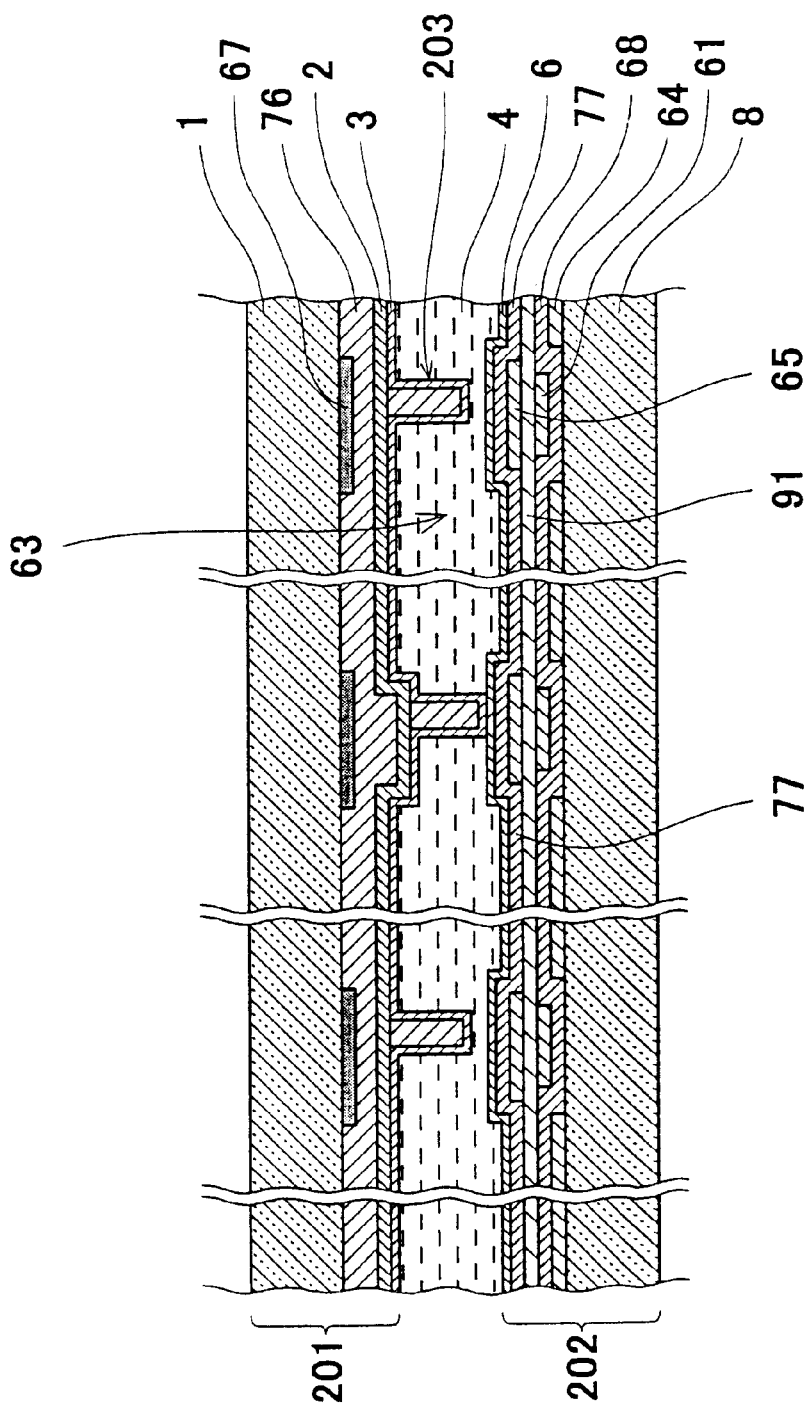
FIG. 29 is a cross-sectional view showing a modification in which the complex column spacer is formed on a color filter substrate by utilizing steps of color filters.

While the complex column spacer 203 is formed on the electrode 65 as described above, it may be formed on the pixel electrode 64 as shown in FIG. 28.

While the complex column spacer 203 is formed on the TFT substrate 202 by utilizing the convex and concave portions thereof, they may be formed on the color filter substrate 201 by utilizing steps of the color filter 76. The steps of the color filter 76 can be formed by or without overlapping respective color filter layers on the black matrix 67 when forming color filters of R, G and B.

Figure 30:
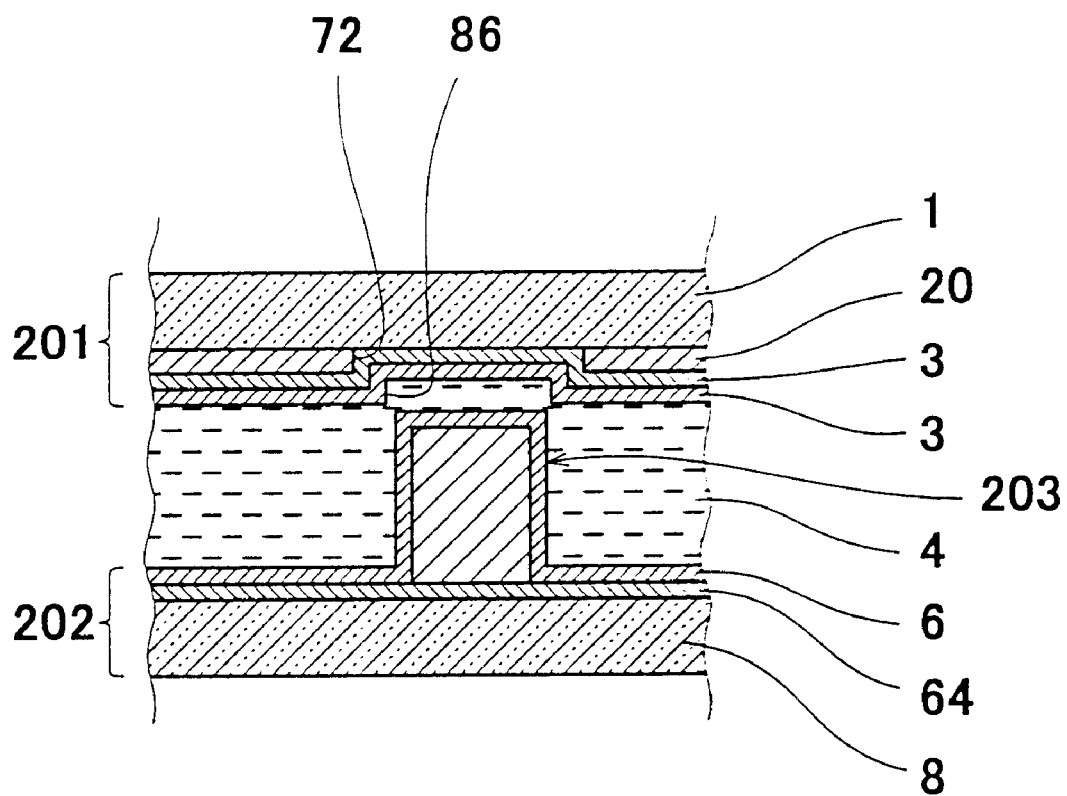
FIG. 30 is a cross-sectional view showing a modification in which a concave portion is formed on the color filter substrate to prevent the complex column spacer from abutting with the color filter substrate.

While the portion of the TFT substrate 202 where the complex column spacer 203 is to be formed is lowered so that the complex column spacer 203 does not abut against the opposite substrate 201, a concave portion 86 may be formed in a portion of an inner surface of the color filter substrate 201 that is opposite to a tip end of the complex column spacer 203 so that the complex column spacer 203 does not abut against the color filter substrate 201 as shown FIG. 30. The concave portion 86 may be formed by forming the photoresist layer 20 on the glass substrate 1, forming the concave portion 72 in the photoresist 20, and sequentially forming the counter electrode 2 and the alignment layer 3 thereon, by using the photolithographic method. While the complex column spacer 203 is formed on the pixel electrode 64 in this embodiment, it is obvious that the concave portion 86 can be formed in the same manner when the complex column spacer 203 is formed on the electrode 65. When the complex column spacer 203 is formed on the color filter substrate 201, a concave portion is formed in a portion of the inner surface of the TFT substrate 202 that is opposite to the tip end of the complex column spacer 203 so that the complex column spacer 203 does not abut against the TFT substrate 202. Also in this case, the concave portion may be formed as described above.

While the liquid crystal display element E is of an active matrix type in the above structure, the type of the substrates may be arbitrary because the aim of the present invention is to provide the complex column spacers for controlling rubbing on the substrate. The present invention is applicable to substrates of other types such as a passive matrix type.

Embodiment 3

In a third embodiment of the present invention, a liquid crystal display element is configured as including column spacers which are not contact with the opposite substrate.

In the second embodiment, the liquid crystal display element includes the complex column spacer 203 that is not contact with the opposite substrate. The formation of such a column spacer is not limited to a case where the transition nucleus is formed. In other words, this configuration is essential to the formation of a number of transition nucleuses like the present invention and is also effective when a column spacer is ordinarily formed for a plurality of pixels. In general, when spacer beads are dispersed in a space between substrates, the substrates are elastically deformed with efficiency because of a particle diameter distribution of the spacer beads. However, the column spacers are generally formed with uniform heights. For this reason, bubbles tend to be generated at low temperatures. So, with the heights of the column spacers fixed, convex and concave portions are formed on the substrate to have a distribution of efficient heights of the column spacers according to the convex and concave portions. Thereby, the number of the column spacers contact with the substrate substantially at a room temperature is reduced and the problem associated with the bubble at low temperatures can be solved. The aim of this embodiment is that there exist column spacers which are not contact with the opposite substrate. substantially at a room temperature.

Embodiment 4

Figure 31:
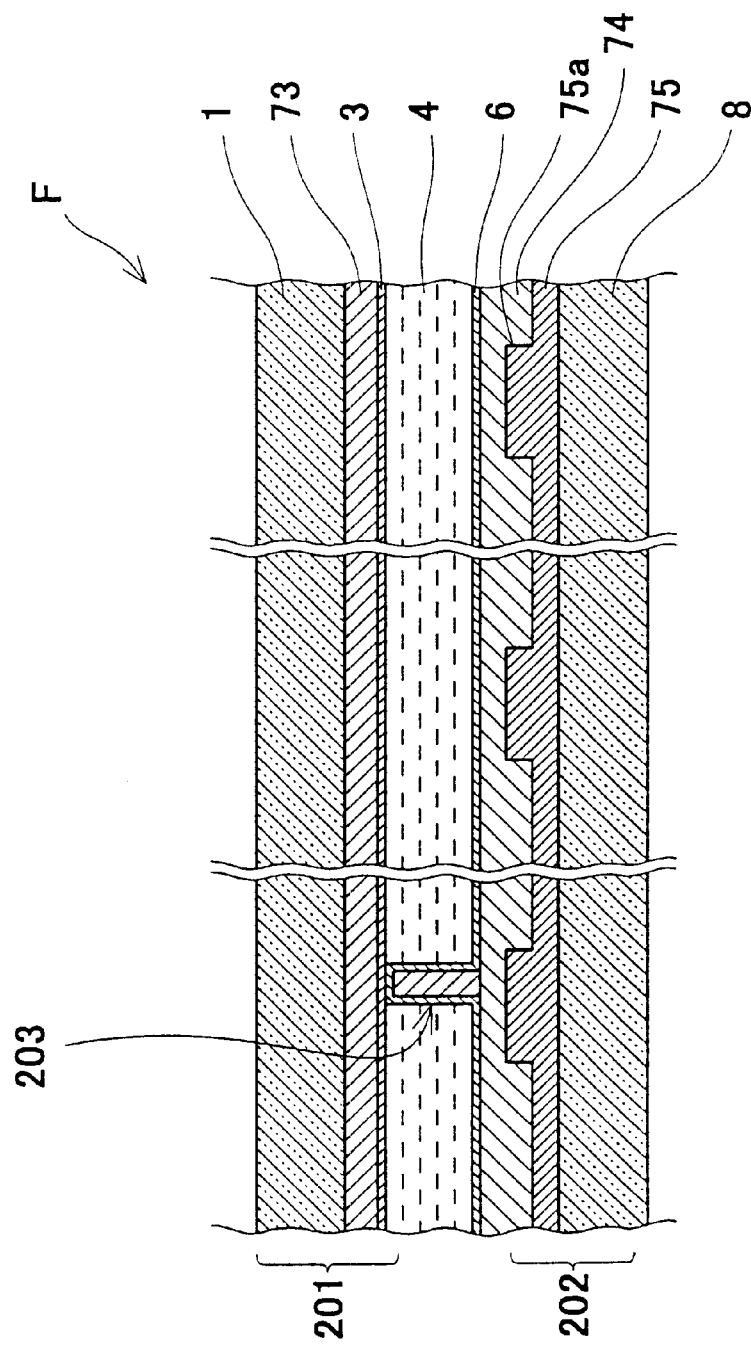
FIG. 31 is a cross-sectional view schematically showing a structure of a liquid crystal display element according to a fourth embodiment of the present invention.

In a fourth embodiment of the present invention, the complex column spacer 203 is provided only for a part of a plurality of pixels unlike the second embodiment. Referring to FIG. 31, reference numeral 73 denotes a layer constituted by a black matrix, a color filter, a counter electrode, and the like, and reference numeral 75 denotes a wiring layer constituted by a source line, agate line, a pixel electrode, an electrode, an insulating layer, and the like. The TFT substrate 202 includes a flattening layer 74 made of resin such as acryl-based resist such that it covers a surface of the wiring layer 75, and the complex column spacer 203 (one spacer is shown in FIG. 31) is formed on the flattening layer 74. The complex column spacer 203 is provided only for the pixel 63. The other respects are identical to those of the second embodiment. The provision of the complex column spacer 203 only for the pixel 63 requires that the spray to bend transition occurring around the complex column spacer 203 be grown over the pixels 63. For this purpose, the substrates 201, 202 need to have flattened surfaces. However, in a normal array substrate (TFT substrate) 202, convex and concave portions 75a of approximately 1 μm at maximum are sometimes present on the wiring layer 75. Accordingly, in this embodiment, the flattening layer 74 is formed to offset the convex and concave portions 75a on the surface of the wiring layer 75 by means of the resin to thereby reduce the convex and concave portions on the inner surface of the array substrate 202. Consequently, the spray to bend transition easily proceeds over the pixels.

Embodiment 5

In a fifth embodiment of the present invention, an area alignment-treated in a direction different from an alignment treatment direction of a surrounding area is locally formed by photo-orientation. The aim of the present invention is to form the twist-oriented area, and a method for an alignment treatment may be arbitrary. Hence, when the twist-oriented area is formed by photo-orientation, the same effect is obtained. For instance, when the alignment treatment shown in FIG. 22 is performed by photo-orientation, the same effects are obtained like the second embodiment. It should be remembered that the alignment layer of the substrate to be subjected to the photo-alignment treatment must be constituted by an photo-alignment layer. The other respects are identical to those of the second embodiment.

Embodiment 6

In a sixth embodiment of the present invention, a liquid crystal display device is constructed by using the liquid crystal display element according to the second embodiment.

Figure 32:
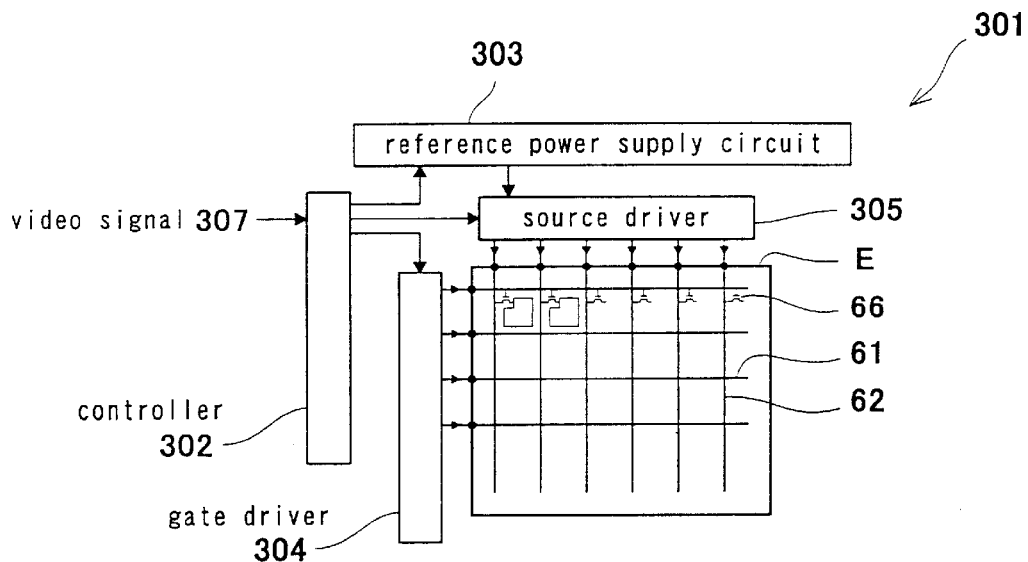
FIG. 32 is a block diagram schematically showing a structure of a liquid crystal display device according to a sixth embodiment of the present invention.

As shown in FIG. 32, a liquid crystal display device 301 according to the six embodiments comprises the liquid crystal display element E of the second embodiment, a source driver 305 and a gate driver 304 for driving the liquid crystal display element E, a reference power supply circuit 303 for supplying a reference voltage to the source driver 305, and a controller 302 that receives a video signal 307 as an input, outputs the video signal 303 to the source driver 305 and controls the reference power supply circuit 303, the gate driver 304, and the source driver 305. That is, a power supply only for transition is not provided.

Subsequently, a transition operation of the liquid crystal display element 301 so constructed will be explained. As described in the second embodiment, the liquid crystal display element E gives rise to transition when a transition voltage not less than 4V is applied. It should be remembered that transition time depends on the transition voltage. A driving voltage of the liquid crystal display device 301 of this embodiment is 6V at maximum. When this driving voltage is applied, the liquid crystal display device E is surely to transition. Actually, when the liquid crystal display device 301 was turned ON, the liquid crystal display element E, which was experiencing only the driving voltage being applied, transitioned. After the liquid crystal display device 301 was turned ON, a normal video signal continued to flow in the liquid crystal display element E, and transition was almost completed in about 10 seconds. That is, in the liquid crystal display device 301 of this embodiment, without applying the special waveform shown in FIG. 25 or a transition voltage having a value higher than that of the driving voltage, it is possible to transition the liquid crystal display element E by continued application of the driving voltage having the normal driving waveform and the maximum value of 6V. Consequently, cost can be significantly reduced without the necessity of providing the power supply only for transition.

While the liquid crystal display element is constituted by the element that transitions at 4V, this may be the element that transitions at 10V or less because the driving voltage of the liquid crystal display element of the liquid crystal display device is approximately 10V at maximum.

Embodiment 7

Figure 33:
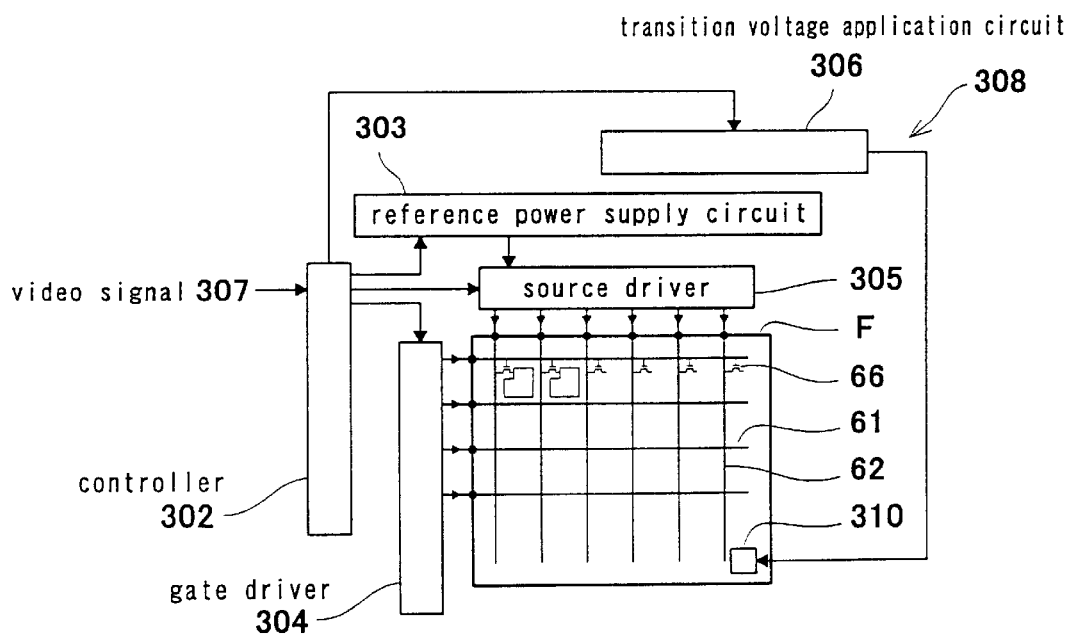
FIG. 33 is a block diagram schematically showing a structure of a liquid crystal display device according to a seventh embodiment of the present invention.

In a seventh embodiment of the present invention, a liquid crystal display device includes a power supply only for transition. Referring to FIG. 33, a liquid crystal display device 308 of this embodiment differs from that of the sixth embodiment in that it includes the liquid crystal display element F of the fourth embodiment as the liquid crystal display device. A pair of transition voltage application electrodes 310 are provided on the color filter substrate and TFT substrate of the liquid crystal display element F. The complex column spacer 203 shown in FIG. 31 is formed on one of the pair of transition voltage application electrodes 310. The pair of transition voltage application electrodes 310 are connected to a transition voltage application circuit 306 which is controlled by the controller 302. The other respects are identical to those of the sixth embodiment.

In the liquid crystal display device 308, prior to display of video, a predetermined transition voltage is applied to the pair of electrodes 310 under control of the controller 301, causing the liquid crystal display element F to transition. In this case, the liquid crystal display element F transitions at a lower voltage and in a shorter time as compared to the conventional element because the twist-orientated area is locally formed.

Embodiment 8

In the second embodiment, the spray to bend transition is reliably performed by locally controlling the rubbing direction. In an eighth embodiment of the present invention, this transition process is studied more carefully to reliably generate a transition nucleus.

Figure 34A:
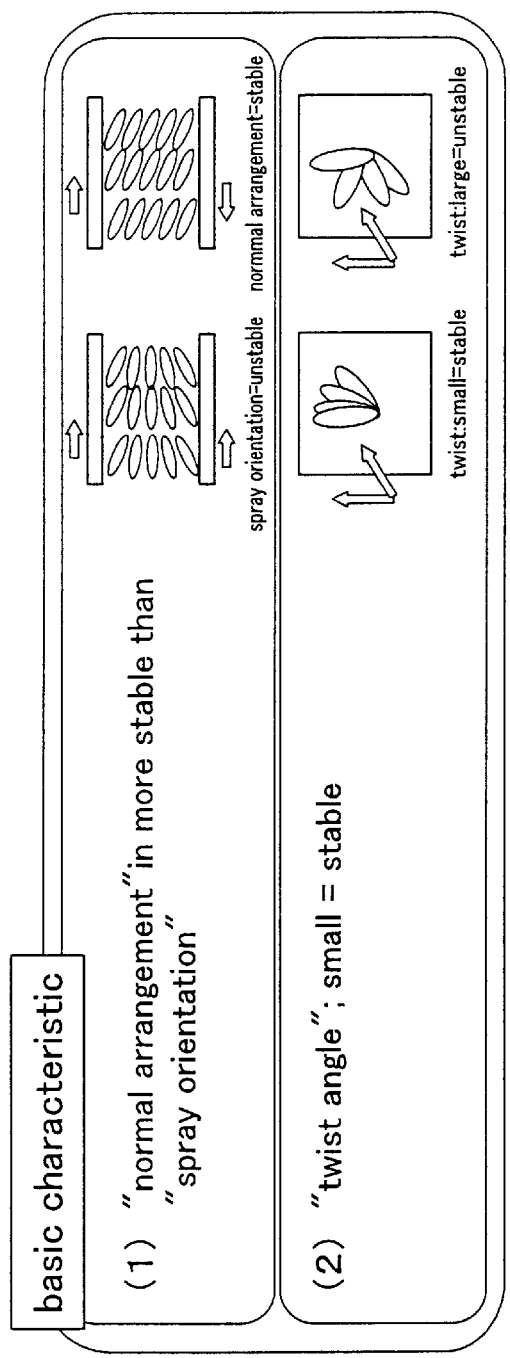
Figure 34B:
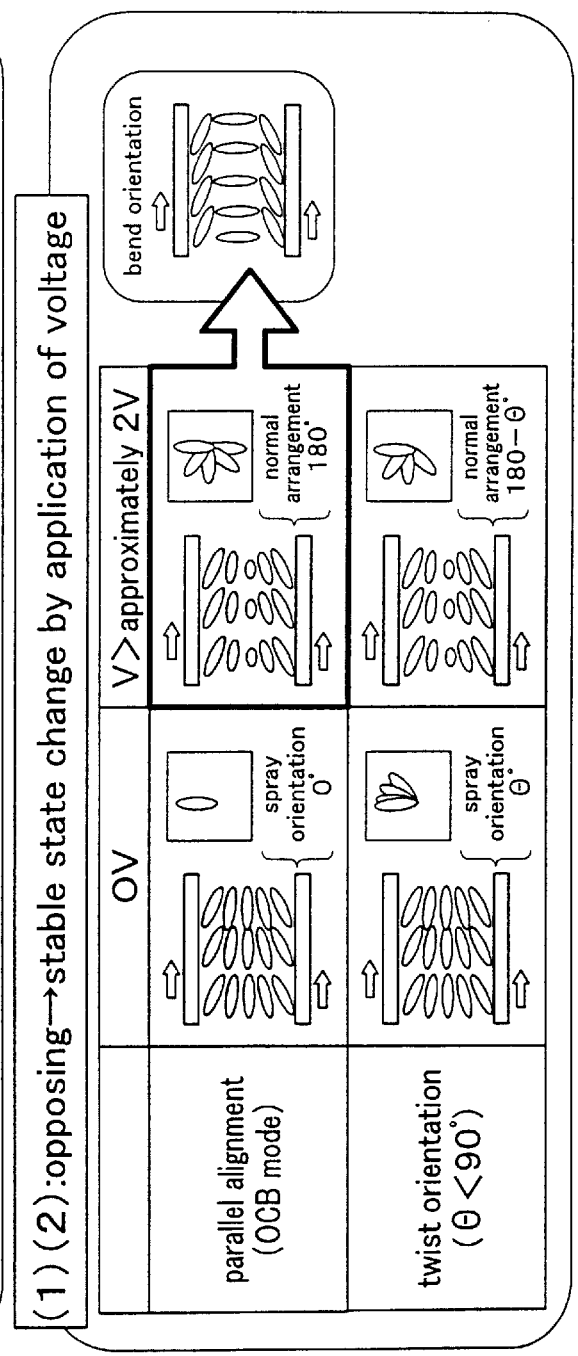
Figure 35A:
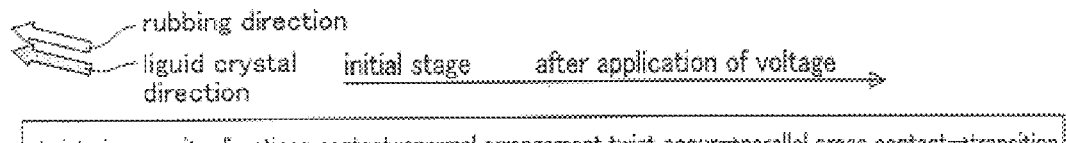
Figure 35B:
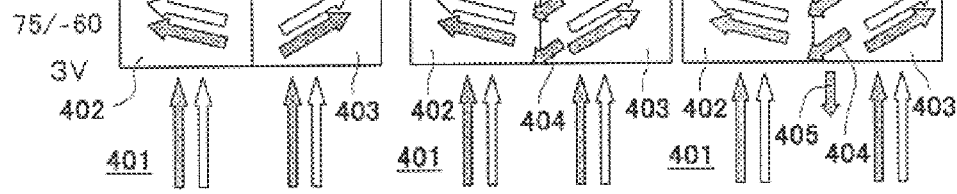
Figure 35C:
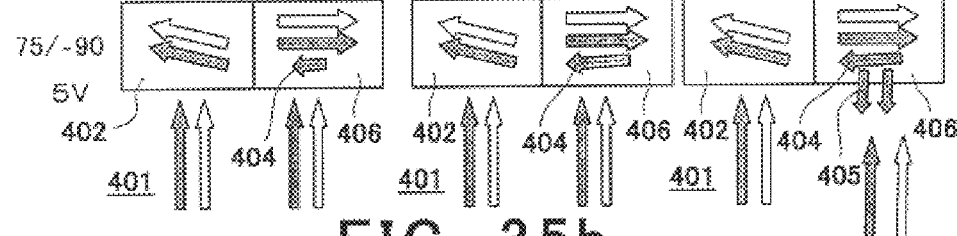

FIGS. 34(a) and 34(b) are conceptual views showing a stability condition of a liquid crystal of a liquid crystal display element, wherein FIG. 34(a) is a view showing a basic stability condition of the liquid crystal and FIG. 34(b) is a view showing a stability condition of the liquid crystal in parallel orientation and in twist orientation. FIGS. 35(a)–35(c) are conceptual views schematically showing a process for spray to bend transition of a liquid crystal display element in which twist-oriented areas are locally formed, wherein FIG. 35(a) is a view showing a case where two twist-oriented areas in opposite directions are contact with each other, FIG. 35(b) is a view showing a case where a twist angle of one of two twist-oriented area is 90 degrees, FIG. 35(c) is a view showing a case where a twist angle of one of two twist-oriented areas is 90 degrees or larger, and FIG. 35(d)) is a view showing a case where two twist-oriented areas in the same direction are contact with each other.

As shown in FIG. 34(a), a liquid crystal basically prefers a normal arrangement state in which an inclination angle with respect to a substrate is not changed and a state in which the liquid crystal is less twist-transformed. A typical example of a state in which these conditions are opposite to each other is the parallel orientation state. In the orientation with a twist angle of 90 degree or smaller, a stability condition of the liquid crystal is basically the same as the parallel orientation state.

As shown in FIG. 34(b), in the parallel orientation state, the spray orientation with the twist angle of zero degree is energetically stable without an applied voltage. When the voltage of approximately 2V or more is applied, the normal arrangement state with the twist angle of 180 degrees is energetically stable. It is confirmed that the twist of 180 degrees becomes stable by application of the voltage and the stable state continuously transitions to the bend orientation. It is therefore necessary to form the twist state of 180 degrees transiently. In actuality, however, even if the liquid crystal is changed into a state in which twist state of 180 degrees becomes energetically stable by application of the voltage, the liquid crystal is not easily transformed into the twist state of 180 degrees. This is because a nucleus for transition is needed due to a large structural change. The aim of the present invention is to reliably form the nucleus for transition. In case of a spray twist orientation with the twist angle of 90 degrees or smaller, the twist angle at which it becomes energetically stable upon application of the voltage at approximately 2V or more is 180-θ (θ: twist angle) and the other respects are basically identical to those of the parallel orientation.

FIG. 35(a) is a view showing a case where the complex column spacer is formed like the second embodiment, in which case the transition occurs through the following process.

As shown in FIG. 35(a), suppose that a clockwise twist state area 403 (twist angle=−60 degrees) and a counter-clockwise twist state area 402 (twist angle=75 degrees) are formed and are contact with each other. Reference numeral 401 denotes a parallel-oriented area, and white and black arrows indicate a rubbing direction and a direction of the liquid crystal molecules, respectively. On application of the voltage, the area 403 with clockwise twist in an initial stage becomes stable with a counter-clockwise twist of a larger twist angle. Without the nucleus, it is impossible to transition to this state. The clockwise twist area 403, when the counter-clockwise twist area 402 is in contact with it from the beginning, transition to the counter-clockwise twist with the area 402 serving as the nucleus, causing the normal arrangement twist 404 to be generated. Hence, a defect is observed between the clockwise twist area 403 and the counter-clockwise twist area 402, and movement of the defect toward one of these areas is observed.

Further, since the parallel-oriented area 401 outside of the area 403 and the normal arrangement twist 404 with a larger twist angle are brought into contact with each other, the normal arrangement twist 404 becomes the nucleus, causing the bend transition 405 to occur in the parallel-oriented area 401.

Figure 35D:
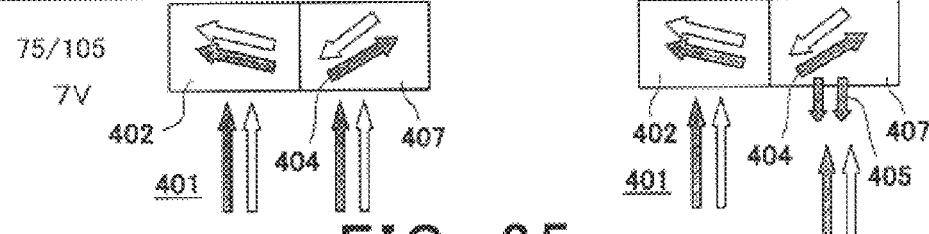

Thus, it is found that when the clockwise twist area 403 and the counter-clockwise twist area 402 are contact with each other, the area 402 becomes the nucleus, causing the transition. With the twist angle of 90 degrees or smaller, the transition voltage can be lowered. For instance, when the twist angle is 90 degrees, the transition voltage is 5V, while when the twist angle is 60 degrees, the transition voltage is 8V. As shown in FIG. 35(d)), the formation of two types of spray twists in the same rotary direction contributes less to the formation of the transition nucleus.

The observation is conducted with a larger twist angle. As shown in FIG. 35(b), when a twist angle of an area 406 of two twist areas 402, 406 contact with each other is 90 degrees, two twist states in opposite directions coexist in the area 406 in an initial stage. On application of the voltage, the normal arrangement twist 404 is grown and is contact with the parallel-oriented area 401 outside of the area 404, and the contact portion becomes the nucleus, causing the bend transition 405 to occur.

As shown in FIG. 35(c), a twist angle of an area 407 of two twist areas 402, 407 contact with each other is 90 degrees or larger (in this case 105 degrees), the normal arrangement twist 404 is stable in an initial stage and becomes the nucleus, causing the bend transition 405 to occur. Consequently, when forming the area with the twist angle of 90 degrees or larger, it is not necessary to form two twist areas. It should be noted that the voltage required for transition is 5V when the twist angle is 90 degrees and is 7V when the twist angle is 105 degrees.

Subsequently, a method for forming the above-described twist-oriented area will be explained. As shown in FIG. 35(a), the clockwise twist area and the counter-clockwise twist area, which are contact with each other, are locally formed in a parallel-oriented area by forming the complex column spacer on the substrate and performing rubbing thereon as described in the second embodiment.

As shown in FIGS. 35(b) and 35(c), it was impossible to form the twist-oriented area with the twist angle of 90 degrees or larger in the parallel-oriented area by one alignment treatment described in the above embodiments. Accordingly, the inventors have discovered that the twist-oriented area can be formed by performing rubbing on the substrate having the column spacer twice. This will be described with reference to FIG. 36.

Figure 36A:
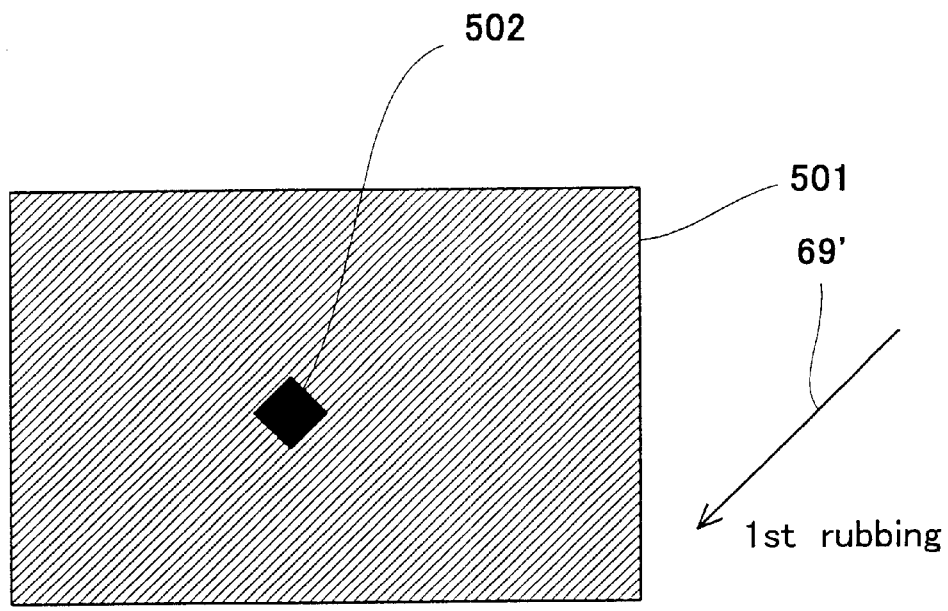
Figure 36B:
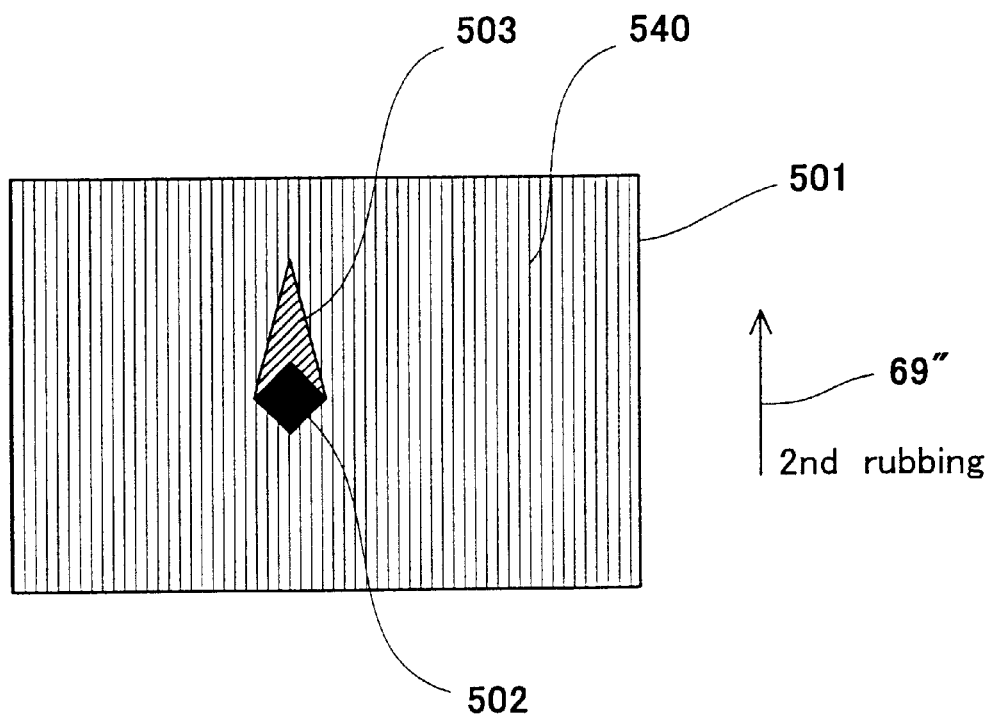

FIGS. 36(a) and 36(b) are plan views showing an alignment treatment of a substrate of a liquid crystal display element according to the eighth embodiment of the present invention, wherein FIG. 36(a) is a view showing a state after first rubbing and FIG. 36(b) is a view showing a state after second rubbing. As shown in FIG. 36(a), the first rubbing is performed on a substrate 501 having a column spacer 502 in a direction 69' inclined at an angle of 90 degrees or larger (in this case approximately 135 degrees in a counter-clockwise direction) with respect to a reference direction 69", i.e., an alignment treatment direction of a pair of substrates between which the liquid crystal is sandwiched, and as shown in FIG. 36(b), the second rubbing is then performed in the reference direction 69". Since the second rubbing is not performed on a shade area 503 of the column spacer 502, the alignment treatment by the first rubbing is left thereon. This makes it possible to form a twist-oriented area 503 with the twist angle of 90 degrees or larger in the parallel-oriented area 504.

When forming the twist-orientated area with the twist angle of 90 degrees or larger, addition of some chiral agent to the liquid crystal is effective. In general, without the addition of the chiral agent, it is difficult to form the twist-oriented area of 90 degrees or larger. It is also difficult to form the same if the ribbing process is performed several times. As described above, the twist-oriented area of 90 degrees or larger becomes the transition nucleus. The addition of the chiral agent makes the orientation state in a specific rotary direction stable. For instance, the addition of a clockwise chiral agent makes the clockwise twist-oriented stable and even the twist-oriented area of 90 degrees or larger is stable. Thus, the chiral agent is effective in forming the twist-oriented area of 90 degrees or larger.

When the liquid crystal display element described in the second embodiment is created by using the substrate alignment-treated by the above method, the transition nucleus from the spray orientation to the bend orientation is reliably generated. Consequently, the liquid crystal display element that facilitates the spray to bend transition is obtained.

Embodiment 9

In a ninth embodiment of the present invention, an alignment layer is scratched to form different types of orientation direction areas contact with each other.

Figure 37:
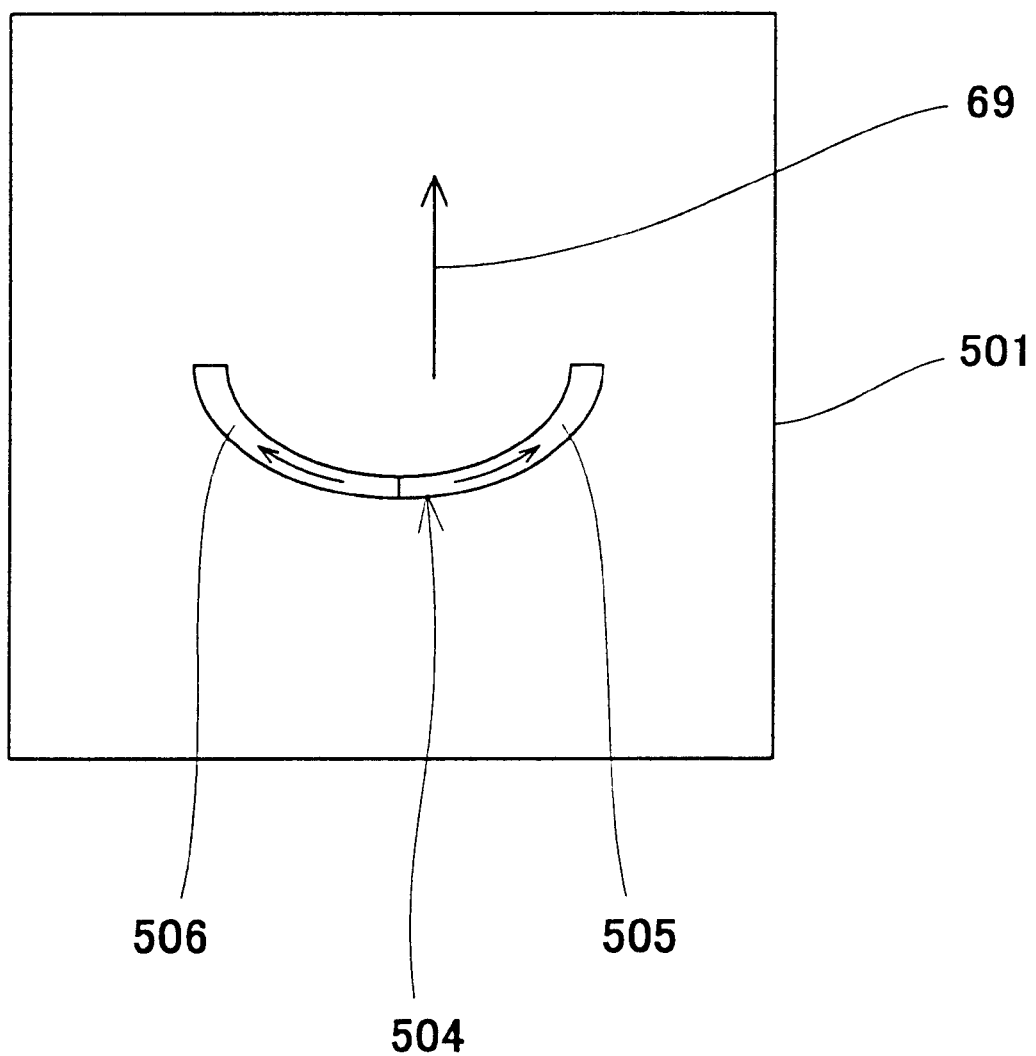
FIG. 37 is a plan view schematically showing an alignment treatment of one substrate of a liquid crystal display element according to a ninth embodiment of the present invention.

FIG. 37 is a plan view schematically showing an alignment treatment of a substrate of a liquid crystal display element according to a ninth embodiment of the present invention.

In FIG. 37, a substrate 501 of the liquid crystal display element of the ninth embodiment has an alignment layer (not shown) formed on a surface layer portion thereof and a scratch 504 is formed on a surface of the alignment layer such that it is curved in a rubbing direction 69. The scratch 504 is formed by scratching as shown in the Figure by means of an erected needle on the substrate 501. The method for forming the scratch 501 is not limited to this. For example, a surface of the substrate 504 may be irradiated with a pulsed laser beam to remove a portion of the alignment layer, thereby forming the scratch.

When the opposite substrate is parallel-alignment treatmented in so structured liquid crystal display element, liquid crystal molecules situated on the scratch 504 of the substrate 501 are oriented in directions indicated by arrows of FIG. 37. In other words, a counter-clockwise twist area 506 and a clockwise twist area 505 are formed in the scratch 504 with its central portion being a boundary between the areas 506 and 505. The formation of the counter-clockwise twist area 506 and the clockwise twist area 505 as being contact with each other allows the transition nucleus to be reliably generated as described in the eighth embodiment. In this embodiment, the transition occurs from the boundary between the counter-clockwise twist area 506 and the clockwise twist area 505 and the spray to bend transition takes place easily. The scratch herein refers to a state in which the alignment layer partially lacks. To form the scratch, the alignment layer may be removed by etching by using photoresist. Further, a liquid miscible in a specific solvent and a nonmiscible liquid may be mixed and emulsioned to be cured, followed by removal of one of the liquids by the solvent.

Embodiment 10

In a tenth embodiment of the present invention, a local alignment treatment is performed by photo-orientation to form a twist-oriented area with a twist angle of 90 degrees or larger.

Figure 38:
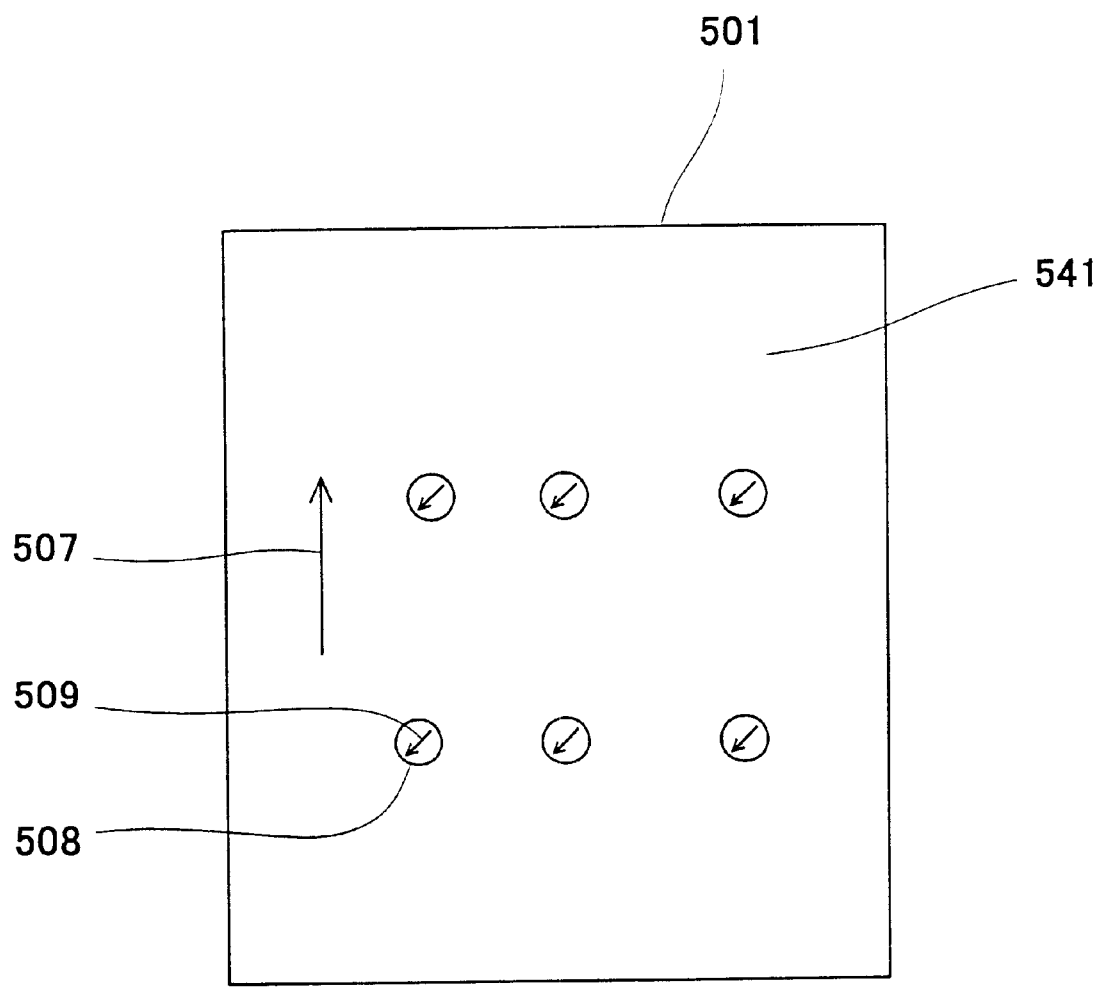
FIG. 38 is a plan view schematically showing an alignment treatment of one substrate of a liquid crystal display element according to a tenth embodiment of the present invention.

FIG. 38 is a plan view schematically showing an alignment treatment of a substrate of a liquid crystal display element of this embodiment.

Referring to FIG. 38, a substrate 501 of the liquid crystal display element has an alignment layer (not shown) formed on a surface layer portion, the alignment layer having photosensitivitive group. The surface of the alignment layer is subjected to alignment treatment such that circular twist-oriented areas 508 with a twist angle of 90 degrees or larger are scattered in a parallel-orientated area 541. The twist angle of the twist-oriented area 508 is about 135 degrees in a counter-clockwise direction in this embodiment. The circular twist-oriented areas 508 are formed on the substrate 501 such that they correspond to the black matrixes.

The alignment treatment is as follows. Initially, the alignment layer having photosensitive group is formed on the surface layer portion of the substrate 501. Then, the entire surface of the alignment layer is irradiated with a polarized ultraviolet ray to be alignment-treated in the reference direction (see description of FIG. 36 of the eighth embodiment). The plurality of circular areas 508 on the surface of the substrate 501 so alignment-treated by the polarized ultraviolet ray, corresponding to the black matrixes, are irradiated with the polarized laser beam. The irradiation of the polarized laser beam is performed in such a manner that an orientation direction 509 is inclined at approximately 135 degrees with respect to the reference direction 507 in a counter-clockwise direction. Thereby, the local twist-oriented areas 508 with the twist angle of 90 degrees or larger are formed. The twist-oriented areas 508 may be formed by irradiation while scanning the pulsed laser beam. Also, the twist-oriented areas 508 may be formed in such a manner that the surface of the substrate 501 is covered with a mask having openings corresponding to the twist-oriented areas 508 and irradiation of the polarized ultraviolet ray is given through the mask.

When the parallel alignment treatment is performed on the opposite substrate in so configured liquid crystal display element, the element has twist-oriented areas with the twist angle of 90 degrees or larger. Therefore, it is possible to reliably generate the transition nucleus as described in the eighth embodiment. Consequently, the spray to bend transition takes place more easily.

Embodiment 11

In an eleventh embodiment of the present invention, a desirable density of the transition nucleus will be shown.

The aim of the present invention is to form the transition nucleus. It should be remembered that when a substrate has convex and concave portions thereon, the transition sometimes stops due to the convex and concave portions. It is important to form a number of transition nucleuses in order to bring about transition reliably. It is desirable to form the transition nucleus for each pixel.

In view of practicality, it is desirable that the column spacer serve as the transition nucleus (in a precise meaning, a steric obstacle for forming a different orientation direction, area that will become a transition nucleus). In this case, the problem is that the formation of the transition nucleus comprising the column spacer for each pixel brings about excessive column spacers. The problem has been solved by utilizing the convex and concave portions provided on the substrate to reduce the column spacers abutting against the opposite substrate, which has been already described in the second embodiment. According to this method, the transition nucleus can be formed for each pixel without a problem and an ideal density of the transition nucleus can be thereby realized.

However, if the number of transition nucleuses is smaller, the fabrication cost can be reduced. Accordingly, after further study, the followings with regard to the density of the transition nucleus are found.

First, to obtain the effect of the present invention, it is not necessary to form the transition nucleus for each pixel but it is desirable to form the transition nucleus at a density of one or more transition nucleus for one hundred pixels.

Second, when the transition nucleus is formed at a density of one or more transition nucleus for ten pixels, it is possible to reliably transition the whole panel.

Third, while the transition nucleus is periodically formed on the substrate in the above-described embodiments including this embodiment, it is not necessarily to form the transition nucleus periodically. Rather, in the case of periodic formation of the transition nucleus on the substrate, when patterns for formation of the transition nucleuses are displaced in creation of the panel by using the photolithographic method, an image looks like moire in display operation of the completed liquid crystal display element. This problem has been solved by randomly forming the transition nucleuses on the substrate and randomly forming the patterns for formation of the transition nucleuses.

The liquid crystal display element of this embodiment meets the first to third conditions.

Embodiment 12

The growth of the transition over the pixels sometimes stops due to the convex and concave portions on the substrate, which has been described in the eleventh embodiment. In a twelfth embodiment of the present invention, a transition nucleus is formed on a source line not to impede or to facilitate the growth of transition over the pixels.

Figure 39:
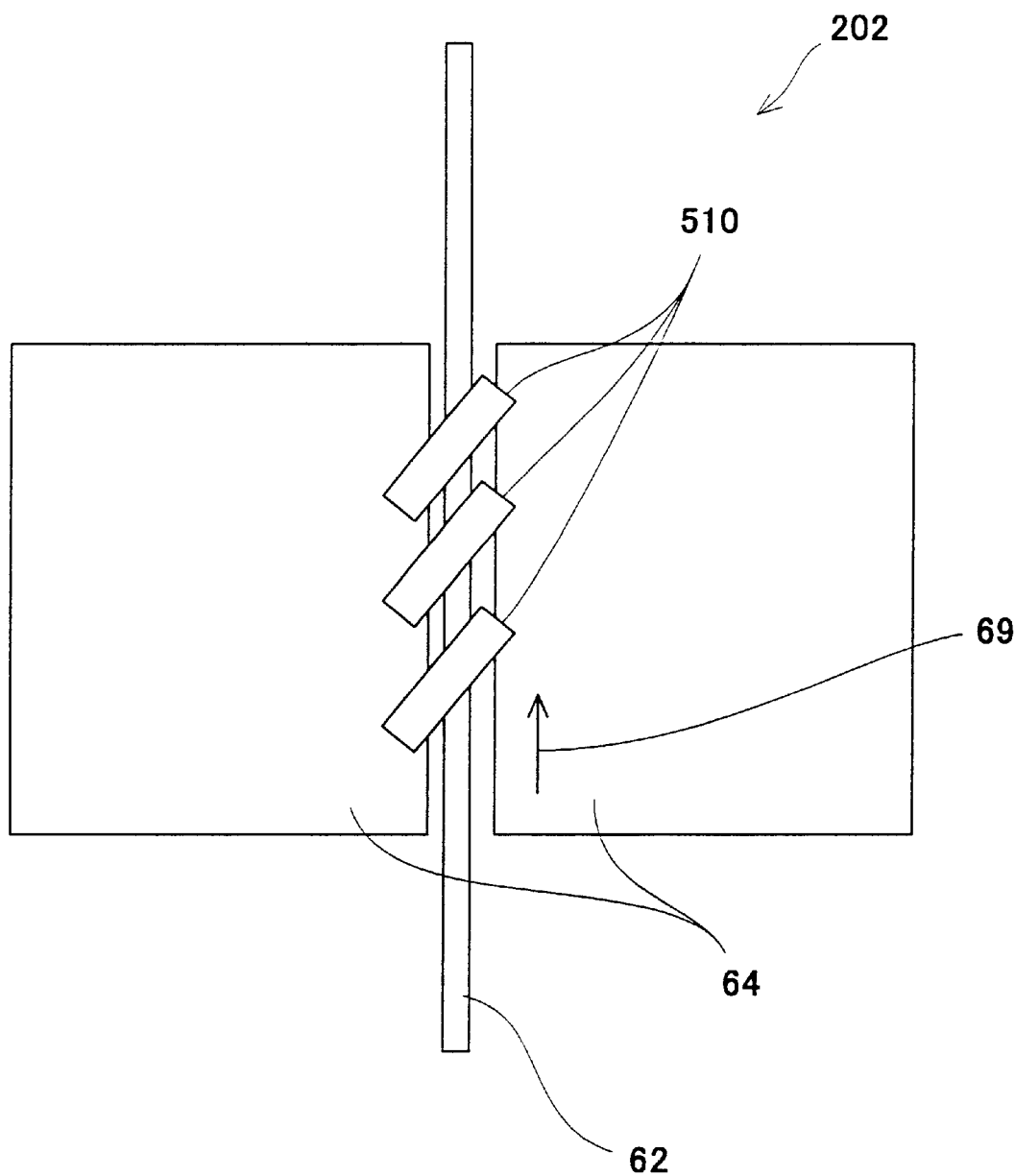
FIG. 39 is a plan view schematically showing a structure of an active matrix substrate of a liquid crystal display element according to a twelfth embodiment of the present invention.

FIG. 39 is a plan view showing a structure of an active matrix substrate of a liquid crystal display element according to the twelfth embodiment of the present invention.

Referring to FIG. 39, a plurality of steric obstacles 510 (in this embodiment, three) are provided on an active matrix substrate 202 at predetermined intervals in the direction in which the source line 62 extends such that they override the source line 62. The respective steric obstacles 510 are formed such that opposite ends of each of the obstacles 510 overlap two pixel electrodes 64 between which the source line 62 is sandwiched when seen in a plan view. The respective steric obstacles 510 are each constituted by a protrusion of a rectangular plate shape provided on the active matrix substrate 202. In this embodiment, the rubbing direction 69 is, as indicated by an arrow 69, the direction in which the source line 62 extends. The respective obstacles 510 are disposed close to one another so that a shade of rubbing is continuously generated and are disposed obliquely with respect to the rubbing direction 69 for easy flow of rubbing. The other respects are identical to those of the fourth embodiment.

In the liquid crystal display element so structured, it is confirmed that a defect, that is, a defect between two types of spray-oriented states (a boundary between an area having a center of spray orientation in the vicinity of one substrate and an area having a center of spray orientation in the vicinity of the other substrate) is trapped, and the growth of the transition over the pixels begins at the trapped defect and is facilitated. What is important in this embodiment is a mechanism for maintaining the defect.

As described in the fourth embodiment, to facilitate the growth of transition over the pixels, reduction of the convex and concave portions on the substrate is effective. Since the convex and concave portions on the substrate impede the growth of transition over the pixels, they are reduced by a flattening layer comprising a resin layer, thereby further facilitating the growth of the transition over the pixels.

Embodiment 13

In a thirteenth embodiment of the present invention, steric obstacles for controlling rubbing are formed by utilizing steps of an array structure of an array substrate without the use of column spacers.

In this embodiment, steps of 2 μm at maximum are formed in a process for forming an array of the array substrate. When the array substrate is subjected to alignment treatment, the steps are utilized to control rubbing, thereby forming a transition nucleus (different orientation direction area).

Compared with a case using the column spacers, probability of transition from the spray to the bend orientation is reduced in the liquid crystal display element using so created array substrate. On the other hand, since the mere change of an array process used for fabricating the array substrate provides the liquid crystal display element having the transition nucleus of the present invention, this is advantageous because the transition nucleus can be formed easily. Moreover, reliability of the bend transition can be further enhanced by combining the alignment treatment method of this embodiment and the alignment treatment method of twice rubbings in different orientation directions as described in the eighth embodiment.

Embodiment 14

In a fourteenth embodiment of the present invention, column spacers (steric obstacle) are water-repellent to form different orientation direction areas.

Figure 40:
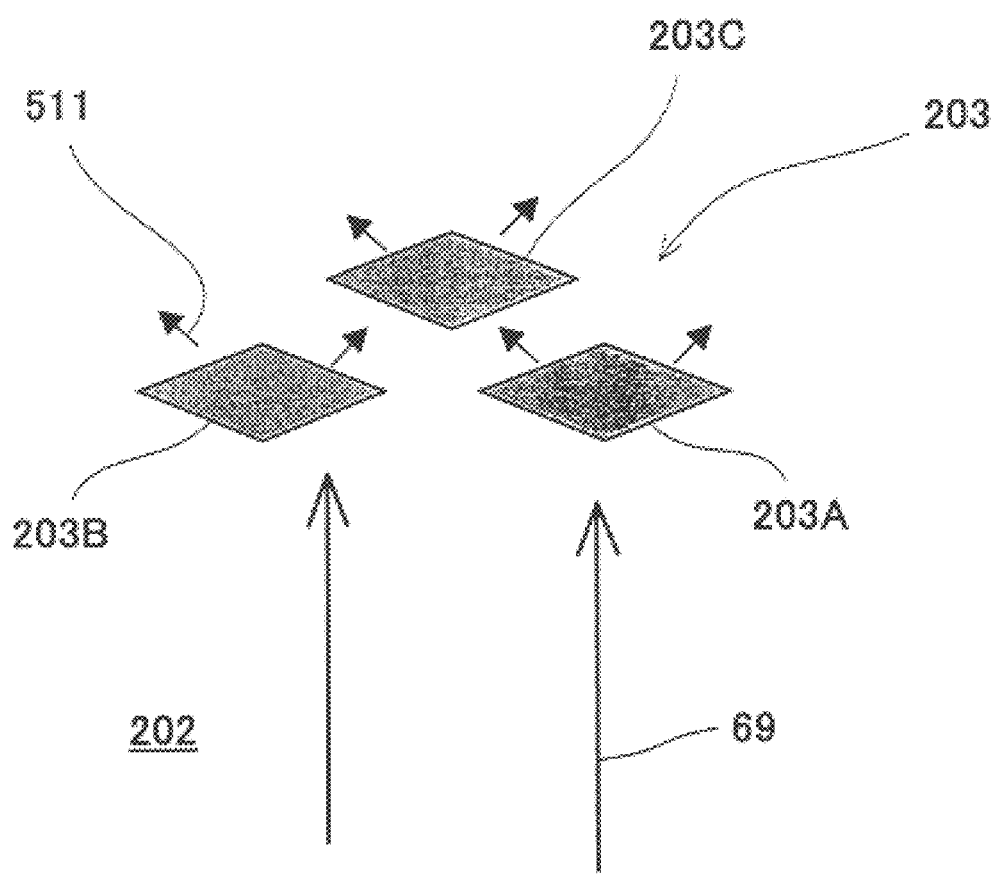
FIG. 40 is a plan view schematically showing an alignment treatment of a substrate of a liquid crystal display element according to a fourteenth embodiment of the present invention.

FIG. 40 is a plan view showing a state of an alignment treatment of a substrate of a liquid crystal display element according to a fourteenth embodiment of the present invention.

Referring to FIG. 40, a complex column spacer 203 is formed on the substrate 202 and constituted by column spacers 203A, 203B, 203C, each of which is made of a water-repellent material. In general, areas around the spacers 203A, 203B, 203C, in particular, portions situated forward in the rubbing direction 69 are less subject to rubbing. When the column spacers 203A, 203B, 203C are water-repellent, liquid crystal molecules situated around the column spacers 203A, 203B, 203C have a tendency to be oriented in a direction 511 perpendicular to side surfaces of the column spacers 203, 203B, 203C as shown in the Figure. Thereby, a clockwise twist area and a counter-clockwise twist area are formed as being contact with each other in each of the areas around the column spacers 203A, 203B, 203C. The contact portion acts as the nucleus of transition. Accordingly, in the liquid crystal display element using the substrate 202 so alignment-treated, the transition nucleus can be reliably formed and the reliability of the bend transition can be further improved.

When forming the column spacers 203A, 203B, 203C on the substrate 202, the column spacers 203A, 203B, 203C made of the water-repellent material are first formed and an alignment layer is applied to cover the surface of the substrate having the spacers. The alignment layer applied to the surfaces of the column spacers 203A, 203B, 203C are repelled and the water-repellent surfaces of the column spacers 203A, 203B, 203C are exposed, thereby forming the column spacers 203A, 203B, 203C having the water-repellent surfaces on the substrate 202.

What is important in this embodiment is to form areas of the substrate on which rubbing is not performed or is least performed and to include another orientation means for orientating the liquid crystal situated in the areas in a predetermined direction. In this embodiment, this another orientation means is water-repellency of the column spacers.

Embodiment 15

In a fifteenth embodiment of the present invention, a column spacer formed in an area around a display area of a substrate functions as a spacer keeping a spacing between substrates.

The aim of the present invention is to generate the transition nucleus and obtain reliability of the bend transition. In the second embodiment, the column spacer is used as the transition nucleus and formed on the electrode in the second embodiment. In the active matrix type liquid crystal display element, a portion of a TFT substrate where the is to be formed is higher by approximately 1 μm than a pixel portion of the TFT substrate by an array structure. Since a black matrix is formed on a portion of a color filter substrate where the is to be formed, the portion is also higher than the pixel portion of the color filter substrate. For this reason, the column spacer formed on the portion where the is formed functions as the spacer keeping the spacing between substrates because it is contact with both of the substrates. On the other hand, the column spacer formed in an area outside of the display area of the panel does not function as the spacer keeping the spacing between the substrates because steps of the active matrix is not formed in this area, and therefore a cell thickness is reduced outside of the display area of the panel.

As a solution to this, it is considered that a spacer made of glass fibers or the like of a predetermined size is mixed into an inner portion of a seal resin layer formed outside of the display area of the TFT substrate in order to compensate for steps corresponding to the steps of the active matrix. The problem with this is that the spacer might damage signal wiring.

In this embodiment, to solve this problem, the following configuration is adopted.

Figure 41:
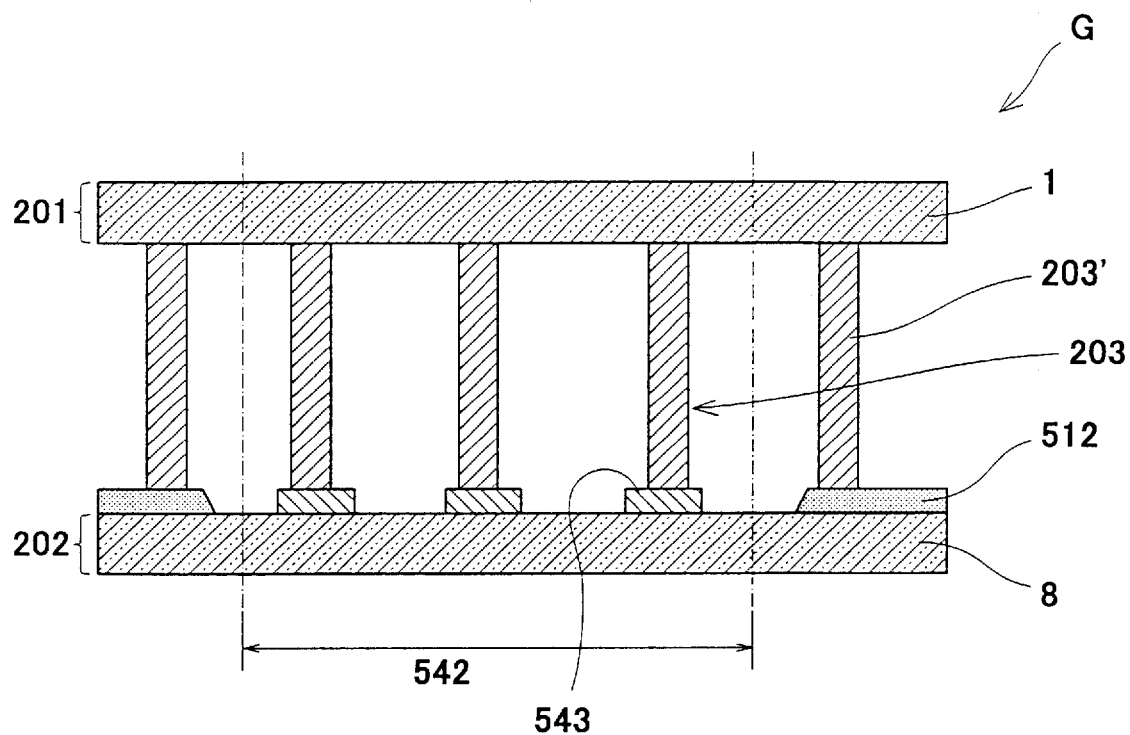
FIG. 41 is a cross-sectional view schematically showing a structure of a liquid crystal display element according to a fifteenth embodiment of the present invention.

FIG. 41 is a cross-sectional view showing a structure of the liquid crystal display element according to the fifteenth embodiment of the present invention. In FIG. 41, the same reference numerals as those in FIG. 20 denotes the same or corresponding parts. For the sake of simplicity, some constituents of the color filter substrate 201 and the TFT substrate 202 are not shown.

Referring to FIG. 41, in a liquid crystal display element G of the present invention, column spacers 203 are formed in a display area 542 and an area around the display area 542 of the TFT substrate 202 and a column spacer 203' situated around the display area 542 is formed on a dummy pattern 512 formed on the area around the display area 542. The dummy pattern 512 is as high as a portion 543 in the display area 542 where the column spacer 203 is formed. Reference numeral 543 denotes the portion where the column spacer 203 is formed and its height corresponds to the steps of the active matrix. The dummy pattern 512 is constituted by photoresist in this embodiment, but may be constituted by a wiring material or an insulating film.

With such a configuration, because the column spacer 203' formed around the display area 542 is as high as the column spacer formed in the display area 542, it functions as the spacer keeping the spacing between the substrates 201, 202.

One or both of the column spacer 203' and the dummy pattern 512 formed around the display area 542 may be provided on the color filter substrate 201. Also, like the second embodiment, the dummy pattern 512 may be made higher or lower to thereby avoid excessive column spacers. Further, the density of the column spacer 203' around the display area 542 may be made lower than the density of the column spacer of the display area 542.

Embodiment 16

In a sixteenth embodiment of the present invention, an electric field (referred to as a lateral electric field) in a lateral direction(a direction parallel to substrates) is applied to form different orientation direction areas.

Figure 42A:
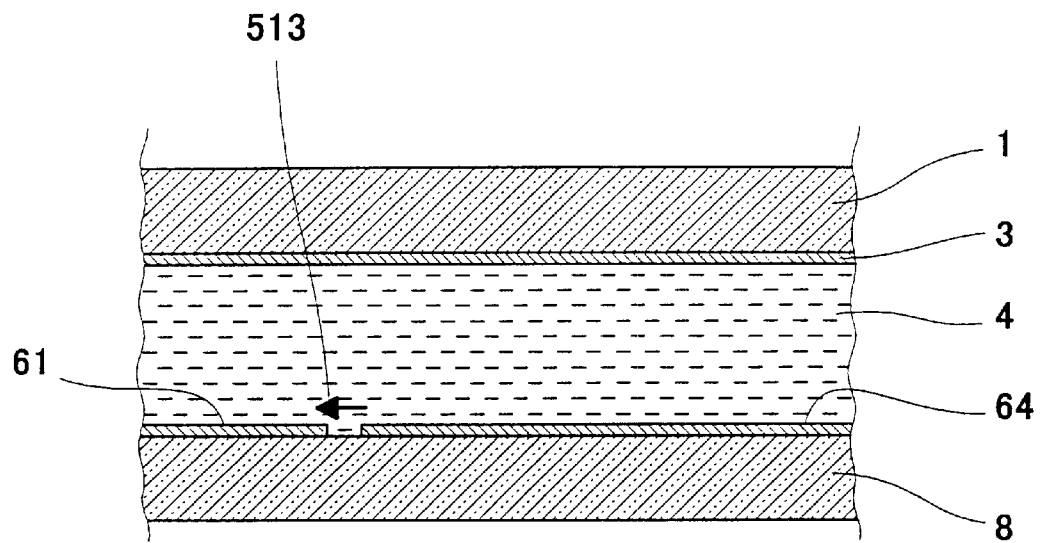
FIGS. 42(a) and 42(b) are a cross-sectional view and a plan view schematically showing a structure of a liquid crystal display element according to a sixteenth embodiment of the present invention, respectively.
Figure 42B:
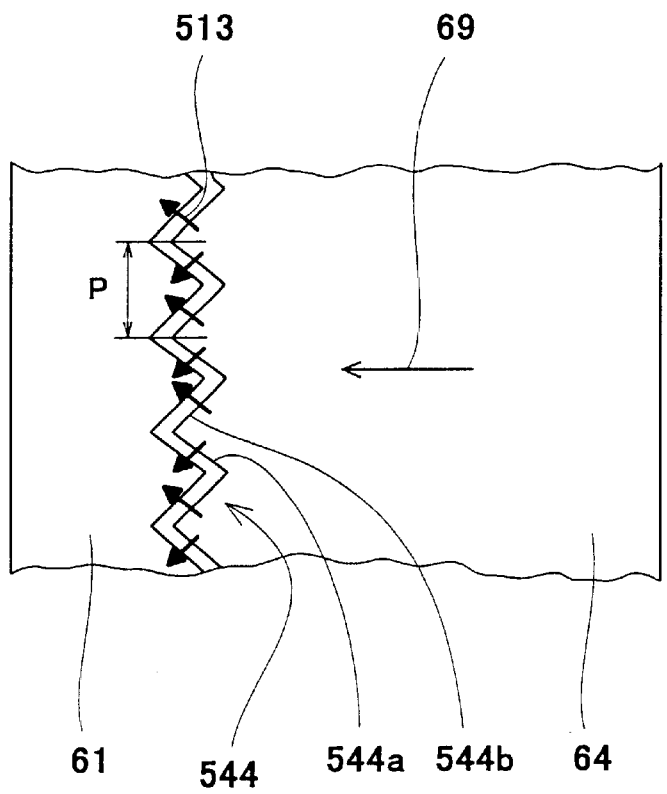

FIGS. 42(a) and 42(b) are a cross-sectional view and a plan view showing a structure of a liquid crystal display element according to the sixteenth embodiment of the present invention, respectively. FIG. 43 is a graph showing a waveform of a driving voltage applied to the liquid crystal display element of FIG. 42. In FIGS. 42 and 43, the same reference numerals as those in FIG. 20 denotes the same or corresponding parts.

In the second embodiment, the rubbing direction is controlled to form the different orientation direction areas. In this embodiment, unlike the second embodiment, the different orientation direction areas are formed by the electric field. The different orientation direction areas are formed only during application of a transition voltage.

Referring to FIGS. 42(a), 42(b), in the liquid crystal display element of this embodiment, adjacent edge portions of the pixel electrode 64 and the gate line 61 of the TFT substrate 202 are formed in a zigzag 544 such that they are engaged with each other. The adjacent edge portions of the pixel electrode 64 and the gate line 61 extend in a direction orthogonal to the rubbing direction 69, and two inclined straight lines 544a, 544b extending as being inclined in alternately opposite directions to form the zigzag 544 make an angle of approximately ±45 degrees with respect to the rubbing direction 69. A pitch P of the zigzag 544 is 100 µm in this embodiment. The pitch P provides an effect mentioned later when it is 30 µm or larger and is preferably smaller than a pitch of the pixel electrode 64. A width of a gap between the adjacent edge portions is 10 µm in this embodiment. The width of gap is preferably small because the lateral electric field becomes strong, in which case etching is difficult to perform. The width of the gap provides an effect mentioned later when it is 4 µm or larger and is preferably 20 µm or smaller.

A predetermined voltage is applied across the gate line 61 and the pixel electrode 64 to thereby generate a lateral electric field 513. The other respects are identical to those of the second embodiment.

The predetermined voltage will now be described with reference to FIGS. 42 and 43. A voltage of a normal driving waveform (gate voltage) 516 is applied to the gate line 61. The gate voltage 516 comprises a square wave having a period at HIGH level of+several volts and a period at LOW level of −20V during which the pixel is OFF. Hence, a voltage of −20V is applied to the gate line 61 during almost the entire period. A potential of the pixel electrode 64 (pixel voltage), i.e., a potential of the source line is kept at +3V. A transition voltage is obtained by swinging a counter voltage 515. A waveform of the counter voltage 515 is a square wave with a frequency of 0.5 Hz having a period at HIGH level of +3V and a period at LOW level of −25V. A voltage of 23V is applied across the pixel electrode 64 and the gate line 61 during the period when the gate voltage 516 is at LOW level, causing the lateral electric field 513 to be generated. A direction of the lateral electric field 513 is from the pixel electrode 64 toward the gate line 61. During the period when the counter voltage 515 is at LOW level, a voltage of 28V is applied across the counter electrode and the pixel electrode 64 and a transition voltage of 5V is applied across the counter electrode and the gate line 61. The transition voltage and the lateral electric field 513 are simultaneously applied during a period 545 when the counter voltage 515 and the gate voltage 516 are at LOW level.

Subsequently, an operation of the liquid crystal display element so configured will be explained. Referring to FIGS. 42 and 43 again, when the liquid crystal display element is turned ON and the gate voltage 516 becomes LOW level, the lateral electric field 513 is generated between the pixel electrode 64 and the gate line 61, causing an orientation direction of liquid crystal molecules situated in a portion of the lateral electric field 513 to be changed in a direction of the lateral electric field 513. The lateral electric field 513 is generated in the direction orthogonal to the inclined lines 544a, 544b of the zigzags 544. In a gap between the adjacent edge portions, lateral electric field areas inclined at an angle of about 45 degrees in clockwise, and counter-clockwise directions with respect to the rubbing direction 69 are formed and two types of twist-oriented areas twisted at an angle of approximately 45 degrees in clockwise and counter-clockwise directions with respect to the rubbing direction 69 are formed alternately and in contact with each other, according to the lateral electric field. When the counter voltage 515 becomes LOW level, a voltage of 28V is applied across the counter electrode and the pixel electrode 64 and the transition voltage of 5V is applied across the counter electrode and the gate line 61, causing the transition nucleus to be generated in the contact portion between the two twist-orientated areas, and the transition nucleus is grown to bring about the bend transition. Therefore, the bend transition reliably takes place. The contact portions of the two twist-oriented areas correspond to vertexes of the zigzag 544 and the transition actually occurred from areas in the vicinity of these vertexes.

The aim of the present invention is to form the clockwise twist-orientated area and the counter-clockwise twist-oriented area contact with each other by the lateral electric field generated between the pixel electrode and the gate electrode.

The twist angle of the clockwise and counter-clockwise twist-oriented areas is set to a desirable angle by selecting an angle with respect to the rubbing direction 69 of the inclined straight lines 544a, 544b of the zigzag 544 or a relative angle with respect to the direction in which the zigzag 544 extends and the rubbing direction 69.

Embodiment 17

Figure 44:
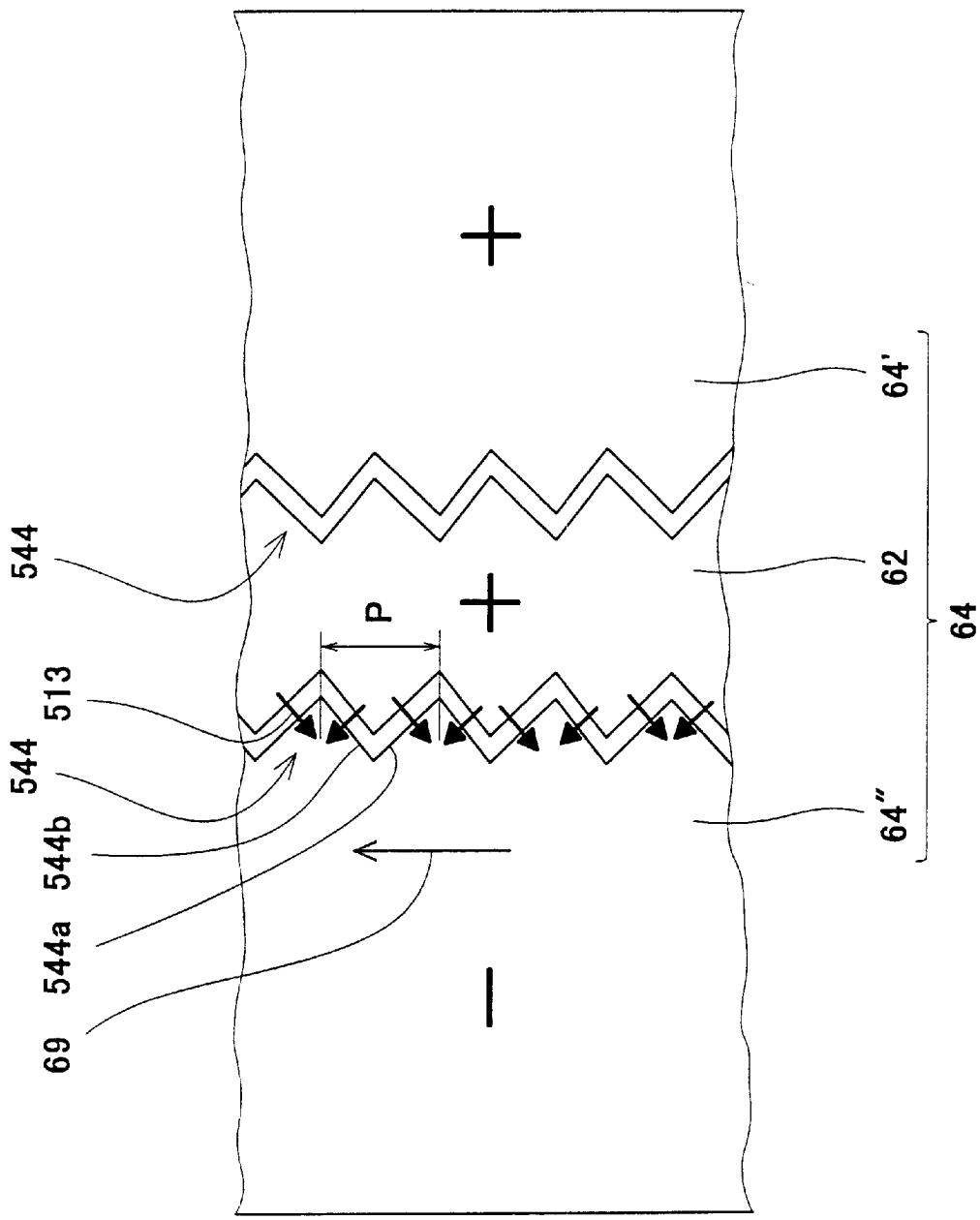
FIGS. 44(a) and 44(b) are a cross-sectional view and a plan view schematically showing a structure of a liquid crystal display element according to a seventeenth embodiment of the present invention, respectively.
Figure 45:
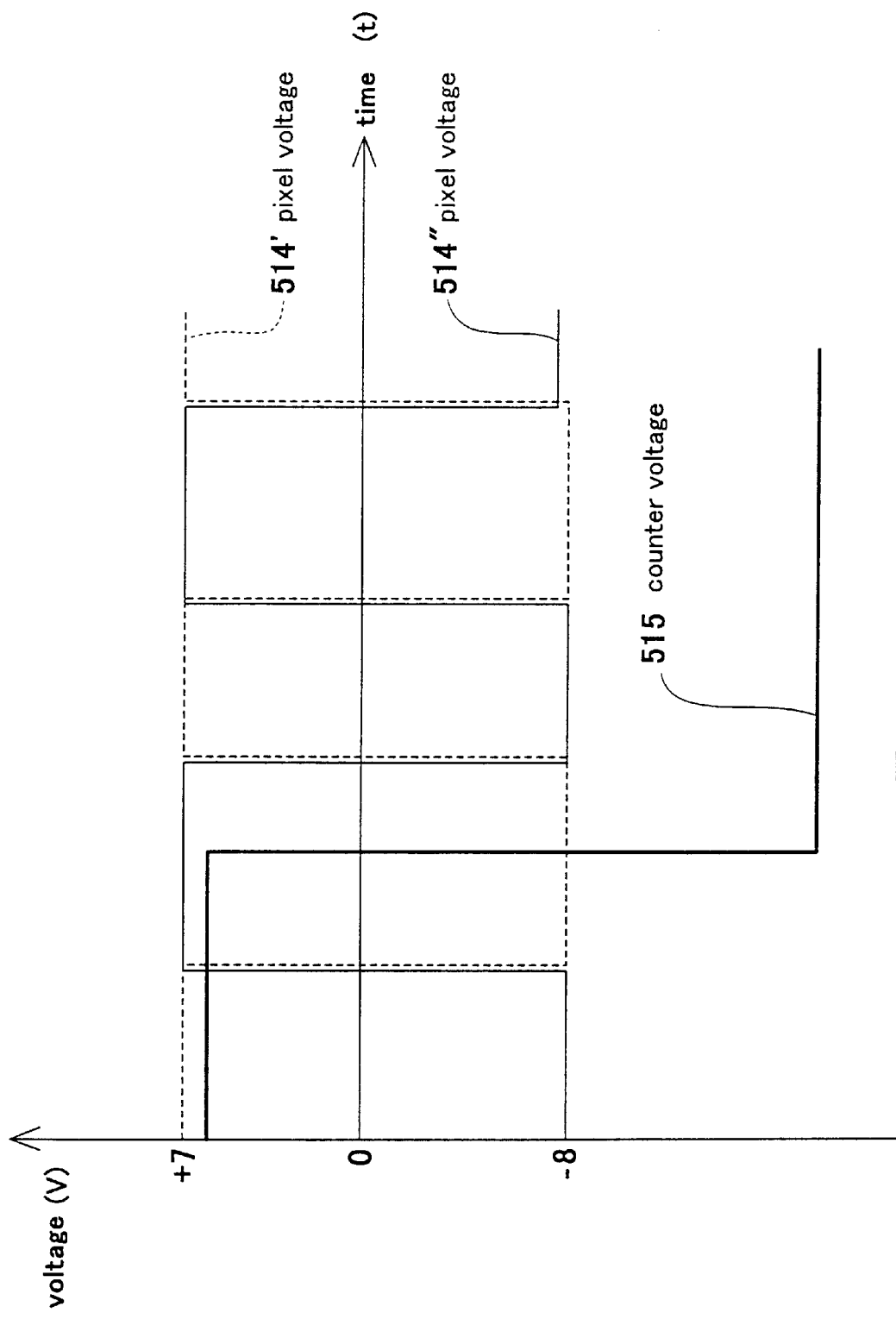
FIG. 45 is a graph showing a waveform of a driving voltage applied to the liquid crystal display element of FIG. 44.

FIG. 44 is a plan view schematically showing a structure of a liquid crystal display element according to a seventeenth embodiment of the present invention. FIG. 45 is a graph showing a waveform of a driving voltage applied to the liquid crystal display element of FIG. 44. In FIGS. 44 and 45, the same reference numerals as those in FIGS. 42 and 43 denote the same or corresponding parts.

While the lateral electric field is generated between the gate line and the pixel electrode in the sixteenth embodiment, in this embodiment, the lateral electric field is generated between the source line and the pixel electrode unlike the sixteenth embodiment.

Referring to FIG. 44, in the liquid crystal display element of this embodiment, adjacent edge portions of the pixel electrode 64 and the source line 62 of the TFT substrate 202 are engaged with each other to form zigzags 544. Specifically, the source line 62 have opposite edge portions engaged with edge portions of pixel electrodes 64', 64" in zigzags 544. These zigzags 544, 544 are the same in this embodiment. The adjacent edge portions of the pixel electrode 64 and the source line 62 extend in a direction parallel to the rubbing direction 69, and two inclined straight lines 544a, 544b extending as being inclined in alternately opposite directions make angles of approximately 135 degrees and approximately 45 degrees with respect to the rubbing direction 69, respectively. The other respects are identical to those of the sixteenth embodiment.

Subsequently, a driving voltage will be described with reference to FIGS. 44 and 45. Voltages with reversed polarities of opposite signs are applied to source lines adjacent to each other, that is, the pixel electrodes 64', 64" between which one of the source lines is sandwiched. More specifically, a voltage (pixel voltage 514') comprising a square waveform with a redetermined frequency having a period at HIGH level of +7V and a period at LOW level of −8V is applied to the pixel electrode 64' and a voltage comprising a square wave of antiphase with respect to the pixel voltage 514' is applied to the pixel electrode 64". Like the sixteenth embodiment, the transition voltage is obtained by swinging the counter voltage 515. A waveform of the counter voltage 515 is a square wave with a frequency of 0.5 Hz having a period at HIGH level of a positive voltage and a period at LOW level of a negative voltage. Thereby, a voltage of 15V is applied across the source line 62 shown in the Figure and the pixel electrode 64" connected to a source line (not shown) adjacent to the source line 62 to generate the lateral electric field 513. The direction of the lateral electric field 513 is from the source line 62 toward the pixel electrode 64". During the period when the counter voltage 515 is at LOW level, a predetermined voltage is applied across the counter electrode and the pixel electrode 64.

In the liquid crystal display element so configured, when the liquid crystal display element is turned ON and the pixel voltage 514" becomes LOW level, the lateral electric field 513 is generated between the pixel electrode 64" and the source line 62, causing an orientation direction of liquid crystal molecules situated in a portion of the lateral electric field 513 to be changed in the direction of the lateral electric field 513. Thereby, as described in the sixteenth embodiment, the two twist-oriented areas are alternately formed in the gap between the adjacent edge portions of the pixel electrode 64" and the source line 62 as being contact with each other. The two twist-oriented areas have twist angles of approximately 45 degrees and approximately 135 degrees in a clockwise direction in this embodiment. When the counter voltage 515 becomes LOW level, a predetermined transition voltage is applied across the counter electrode and the pixel electrode 64, causing the transition nucleus to be generated in the contact portion between the two twist-orientated areas, and the transition nucleus is grown to bring about the bend transition. Consequently, the bend transition takes place with further reliability.

While the twist angles are approximately 45 degrees and approximately 135 degrees as described above, the transition efficiently occurs when the twist angle is 45 degrees or larger and more efficiently occurs when the twist angle is 60 degrees or larger.

While the transition voltage is added at an amplitude of the counter voltage, it may be added at an amplitude of a source potential with the counter voltage kept constant.

Embodiment 18

In an eighteenth embodiment of the present invention, a bias angle in a rubbing treatment is optimized to form different orientation direction areas.

Figure 46:
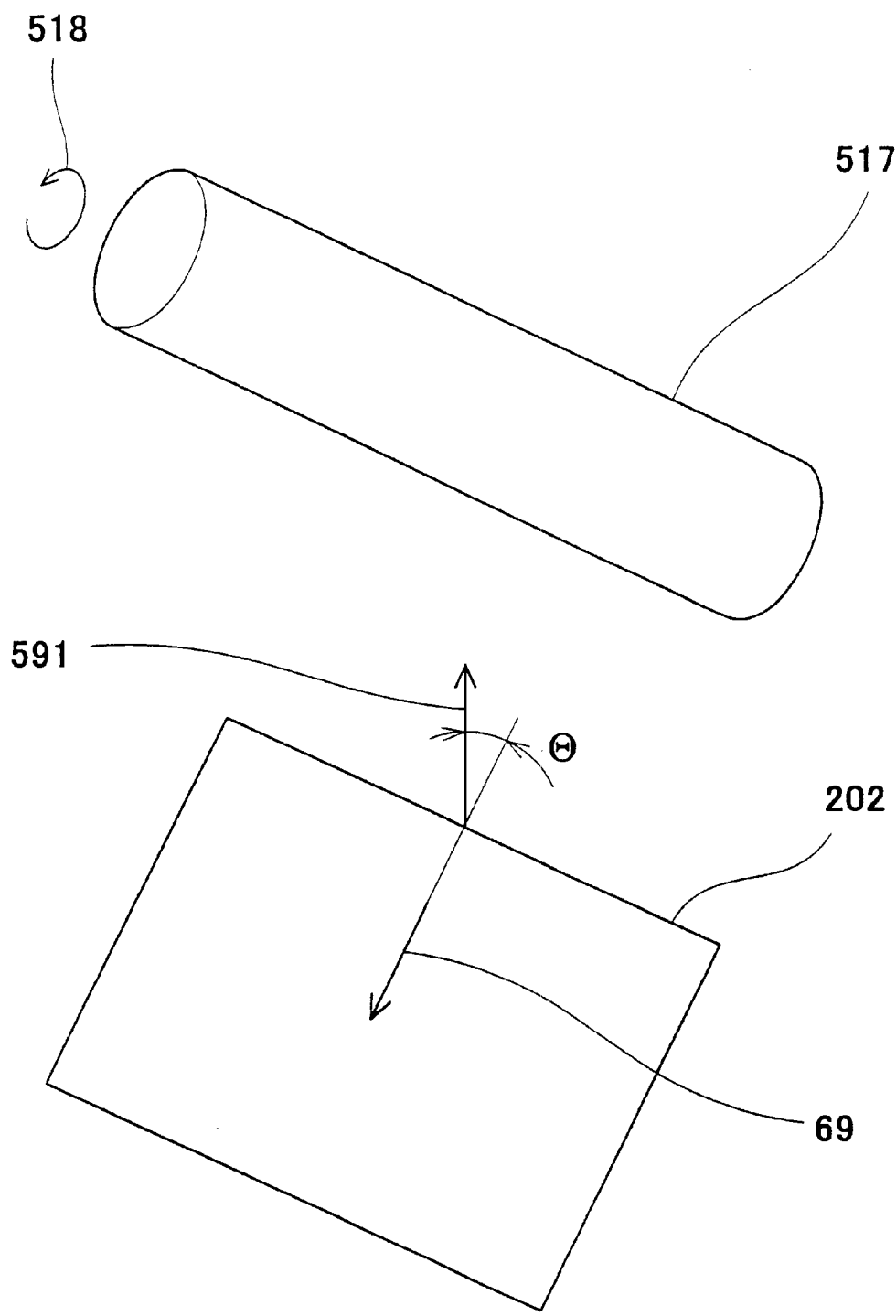
FIG. 46 is a view showing a method for fabricating a liquid crystal display element according to an eighteenth embodiment of the present invention.
Figure 47:
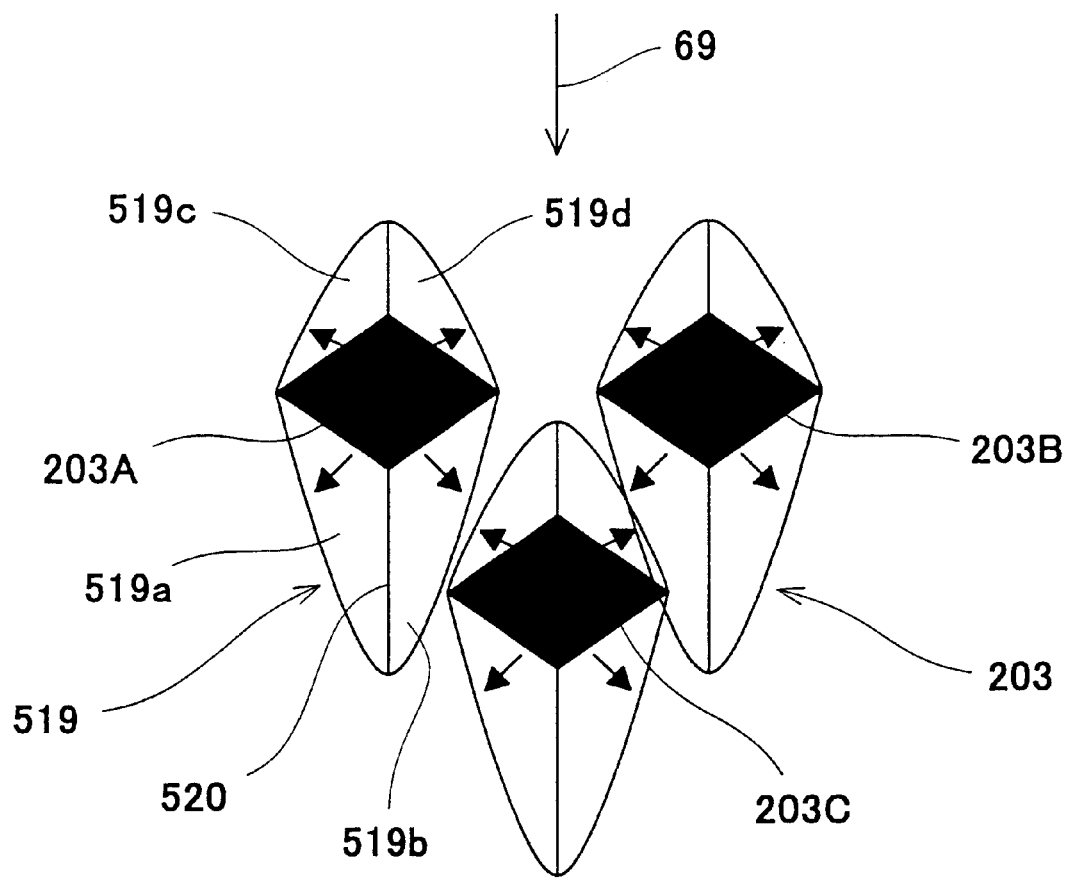
FIG. 47 is a plan view showing an alignment treatment state of a substrate of the liquid crystal display element according to the eighteenth embodiment of the present invention.

FIG. 46 is a view showing a method for fabricating a liquid crystal display element according to an eighteenth embodiment of the present invention. FIG. 47 is a plan view showing an alignment treatment state of a substrate of the liquid crystal display element of this embodiment.

Referring to FIG. 46, a roller 517 for rubbing has a surface around which a rubbing cloth (buff cloth, not shown) is wound. An alignment layer (not shown) is formed on a surface of the substrate 202 and the complex column spacer 203 of FIG. 47 is formed thereon. In a rubbing treatment, the roller 517 is first rotated and the substrate 202 is passed under the roller 517 with the substrate 202 being contact with the roller 517. A rotary direction of the roller 517 is a direction indicated by an arrow 518. Thereby, the alignment layer of the substrate 202 is subject to rubbing by means of the rubbing cloth of the roller 517. In this case, since a movement speed of the substrate 202 with respect to the roller 517 is negligibly low, the rubbing direction 69 of the substrate 202 is a rotary direction of the roller 517, i.e., a direction orthogonal to a rotary axis of the roller 517. An angle made between the rubbing direction and a direction 591 of the movement of the substrate 20 with respect to the roller 517 corresponds to the bias angle $\Theta$. In this embodiment, the bias angle $\Theta$ is made smaller. Fibers of the rubbing cloth of the roller 517 are made rigid as compared to the rubbing of FIG. 22 of the second embodiment.

When rubbing is performed under the condition, as shown in FIG. 47, a rubbing shade portion 519 of each of column spacers 203A, 203B, 203C constituting the complex column spacer 203 has areas 519a, 519c on which rubbing is performed rightward and areas 519b, 519d on which rubbing is performed leftward, when seen from the rubbing direction 69. This is due to the fact that because fibers of the rubbing cloth are displaced laterally when they pass over the column spacers 203A, 203B, 203C or passed fibers reach the substrate 202, a component lateral to the rubbing direction 69 is generated, causing the rubbing in a direction inclined with respect to the rubbing direction 69. Thereby, the clockwise twist-oriented areas 519a, 519c and the counter-clockwise twist-oriented 519b, 519d are formed as being contact with each other and the transition occurs from the contact portion 520. Consequently, the reliability of the bend transition is further improved.

When the bias angle Θ is larger, the areas of rightward rubbing and areas of leftward rubbing are out of balance. It is therefore preferable that the bias angle is smaller. When the bias angle Θ is 30 degrees or smaller, a preferable result of the occurrence of transition is obtained.

The result of the rubbing treatment of this embodiment differs from that of the second embodiment. In this embodiment, the mode in which the rubbing cloth passes over the column spacer is dominant. The rubbing is performed in this mode when the ribbing cloth has relatively rigid fibers. On the other hand, in the second embodiment, the mode in which the rubbing cloth flows between the column spacers is dominant. The rubbing is performed in this mode when the rubbing cloth has relatively flexible fibers.

Embodiment 19

The column spacer is formed on the electrode in the second embodiment. However, there is a gap between the storage capacitor electrode and the pixel electrode, where no electrode exists. For this reason, the progress of the bend transition is impeded. Accordingly, in the nineteenth embodiment, the following configuration is adopted.

Figure 48:
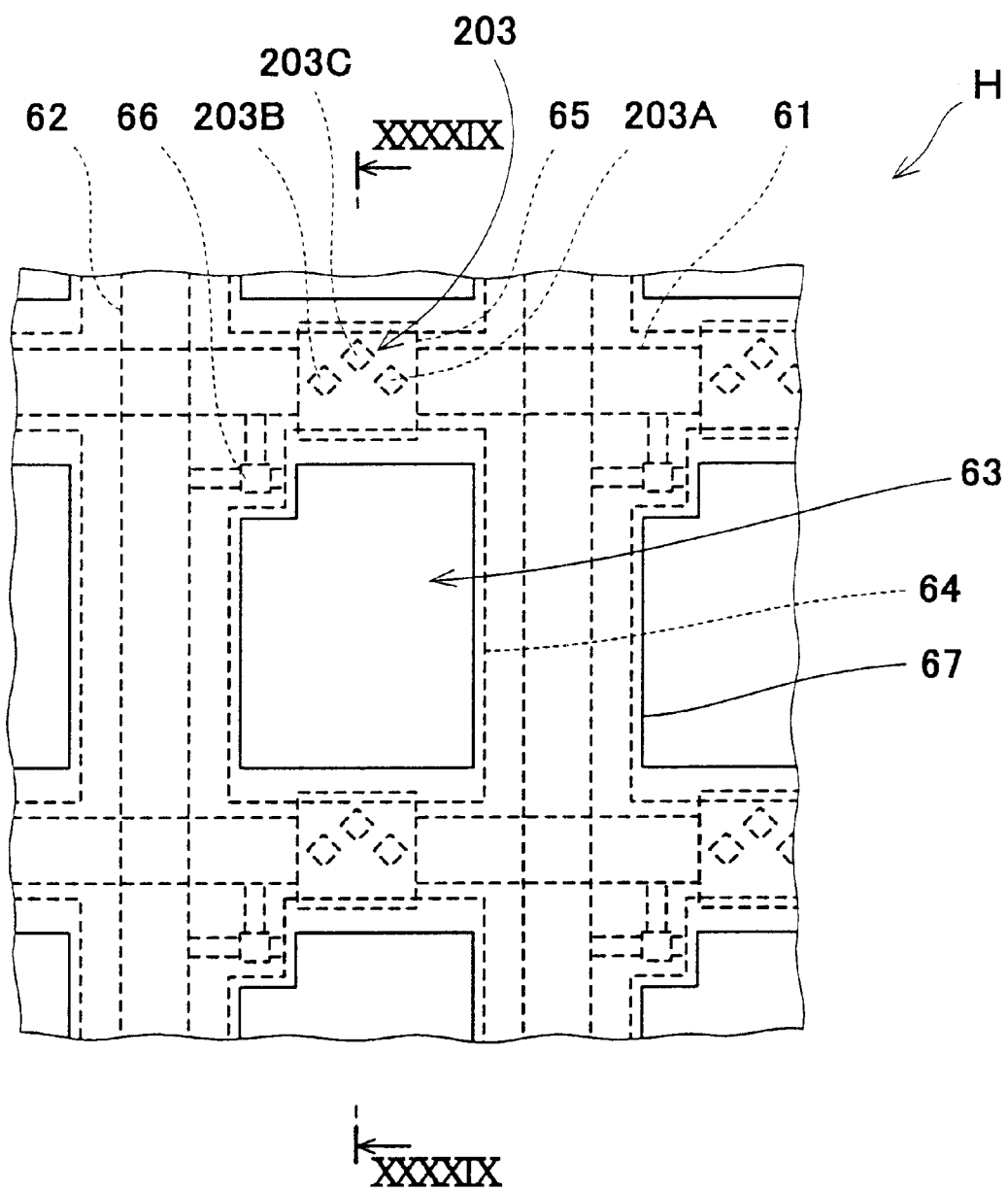
FIG. 48 is a plan view schematically showing a structure of a liquid crystal display element according to a nineteenth embodiment of the present invention.
Figure 49:
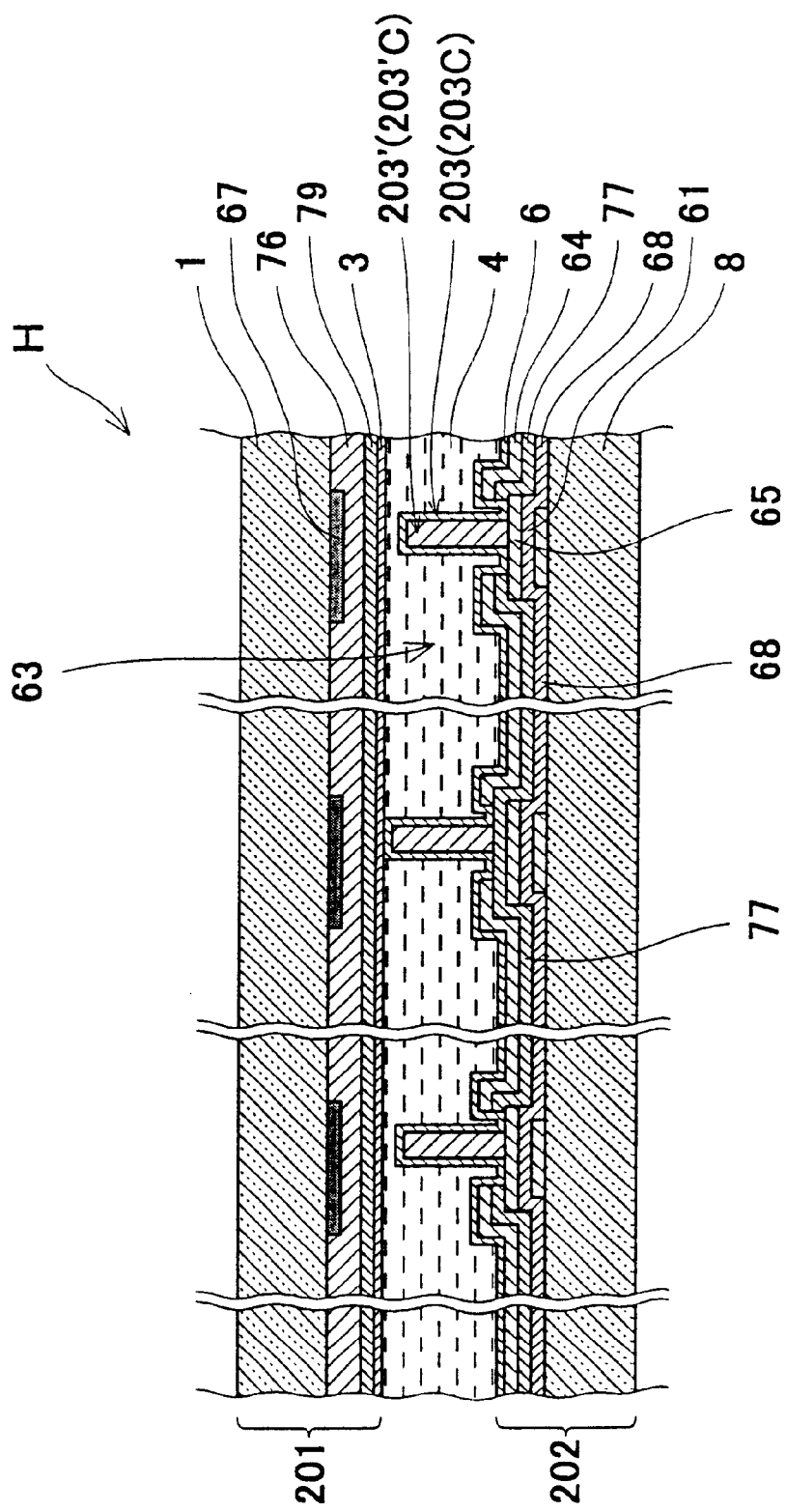
FIG. 49 is a cross-sectional view in the direction of arrow XXXXIX—XXXXIX of FIG. 48.

FIG. 48 is a plan view showing a structure of a liquid crystal display element according to the nineteenth embodiment of the present invention. FIG. 49 is a cross-sectional view in the direction of the arrow XXXXIX—XXXXIX of FIG. 48. In FIGS. 48 and 49, the same reference numerals as those of FIGS. 19 and 20 denote the same or corresponding parts.

Referring to FIGS. 48 and 49, in a liquid crystal display element H of this embodiment, the pixel electrode 64 overlaps the electrode 65 through the insulating layer 77, unlike the second embodiment. The other respects are identical to those of the second embodiment.

With such a structure, an electric field continuously acts on the bend transition occurring around the complex column spacer 203, and the bend transition preferably proceeds.

When the pixel electrode 64 is positioned as an uppermost layer, it is relatively easy to overlap the pixel electrode 64 with the electrode 65.

Further, to facilitate the progress of the bend transition, a flattening process as described in the fourth embodiment may be performed.

Embodiment 20

A liquid crystal display element according to a twentieth embodiment of the present invention using a liquid crystal that is in a first orientation state under a no-voltage condition and in a second orientation state under a display voltage condition and has an energy barrier between the first and second orientation states is characterized in that a third orientation state in which an energy barrier existing between the second and third orientation states is smaller than that of the first and second orientation states is partially preserved in the liquid crystal and the preserved partial third orientation state is used as a nucleus of transition to the second orientation state over the entire liquid crystal.

Figure 50:
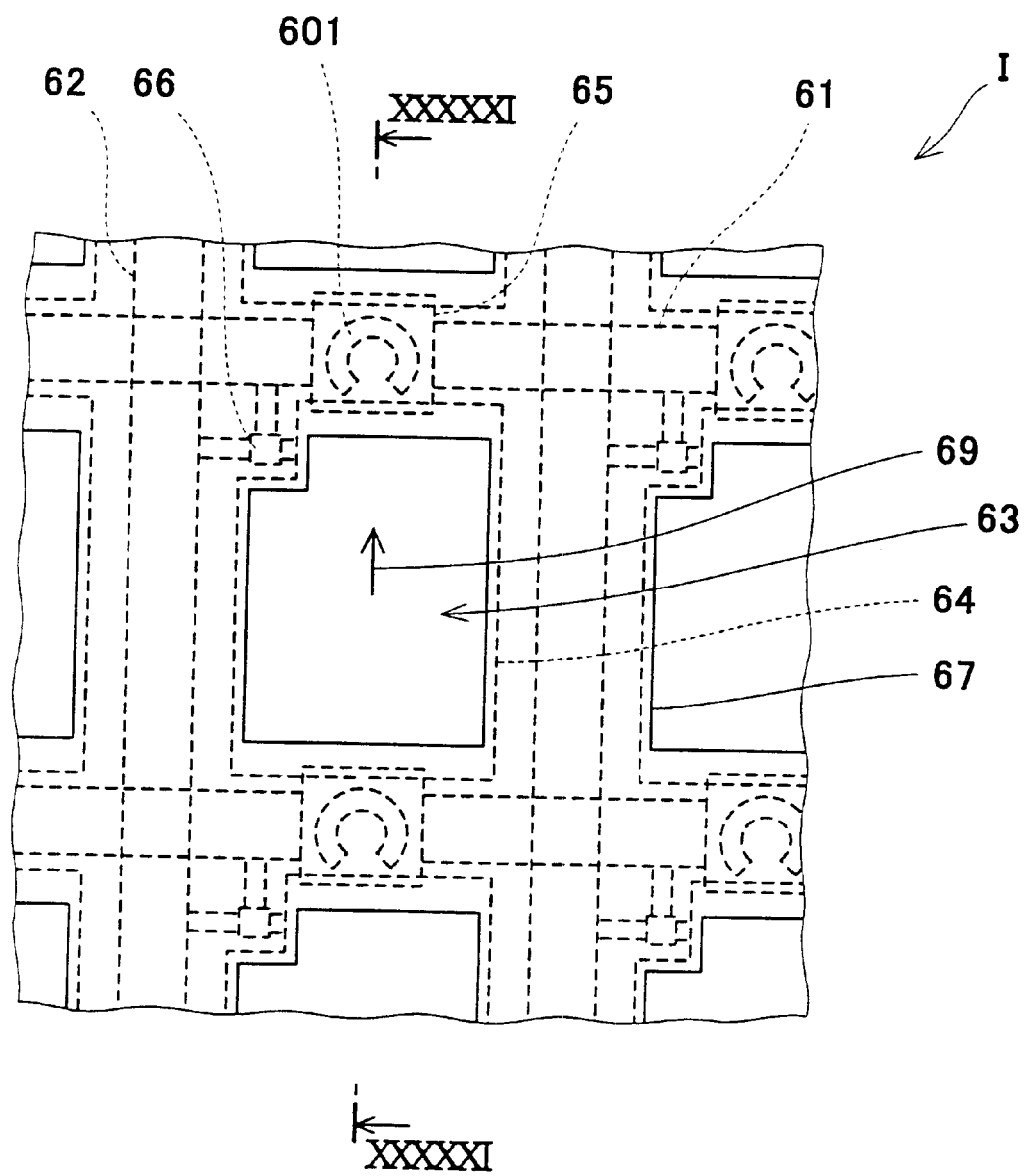
FIG. 50 is a plan view schematically showing a structure of a liquid crystal display element according to a twentieth embodiment of the present invention.
Figure 51:
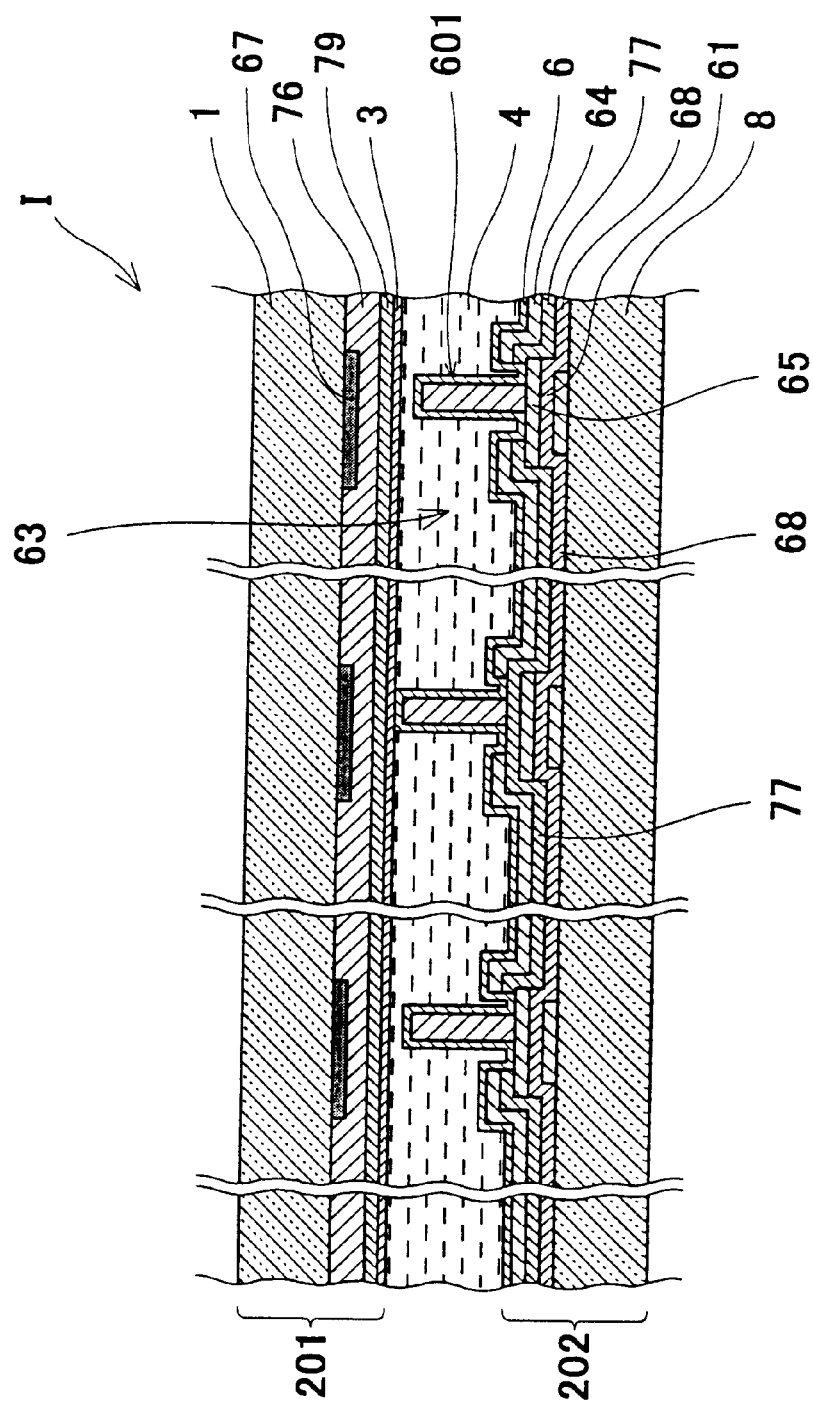
FIG. 51 is a cross-sectional view in the direction of the arrow XXXXXI—XXXXXI of FIG. 50.

FIG. 50 is a plan view schematically showing a structure of a liquid crystal display element according to the twentieth embodiment of the present invention. FIG. 51 is a cross-sectional view in the direction of arrow XXXXXI–XXXXXI of FIG. 50. In FIGS. 50 and 51, the same reference numerals in FIGS. 19 and 20 denote the same or the corresponding parts.

Figure 52:
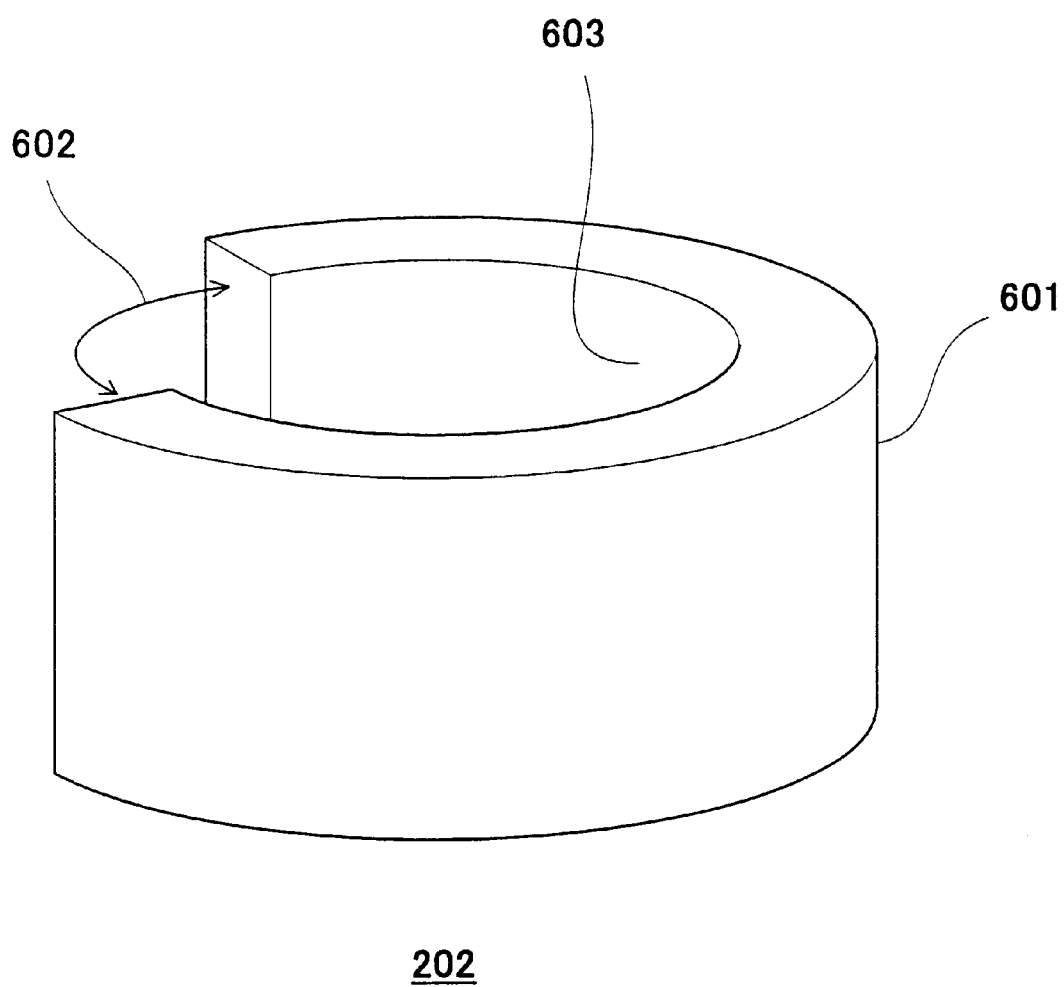
FIG. 52 is a perspective view showing a structure of a lower substrate of a liquid crystal display element according to a seventh example of the twentieth embodiment of the present invention.

Referring to FIGS. 50 and 51, in a liquid crystal display element I of this embedment, the steric obstacle 203 (see FIG. 19) for controlling rubbing of the second embodiment has been replaced by an incomplete surrounding body 601 used for preserving a transient orientation state of the liquid crystal layer 4. The incomplete surrounding body 601 is formed on the TFT substrate 202 such that it circulates in a plane parallel to the TFT substrate 202 in this embodiment and is used as the column spacer like the second embodiment. The pixel electrode 64 over laps the electrode 65 through the insulating layer 77. The other respects are identical to those of the second embodiment. The incomplete surrounding body as defined herein refers to a steric structure body 601 that entirely surrounds a three-dimensional area 603 such that it circulates in a plane and partially has a lack portion 602 that does not surround the three-dimensional area 603, as shown in FIG. 52.

Subsequently, the incomplete surrounding body 601 will be described in greater detail. In the liquid crystal display element I, the liquid crystal layer 4 is sandwiched between the substrates 201, 202, and the transparent electrodes 64, 79 are formed on the substrates 201, 202, respectively. The substrate 202 uses an active matrix substrate on which TFT 66 and the electrode 65 are formed and the substrate 201 uses a substrate on which the black matrix 67 is formed over the pixel 63. Through the structure of such an active matrix element, a voltage is applied to the liquid crystal layer 4.

Figure 53:
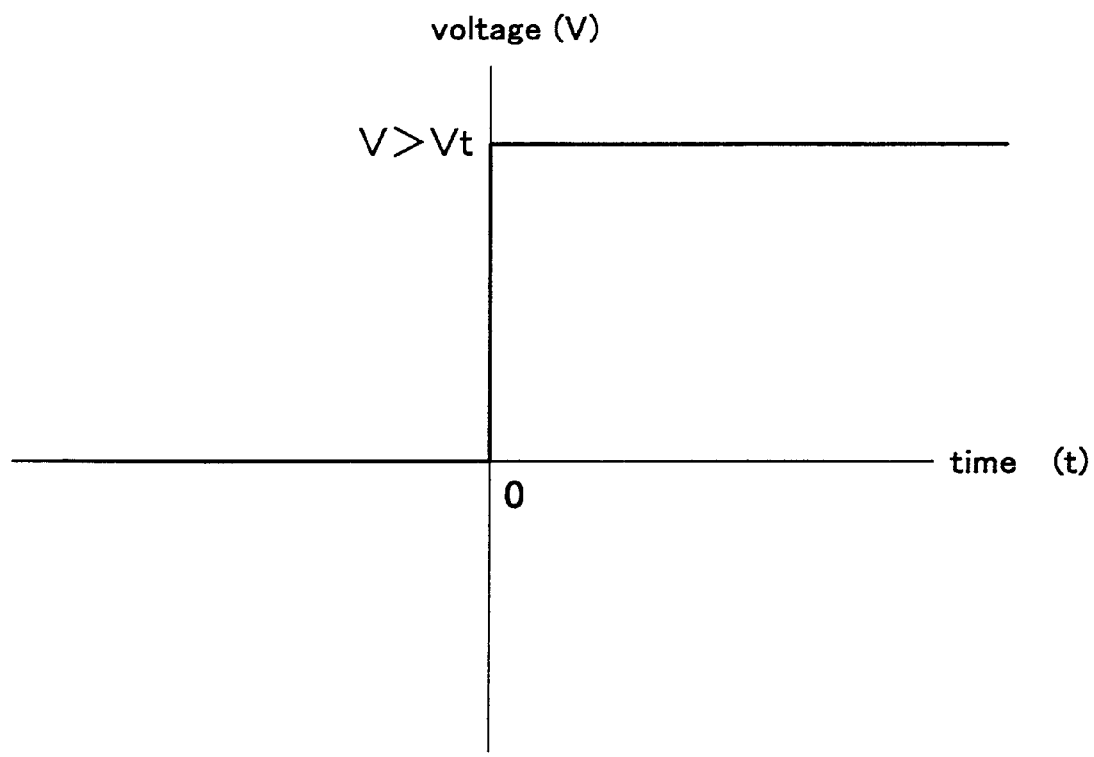
FIG. 53 is a view showing a waveform of a transition voltage applied to the liquid crystal display element of FIG. 50.
Figure 54B:
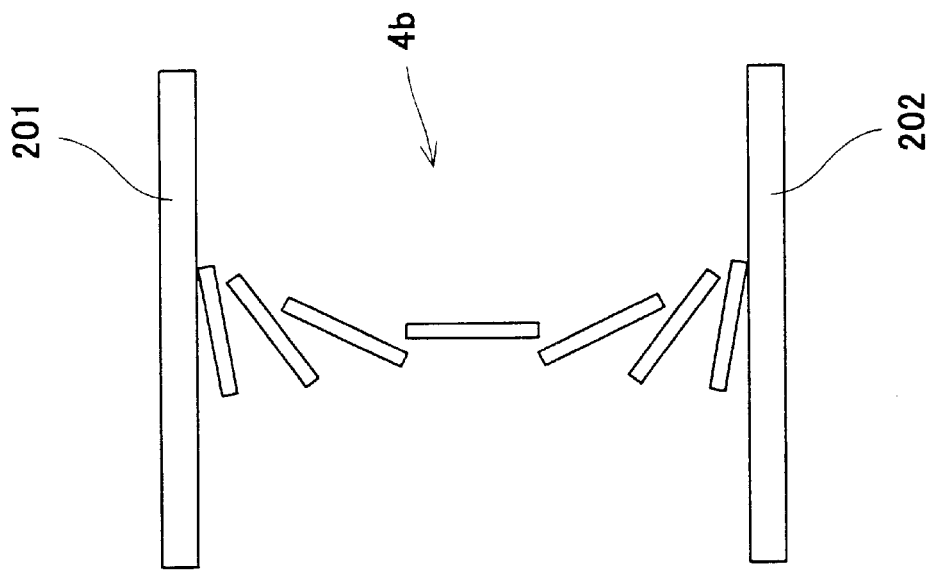
Figure 54A:
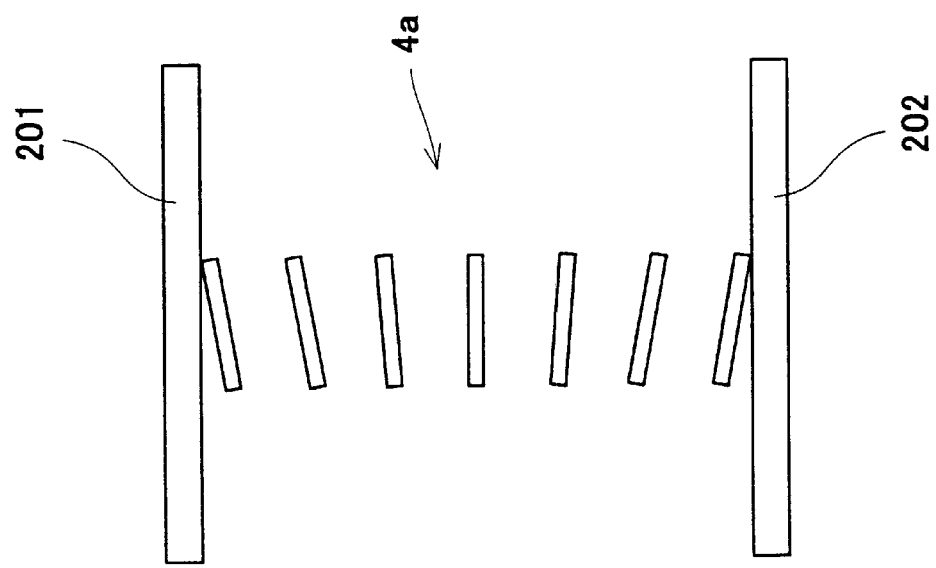

In this embodiment, a transition voltage of a waveform having steps shown in FIG. 53 is applied to the liquid crystal display element I to thereby transition a spray orientation 4a of FIG. 54(a) to a bend orientation of FIG. 54(b).

In the conventional liquid crystal display element, the transition from the spray to the bend orientation requires much time, for example, several seconds to several tens seconds. After application of the transition voltage of the waveform of FIG. 53, the spray orientation remains and an image is unevenly displayed.

The inventors have discovered the following phenomenon after intensive study to reduce the transition time and obtain the reliability thereof.

Figure 55:
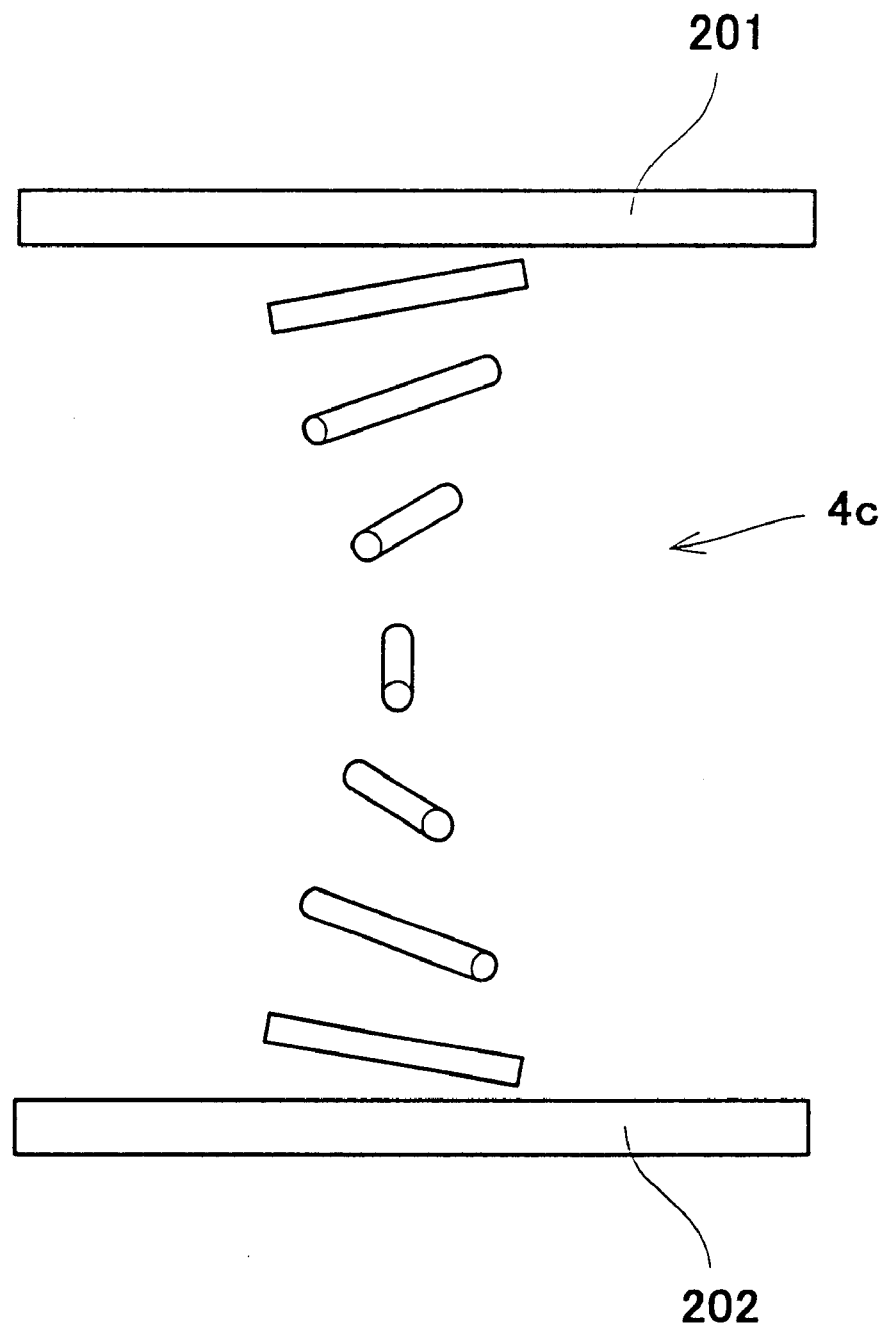
FIG. 55 is across-sectional view showing twist orientation of 180 degrees of a liquid crystal.

When the applied voltage is set to zero volt momently after transition to the bend orientation, it is revealed that the bend orientation is transformed into a twist orientation 4c of 180 degrees as shown in FIG. 55. The twist orientation 4c of 180 degrees is unstable and normally returns to the spray orientation over the liquid crystal layer after several seconds to several tens seconds. In the conventional liquid crystal display device, the twist orientation 4c of 180 degrees vanishes away.

After the twist orientation of 180 degrees has thus vanished away, that is, in the state in which the entire surface of the liquid crystal panel is spray-oriented, the transition voltage waveform of FIG. 53 is applied again to thereby transition it from the spray orientation to the bend orientation. The time it takes to transition from the spray to the bend orientation is almost the same as the time of the previous transition. It should be noted that when transition voltage is applied again while the twist-oriented state of 180 degrees still remains, the spray-oriented (twist-oriented of 180 degrees) area immediately transitions to bend orientation in a very short time and at an extremely low voltage.

The inventors considered that if the twist orientation state of 180 degrees corresponding to an transient orientation state from the spray orientation (first orientation state) to the bend orientation (second orientation state: display orientation state) can be preserved as the third orientation state, then the liquid crystal display element capable of transition to the bend orientation in an extremely short time and at an extremely low voltage would be obtained and conceived construction of a structure for preserving the transient orientation state in the liquid crystal layer 4. One conceivable structure for preserving the transient orientation state is to provide the incomplete surrounding body 601 on the substrate.

Hereinbelow, an example of the incomplete surrounding body for preserving the transient orientation state will be explained.

EXAMPLE 7

FIG. 52 is a perspective view showing a structure of a lower substrate of the liquid crystal display element according to a seventh example of the present embodiment. Referring to FIG. 52, in the liquid crystal display element, the inlet-shaped incomplete surrounding body 601 having a gap 602 is formed on the lower substrate 602. The incomplete surrounding body 601 is a column-shaped body having a C-shaped cross section. The column-shaped area (referred to as a transient orientation preserving area) 603 surrounded by the incomplete surrounding body 601 is formed in the liquid crystal layer on the substrate 202 and the transient orientation preserving area 603 is connected to another area of the liquid crystal layer by means of a cutout portion (lack portion) 602 spanning the whole length of incomplete surrounding body 603 in a height direction thereof. The incomplete surrounding body 601 can be formed by the photo-lithographic method.

Subsequently, a transition operation of so structured liquid crystal display element will be explained with reference to FIGS. 50 through 53.

Initially, the transition voltage of the waveform of FIG. 53 is applied to the liquid crystal display element I to transition it from the spray to the bend orientation. Then, the applied voltage is momently set to zero volt. Thereby, the bend orientation has transitioned to the spray orientation on most of the areas of the liquid crystal layer 4 via the twist orientation of 180 degrees in almost all the areas of the liquid crystal layer 4. However, the twist orientation of 180 degrees remains in the transient orientation preserving area (inlet) 603 of the incomplete surrounding body 601. In this state, the transition voltage waveform of FIG. 53 is applied to transition the element I from the spray orientation to bend orientation. The result is that the time required for transition of the liquid crystal display element I from the spray to the bend orientation is by far shorter than the time required for the previous transition and an image is evenly displayed.

It is observed through a microscope that the transition from the spray to the bend orientation has occurred from the twist-oriented portion of 180 degrees. Such an oriented portion, from which a display orientation (bend orientation) thus spreads, is named an orientation transition nucleus herein. In this case, the twist-oriented portion of 180 degrees corresponds to the orientation transition nucleus, which is formed in the transient orientation preserving area 603 of the incomplete surrounding body 601.

Then, the liquid crystal display element I having the twist orientation of 180 degrees is heated to cause the liquid crystal layer 4 to have isotropic phases and then cooled again. Consequently, the twist orientation of 180 degrees has vanished away.

Thereafter, the transition voltage of Vt of FIG. 53 or more is applied to the liquid crystal display element I. The result is that the time it takes to transition to bend orientation over the entire liquid crystal panel is almost the same as the time required for the previous transition. This is due to the fact that the twist orientation of 180 degrees in the liquid crystal display element I has vanished away as the result of the heating of the liquid crystal layer 4 to have the isotropic phases.

Theoretically consider the above-described phenomenon. The energy barrier exists in transition from the spray to the bend orientation, whereas there exists no energy barrier in transition from the twist orientation of 180 degrees to the bend orientation and transition continuously proceeds. Hence, the twist orientation of 180 degrees can be transformed into the bend orientation more smoothly than the spray transition.

In general, for transition from the spray to the bend orientation, it is necessary to pass over the energy barrier by application of a relatively high voltage having a predetermined waveform. On the other hand, when the twist-oriented state is locally formed, there exists no energy barrier and the transition to the bend orientation easily takes place.

The twist-oriented area is relatively stable without an applied voltage. In this example, the area is kept for more than 24 hours. So, the effect of high-speed bend transition is kept for more than 24 hours. The twist orientation is kept more efficiently when a spacing of the notch portion 602 of the incomplete surrounding body 601 is smaller and is kept for more than a month when the spacing of the notch portion 602 is equal to the cell thickness or smaller.

The requirement of the shape of the incomplete surrounding body 601 is that it surrounds the periphery of the orientation transition nucleus area which is connected to an outside area. Specifically, in order to keep the twist orientation, at least three directions of the twist-oriented area need to be surrounded by the incomplete surrounding body when seen in a plan view. To allow the bend orientation to spread from the orientation transition nucleus area to the entire liquid crystal panel, the orientation transition nucleus area needs to be connected to its surrounding area.

As apparent from the study, it is desirable that the incomplete surrounding body have a height as large as possible. When the incomplete surrounding body is made higher, the probability that the twist orientation of 180 degrees remains becomes correspondingly higher. When the height of the incomplete surrounding body is larger than half of the cell thickness, the probability is about 5%. When the height of the incomplete surrounding body is substantially equal to the cell thickness, effect of leaving the twist orientation of 180 degrees is the greatest and the probability that the twist orientation of 180 degrees remains is 10% or more.

When the orientation transition nucleus area (transient orientation preserving area) 603 is too large, no twist orientation remains. When the orientation transition nucleus area has a diameter of 25 $\mu$m or larger, the twist orientation of 180 degrees hardly remains. As the nucleus area is smaller, the probability that the twist orientation of 180 degrees remains becomes higher. When the diameter is approximately 5 $\mu$m, the probability that the twist orientation of 180 degrees remains is the highest, namely, approximately 10%. This is because when the diameter of the orientation transition nucleus area is equal to the cell thickness, a surrounding wall of the incomplete surrounding body is more influential than the upper and lower substrates and, thereby the twist orientation of 180 degrees tends to remain.

When the orientation transition nucleus area is too small, there arise problems: "the problem that rubbing cannot be performed on the orientation transition nucleus area", "the problem that a process for forming the orientation transition nucleus area is difficult to perform", etc. The orientation transition nucleus area, i.e., the transient orientation preserving area 603 has a parallel orientation when rubbing is ideally performed. If the area 603 does not have the parallel orientation because it is not subjected to rubbing, the effect of leaving twist of 180 degrees is not adversely affected. It should be noted that the area becomes the luminescent spot in display of the image if the area 603 is not parallel-oriented.

Figure 56:
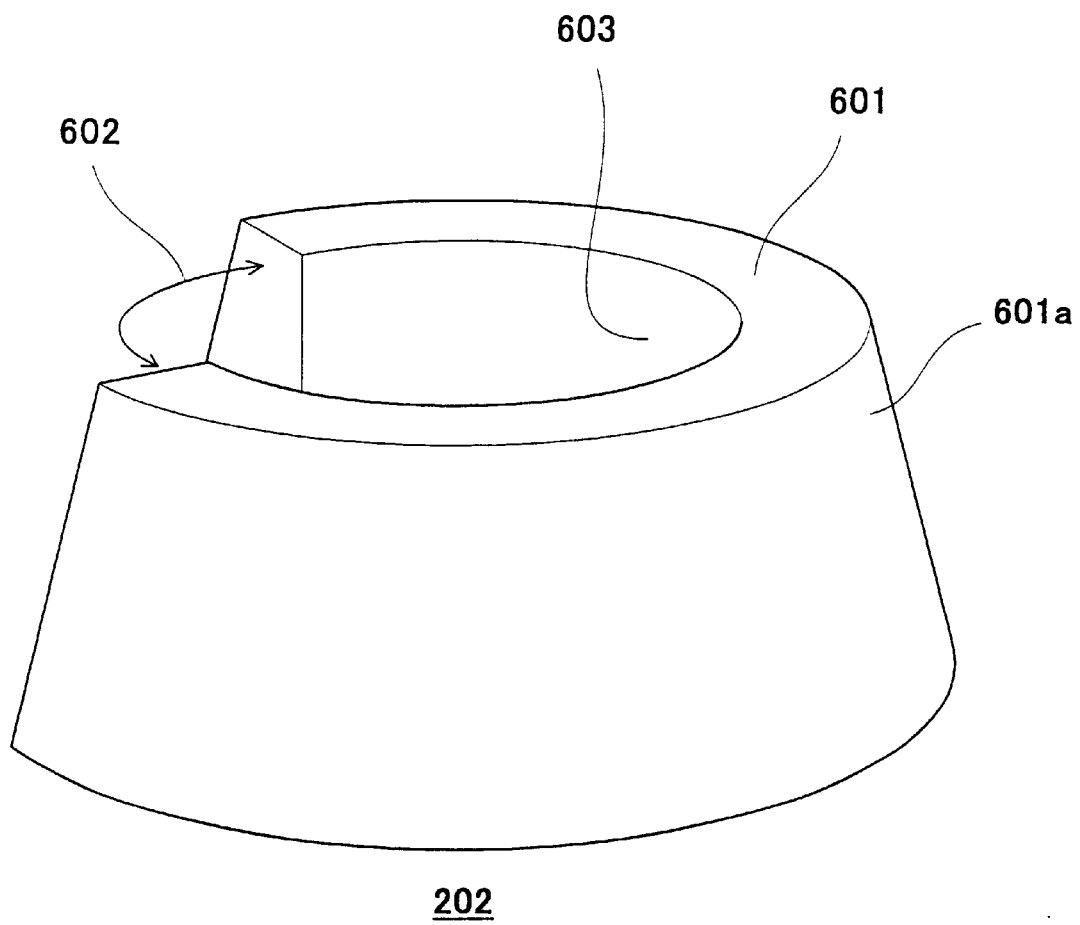
FIG. 56 is a perspective view of a lower substrate showing a structure in which an outer peripheral face of an incomplete surrounding body is inclined.

The effect of the present invention is further enhanced by inclining an outer peripheral face of the incomplete surrounding body 601. FIG. 56 shows an example of its configuration. In this example, the size (diameter) of an upper portion of the incomplete surrounding body 601 is as large as 20 μm and the size (diameter) of a lower portion thereof is made larger than the size of the upper portion by 1 to 20 μm to cause the outer peripheral face 601a to be inclined in the cell thickness direction. With such a configuration, the effect of leaving the twist orientation of 180 degrees is further enhanced.

When the incomplete surrounding body 601 is made of a material to orient the liquid crystal in parallel with the outer peripheral face of the incomplete surrounding body 601, 5 times or more effect of leaving the twist of 180 degrees is provided as compared to the case where the body 601 is made of a material to orient the liquid crystal vertically to the outer peripheral face of the incomplete surrounding body 601. As the material to orient the liquid crystal in parallel with the outer peripheral face of the incomplete surrounding body 601, a hydrophilic material may be used, for example.

Referring to FIGS. 50, 51, and 55, it is impossible to transition the orientation transition nucleus area from the twist orientation of 180 degrees to the bend orientation without applying the voltage to the area. Hence, the incomplete surrounding body 602 to leave the twist orientation of 180 degrees of FIG. 55 is formed in the display pixel 63, on the electrode 65, and on the source line 62 to which the voltage is to be applied. The formation of the incomplete surrounding body 601 on the pixel electrode 64 or the electrode 65 enables preferable bend transition. Normally, the insulating film is formed on the electrode but this may be removed as shown in FIG. 51. This removal allows the voltage applied to the electrode 65 to be applied to the liquid crystal layer 4 more efficiently.

Since the incomplete surrounding body 601 is also a steric structure, rubbing is not normally performed on its surrounding portion, causing the disorder of the bend orientation. This has been solved by forming the twist-oriented area 603 serving as the orientation transition nucleus, i.e., the incomplete surrounding body 601 on the electrode 65 or the source line 62 masked by the black matrix. In this embodiment, it is formed on the electrode 65.

When forming the incomplete surrounding body 601 in the display pixel 63, the area to which the voltage is to be applied is advantageously large, but it is necessary to mask a portion of disordered orientation of the liquid crystal 4 so as not to display the same. Since the incomplete surrounding body 601 itself transmits light when it is transparent, it is necessary to make the incomplete surrounding body 601 black.

Considering the above-described respects, the formation of the incomplete surrounding body 601 on the electrode 65 is advantageous in that the voltage can be applied and the incomplete surrounding body 601 is masked with the black matrix not to be displayed.

EXAMPLE 8

Figure 57:
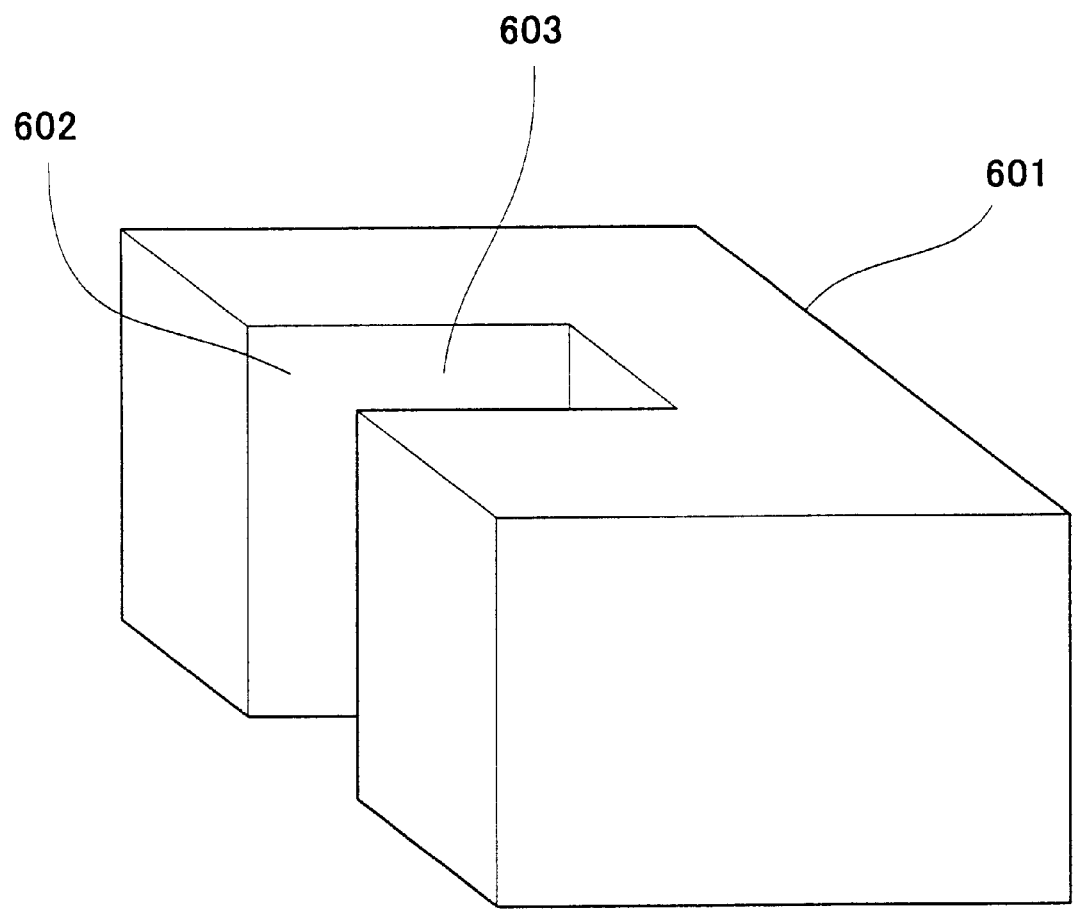
FIG. 57 is a perspective view showing a structure of a lower substrate of a liquid crystal display element according to an eighth example of the twentieth embodiment of the present invention.

FIG. 57 is a perspective view showing a structure of a lower substrate of a liquid crystal display element according to an eighth example of the present embodiment. Referring to FIG. 57, the incomplete surrounding body 601 constituted by a column-shaped body having a substantially U-shaped cross section is formed on the lower substrate 202. Rubbing is performed from an opening 602 of the U-shape to an inside of the U shape. This configuration is advantageous in that the bend orientation is less disordered because the transient orientation preserving area 603 is subject to rubbing. However, the substantially U-shaped incomplete surrounding body 601 is disadvantageous in that the effect of leaving the twist orientation of 180 degrees is reduced because it has the lack portion 602 larger than that of the inlet-shaped incomplete surrounding body of the seventh embodiment.

EXAMPLE 9

Figure 58:
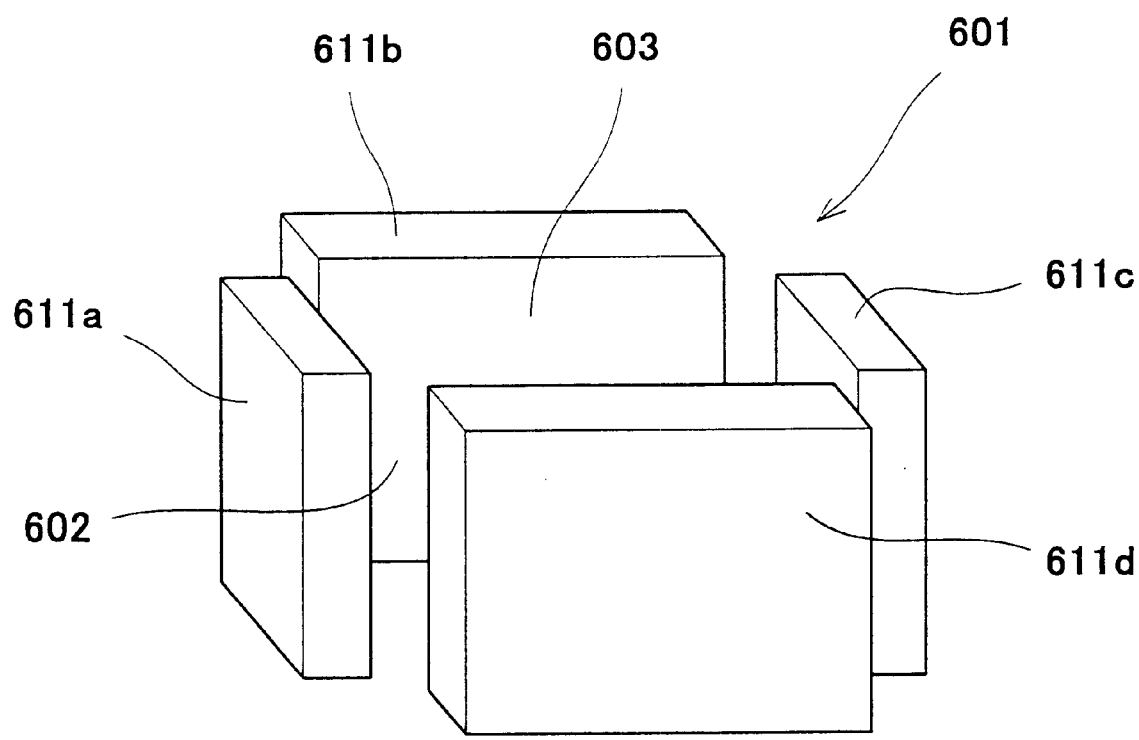
FIG. 58 is perspective view showing a structure of a lower substrate of a liquid crystal display element according to a ninth example of the twentieth embodiment of the present invention.

FIG. 58 is a perspective view showing a structure of a lower substrate of a liquid crystal display element according to a ninth example of the present embodiment. Referring to FIG. 58, the incomplete surrounding body 601 of this example is constituted by four rectangular plate shaped bodies 611a, 611b, 611c, 611d provided on the lower substrate 202 to have a clearance 602 between adjacent two bodies and to be situated on respective sides of an imaginary rectangle when seen in a plan view. In this case, an area 603 surrounded by the rectangular plate shaped bodies 611a, 611b, 611c, 611d corresponds to the transient orientation preserving area in which the twist orientation of 180 degrees remains. The clearance 602 corresponds to a lack portion of the incomplete surrounding body 601. Through the clearance 602, the bend transition proceeds. With such a configuration, the effect of leaving the twist orientation of 180 degrees and the effect of transition to bend orientation are increased. However, disadvantageously, a high resolution is demanded when forming the column spacer constituted by the incomplete surrounding body 601 by using photoresist.

EXAMPLE 10

Figure 59A:
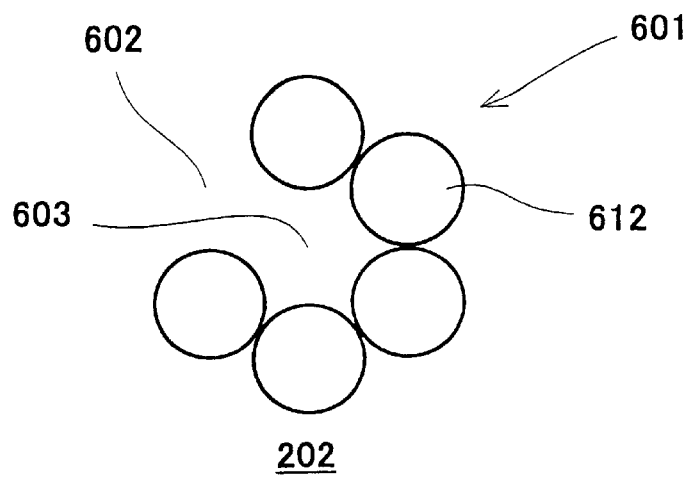
Figure 59B:
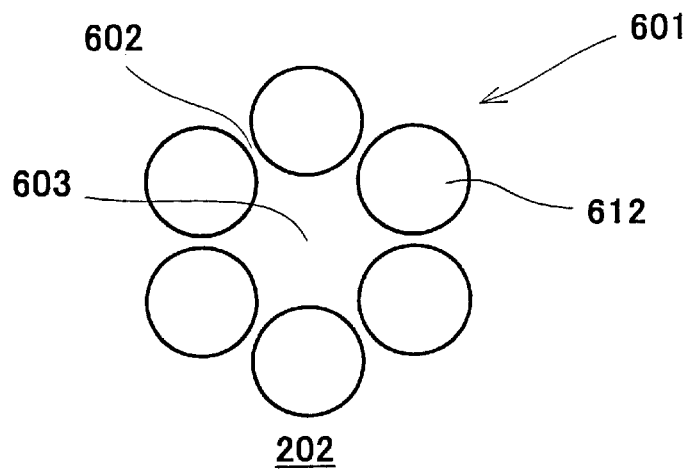
Figure 59C:
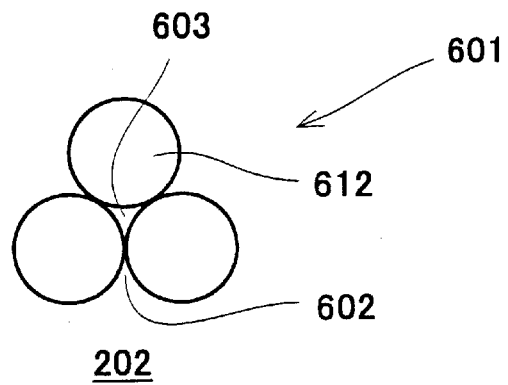

FIGS. 59(a)–59(c) are views showing a structure of a lower substrate of a liquid crystal display element according to a tenth example of the present embodiment, wherein FIG. 59(a) is a plan view showing a configuration in which bead spacers are gathered in an annular configuration partially opened, FIG. 59(b) is a plan view showing a configuration in which the bead spacers are gathered to be arranged in a substantially annular configuration as having a clearance between adjacent two spacers, and FIG. 59(c) is a plan view showing a configuration in which the bead spacers are gathered in a closed annular configuration.

First, the configuration in which the bead spacers are gathered in an annular configuration partially opened will be explained.

Referring to FIG. 59(a), in this example, the incomplete surrounding body 601 is constituted by a plurality of (in this example five) bead spacers 612 gathered in close proximity with one another to be U-shaped when seen in a plan view. The gathered plurality of bead spacers 612 constitute a spacer keeping the spacing between the substrates and are in contact with the upper and lower substrates. The area 603 surrounded by the plurality of bead spacers 612 forms the transient orientation preserving area of the incomplete surrounding body 601, in which the twist orientation of 180 degrees remains. The portion 602 where there are no bead spacers forms the lack portion of the incomplete surrounding portion 601, through which the bend orientation proceeds.

The bead spacers 612 can be gathered by making dispersion time longer.

With such a configuration, it is not easy to fabricate the liquid crystal display element because of difficulty of controlling the gathering of the bead spacers 612 but the effect of leaving the twist orientation of 180 degrees is significantly increased.

While five bead spacers 612 are gathered to have a U-shaped configuration in this example, bead spacers 612 of three or more is satisfactory.

As shown in FIG. 59(*b*), the bead spacers 612 may be gathered to be arranged in a substantially annular configuration as having the clearance between two adjacent spacers.

Alternatively, as shown in FIG. 59(*c*), the bead spacers 612 may be gathered to have a closed annular configuration. In FIG. 59(*c*), the incomplete surrounding body 601 is formed by gathering three bead spacers 612 in close proximity with one another. In this case, the clearance 603 formed in a central portion of the three bead spacers 612 forms the transient orientation preserving area of the incomplete surrounding body 601 and a valley 602 formed between the adjacent beads 612 forms the lack portion of the incomplete surrounding body 601.

The examples of FIGS. 59(*b*) and 59(*c*) provide the same effects of the example of FIG. 59(*a*).

EXAMPLE 11

Figure 60A:
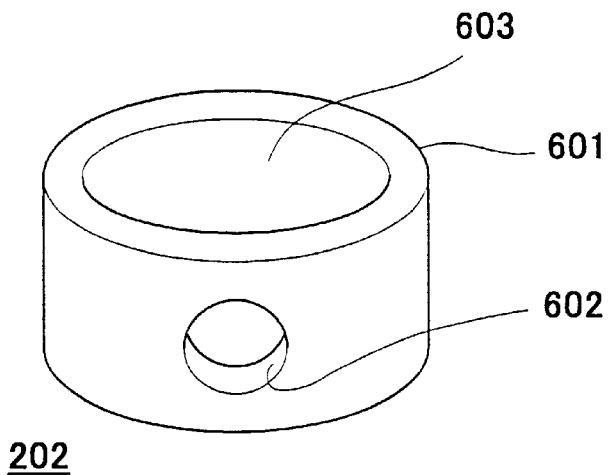
FIGS. 60(a)–60(c) are views showing a structure of a lower substrate of a liquid crystal display element according to an eleventh example of the twentieth embodiment of the present invention.
Figure 60B:
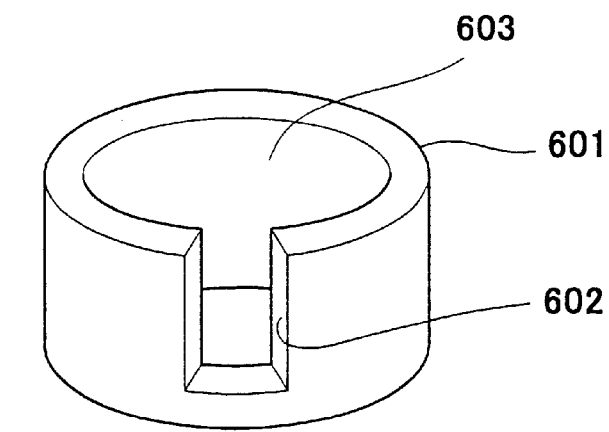
Figure 60C:
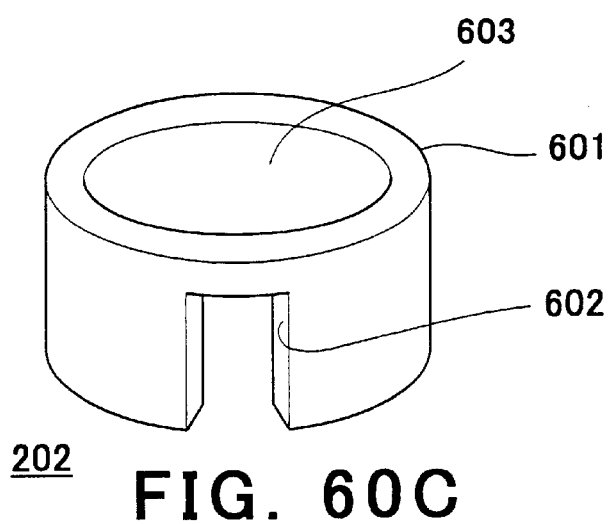

FIGS. 60(*a*)–60(*c*) are views showing a structure of a lower substrate of a liquid crystal display element according to an eleventh example of the present embodiment, wherein FIG. 59(*a*) is a perspective view showing a configuration in which an incomplete surrounding body having a through hole as a lack portion is provided, FIG. 59(*b*) is a perspective view showing a configuration in which an incomplete surrounding body having a notch portion opened upward as a lack portion is provided, and FIG. 60(*c*) is a perspective view showing a configuration in which an incomplete surrounding body having a notch portion opened downward as a lack portion is provided.

In FIG. 60(*a*), the incomplete surrounding body 601 is formed by a cylindrical body having a through hole 602 in a peripheral wall thereof. In this case, an inner space 603 of the cylindrical body 601 forms the transient orientation preserving area of the incomplete surrounding body 601 and the through hole 602 forms the lack portion of the incomplete surrounding body 601.

In FIG. 60(*b*), the incomplete surrounding body 601 is formed by the cylindrical body having the notch portion 602 opened upward in the peripheral wall thereof. In this case, the notch portion 602 forms the lack portion of the incomplete surrounding body 601.

In FIG. 60(*c*), the incomplete surrounding body 601 is formed by the cylindrical body having the notch portion 602 opened downward in the peripheral wall thereof. In this case, the notch portion 602 forms the lack portion of the incomplete surrounding body 601.

The configurations of FIGS. 60(*a*), 60(*b*), and 60(*c*) provide the effect of leaving the twist orientation of 180 degrees and thereby facilitate the bend transition. Among these examples, the configuration of FIG. 60(*a*) is the most effective and desirable. The incomplete surrounding bodies 601 in these examples make a process somewhat complicated and can be formed by the photolithograpic method.

Embodiment 21

The twentieth embodiment utilizes the fact that the third orientation state, i.e., the twist orientation of 180 degrees corresponding to the transient orientation state from the bend orientation to the spray orientation is partially left in the liquid crystal and the energy barrier is less during transition from the twist to the bend orientation. The present invention is not limited to this. For instance, the orientation state partially left may be the bend orientation as the second orientation state.

As shown in FIG. 54(*b*), in the bend orientation, the liquid crystal molecules in the central portion in the cell thickness direction are oriented vertically. The orientation of the orientation transition nucleus is transformed into the bend orientation to allow the bend transition to occur at a high speed.

In a twenty-first embodiment, to partially preserve the bend orientation, the spacer keeping the spacing between the substrates is made of a specific material and the liquid crystal panel is cooled while applying the voltage.

Initially, the liquid crystal panel is heated to have isotropic phases and then gradually cooled while applying a relatively high voltage, i.e., a voltage sufficient to transition the liquid crystal layer to bend orientation. The column spacer or the spacer constituted by bead spacers is made of a material to arrange the liquid crystal molecules in parallel with a side surface of the spacer. As the material, a hydrophilic material may be used.

Then, the voltage is turned OFF. In this state, the bend orientation or the orientation state of vertical arrangement remains in the vicinity of a side surface of the spacer. Then, a predetermined voltage is applied to the liquid crystal panel. So, the remaining bend orientation or orientation of vertical arrangement becomes the orientation transition nucleus, causing the bend orientation to spread over the entire liquid crystal panel.

Consequently, according to this embodiment, the bend transition takes place at a higher speed.

Embodiment 22

The present invention is not limited to the formation of the area easily transformed into the bend orientation, namely, the partial third orientation state or second orientation state, around the steric structure. A twenty-second embodiment of the present invention utilizes a polymer network as a structure for preserving the bend orientation or the twist orientation in the liquid crystal layer.

In this embodiment, in a fabrication process, when sandwiching a liquid crystal between substrates, the liquid crystal display element is fabricated by addition of a liquid crystal monomer into the liquid crystal. Then, a transition voltage is applied to a liquid crystal layer of so fabricated liquid crystal display element, causing the liquid crystal layer to transition to the bend orientation. In this state, a liquid crystal panel is irradiated with an ultraviolet ray. Thereby, the liquid crystal monomer in the liquid crystal is polymerized to form a macro molecular net structure in the liquid crystal.

In the liquid crystal panel in which the net structure is thus formed in the liquid crystal, a portion fixed in the twist orientation state is partially present in the liquid crystal, after the applied transition voltage is turned OFF, and the twist orientation remains without the applied voltage.

When the transition voltage is applied again to the liquid crystal panel, the bend orientation is generated from the portion of the remaining twist orientation and spreads over the entire liquid crystal panel. In this example, the liquid crystal monomer is added at a concentration of 3%.

In another example, by addition of the liquid crystal monomer at a concentration of 10%, the liquid crystal display element is fabricated likewise. With the applied transition voltage turned OFF, the portion fixed in the bend orientation state is present in the liquid crystal layer, and the bend orientation remains without an applied voltage. Thereafter, the transition voltage is applied again, the bend orientation spreads from the portion of the bend orientation to the entire liquid crystal panel, and consequently, an image is evenly displayed.

The invention according to the twentieth to twenty-second embodiments are not limited to the OCB liquid crystal display element The invention has solved a common problem associated with a liquid crystal display element using the liquid crystal that are in the first orientation state under the no-voltage condition and in the second orientation state under the display voltage condition and transitioning the liquid crystal to the second orientation state by application of the voltage sufficient to pass over the energy barrier existing between the first and second orientation states during display. Accordingly, the invention is applicable to a mode in which the liquid crystal generally transitions.

Embodiment 23

In a twenty-third embodiment of the present invention, a different orientation direction area is formed by a lateral electric field. In particular, an absolute value of a twist angle in the different orientation direction area is set to 45–135 degrees.

EXAMPLE 12

Figure 61:
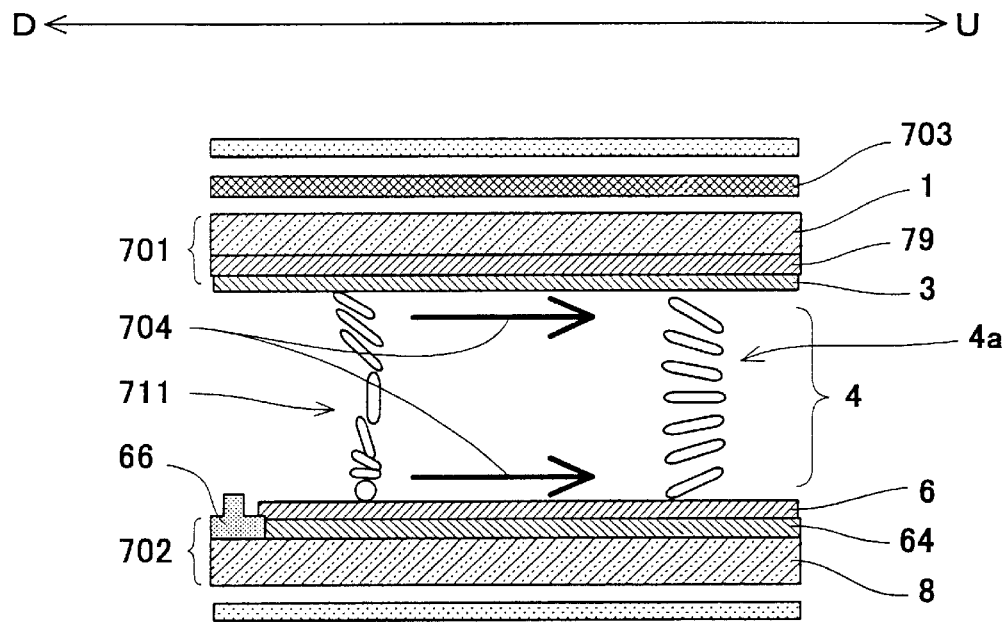
FIG. 61 is a cross-sectional view for each pixel schematically showing a structure of a liquid crystal display element according to a twelfth example of a twenty-third embodiment of the present invention.
Figure 62:
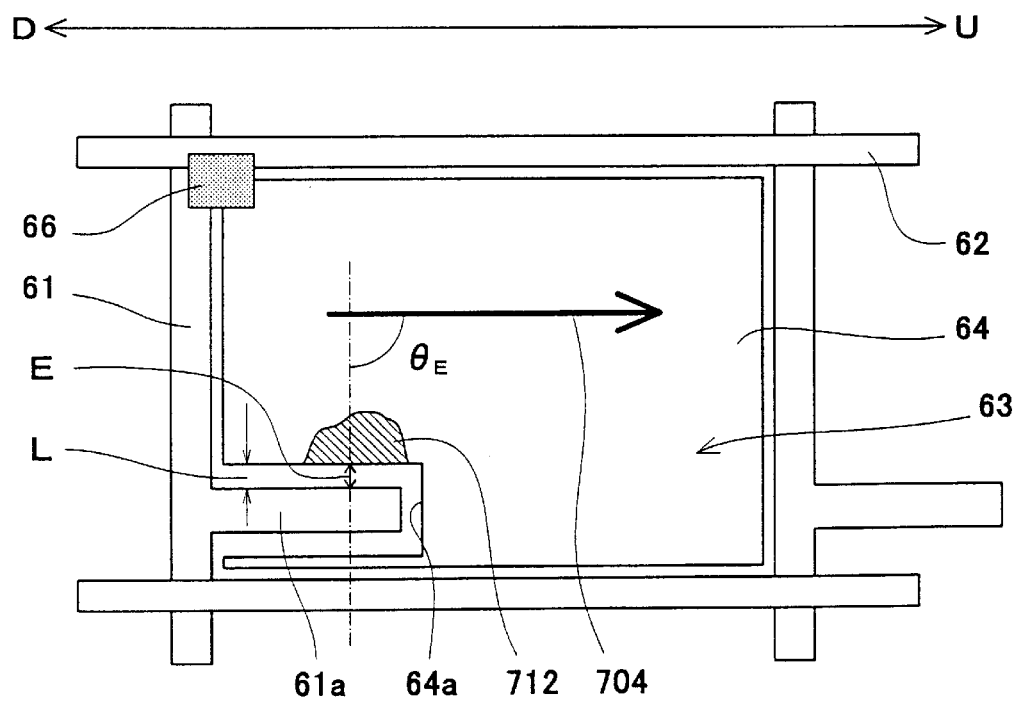
FIG. 62 is a plan view for each pixel schematically showing a structure of a liquid crystal display element according to a twelfth example of the twenty-third embodiment of the present invention.

FIG. 61 is a cross-sectional view for each pixel showing a structure of a liquid crystal display element according to a twelfth example of the present embodiment and FIG. 62 is a plan view showing the structure of FIG. 61. In FIGS. 61 and 62, reference numerals U and D denote a viewing direction from above and a viewing angle from bottom; respectively.

Referring to FIGS. 61 and 62, the liquid crystal display element of this example is an active matrix liquid crystal display element which is sandwiched between polarizers (not shown) and includes a retardation film 703 for optical compensation disposed on at least one side thereof. In the liquid crystal display element, a color filter substrate 701 and an array substrate (TFT substrate) 702 are disposed opposite to each other. The color filter substrate 701 is structured such that the counter electrode 79 is formed on an inner surface of the glass substrate 1 and the alignment layer 3 is formed on the counter electrode 79. A color filter and a black matrix (not shown) are formed on the color filter substrate 701. The array substrate 702 is structured such that the gate and source lines 61, 62, the pixel electrode 64, and a switching element 66 are formed on the inner surface of glass substrate 8, the gate and source lines 61, 62 being provided in matrix, the pixel electrode 64 being positioned in the pixel 63 defined by the gate and source lines 61, 62, and the switching element 66 comprising TFT and the like being connected to the gate and source lines 61 and 62, and the alignment layer 6 covers the inner surface of the glass substrate 8 having these constituents. The counter electrode 79 and the pixel electrode 64 are made of ITO and the alignment layers 3, 6 are made of polyimide-based resin.

The bead spacers (not shown) and the liquid crystal layer 4 are disposed between a pair of opposite alignment layers 3, 6. The bead spacers have a diameter of approximately 5 μm. The liquid crystal layer 4 is made of a positive dielectric constant anisotropic liquid crystal material.

The pair of opposite alignment layers 3, 6 have been subjected to alignment treatment to make pretilt angles of the liquid crystal molecules that have several degrees of opposite positive and negative signs on the surfaces thereof and are substantially parallel to one another. As shown in the Figure, the alignment treatment is performed in the direction 704 from the viewing direction D toward the viewing direction U by rubbing. Thereby, the liquid crystal layer 4 forms a spray orientation state 4a in which the liquid crystal molecules spread obliquely in the cell thickness direction. The liquid crystal layer 4 is transitioned over all the pixels of the display element from the spray orientation state 4a in the pixel 63 to the bend orientation (see FIG. 54) in which the liquid crystal molecules are bent between the substrates 701, 702, thereby enabling display. The liquid crystal display element so alignment-treated in these viewing directions to be transitioned from the spray orientation 4a to the perfect bend orientation provides an extremely wide viewing characteristic in right and left viewing directions and becomes an easy-to-see display element.

In the array substrate 702, a rectangular gate-side lateral electric field electrode portion 61a is formed on an edge portion of the gate line 61 such that it protrudes in the pixel 63 and a rectangularly recessed pixel-side lateral electric field electrode portion 64a is formed on an edge portion of the pixel electrode 64 that is opposite to the gate line 61 to receive the electrode portion 61a. The gate line 61 is made of a metal material such as Al and the electrode portion 61a is made of the metal material of the gate line 61 or ITO.

As shown in FIG. 62, the alignment treatment direction 704 is set in parallel with the source line 62. The electrode portion 61a is formed as a rectangle having a length of 50 μm and a width of 10 μm and extends in parallel with the source line 62. A gap L between the electrode portions 61a and 64a is approximately 4 μm. An electric field (referred to as a lateral field in this embodiment) E parallel to the substrates, generated in this gap L is directed to have an intersection angle $\theta_E$ of substantially 90 degrees with respect to the alignment treatment direction 704.

Subsequently, an operation of so configured liquid crystal display element will be explained. In the normal liquid crystal display operation of the liquid crystal display element, a shot-term pulsed voltage is applied to the gate line 61 at several tens volts so that the gate line 61 is sequentially scanned to be turned ON/OFF. A video alternating signal voltage is applied to the pixel electrode 64. On the other hand, in the transition operation, a direct current voltage of at least several tens volts or a long-term pulsed voltage is applied to the gate line 61, and hence the electrode portion 61a, and the voltage of the pixel electrode 64 is set to substantially 0 volt. Thereby, a strong electric field E of the direct current or the long-term pulse is generated in the gap L. The strong lateral electric field E causes the liquid crystal molecules constituting a lower potion of the spray orientation of the portion of the liquid crystal layer 4 that is situated on the gap L to be laterally twisted toward the lateral electric field E, thereby making the intersection angle $\theta_E$ of substantially 90 degrees with respect to the alignment treatment direction 704, as indicated by reference numeral 711 of FIG. 61. That is to say, the portion of the liquid crystal layer 4 situated on the gap L becomes the different orientation direction area having the twist angle of substantially 90 degrees. A high voltage of approximately several to 15 volts is applied across the counter electrode 79 and the pixel electrode 64. Thereby, a longitudinal electric field is applied to the liquid crystal molecules of the liquid crystal layer 4, causing the liquid crystal molecules of the spray orientation 4a to rise. In the liquid crystal layer 4 situated on the gap L, spray-oriented liquid crystal molecules rise while being twisted as indicated by reference numeral 711. For this reason, a transition nucleus 712 tends to be generated from the portion of the liquid crystal layer 4 situated on the electrode portions 61a and 64a. The transition nucleus 712 is actually generated and developed into the bend orientation, which expands rapidly by the strong longitudinal electric field to introduce the entire pixel 63 to the bend orientation. Consequently, the transition is completed in a short time within one second. According to this method, the transition of the entire liquid crystal display element is completed within a substantially one second at a low temperature ambient of 0° C. or less.

In contrast, in case of the conventional liquid crystal display element, when the spray-oriented liquid crystal molecules are raised without being twisted, it is necessary to apply a voltage much higher than the voltage used in the method of this example, that is, a voltage of 15 to 25V, across the counter electrode 79 and the pixel electrode 64. Since the transition nucleus is not always generated, the conventional element requires transition time of several seconds to several minutes longer than the time of this example, leading to low-speed transition. As evident from this fact, the invention of this example provides an excellent effect as compared to the conventional element.

While a pair of the gate-side lateral field electrode portion 61a and the pixel-side lateral electric field 64a are provided, a more preferable result is obtained by providing plural pairs.

EXAMPLE 13

Figure 63:
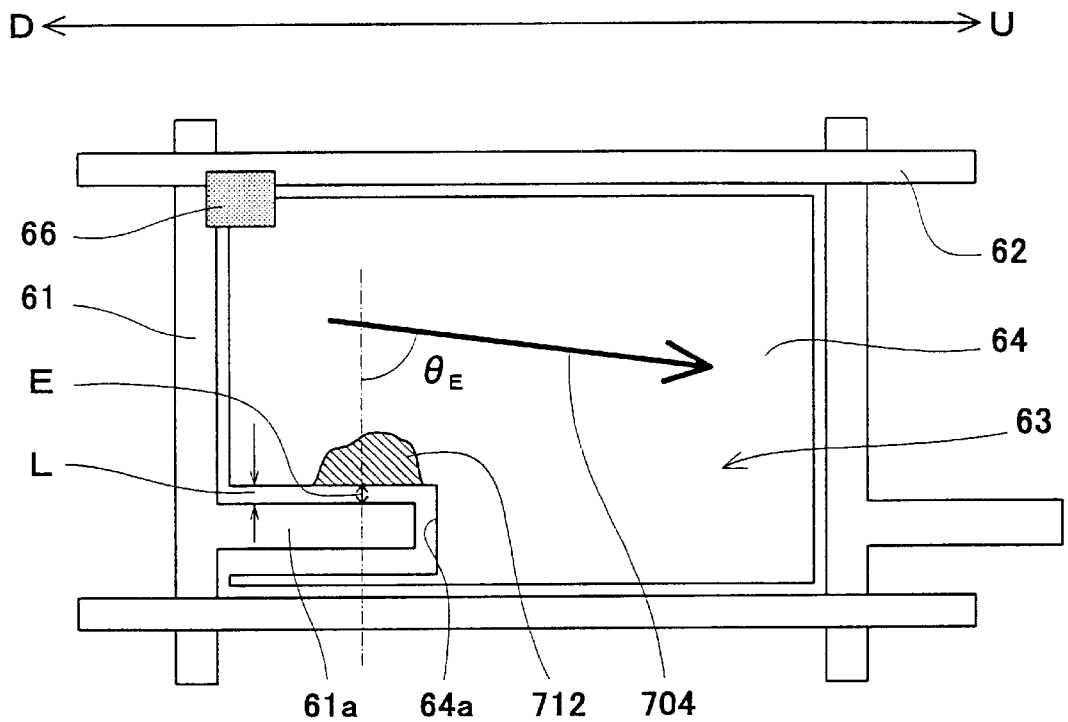
FIG. 63 is a plan view for each pixel schematically showing a structure of a liquid crystal display element according to a thirteenth example of the twenty-third embodiment of the present invention.

FIG. 63 is a plan view for each pixel showing a structure of a liquid crystal display element according to a thirteenth example of the present embodiment.

In this example, the alignment treatment direction 704 is slightly inclined with respect to the source line 62 when seen in a plan view, thereby making the intersection angle $\theta_E$ with respect to the alignment treatment direction 704 of the electric field E that slightly smaller than 90 degrees. The other respects are identical to those of the twelfth example. With such a configuration, the transition nucleus 712 can be generated when the intersection angle $\theta_E$ is 45 degrees$\leq \theta_E \leq$135 degrees, and a more preferable result is obtained when the intersection angle $\theta_E$ is 80 degrees$\leq \theta_E \leq$100 degrees.

The intersection angle $\theta_E$ may be varied by inclining the direction in which the lateral electric field electrode portions 61a and 64a extend with respect to the source line 62.

EXAMPLE 14

Figure 64:
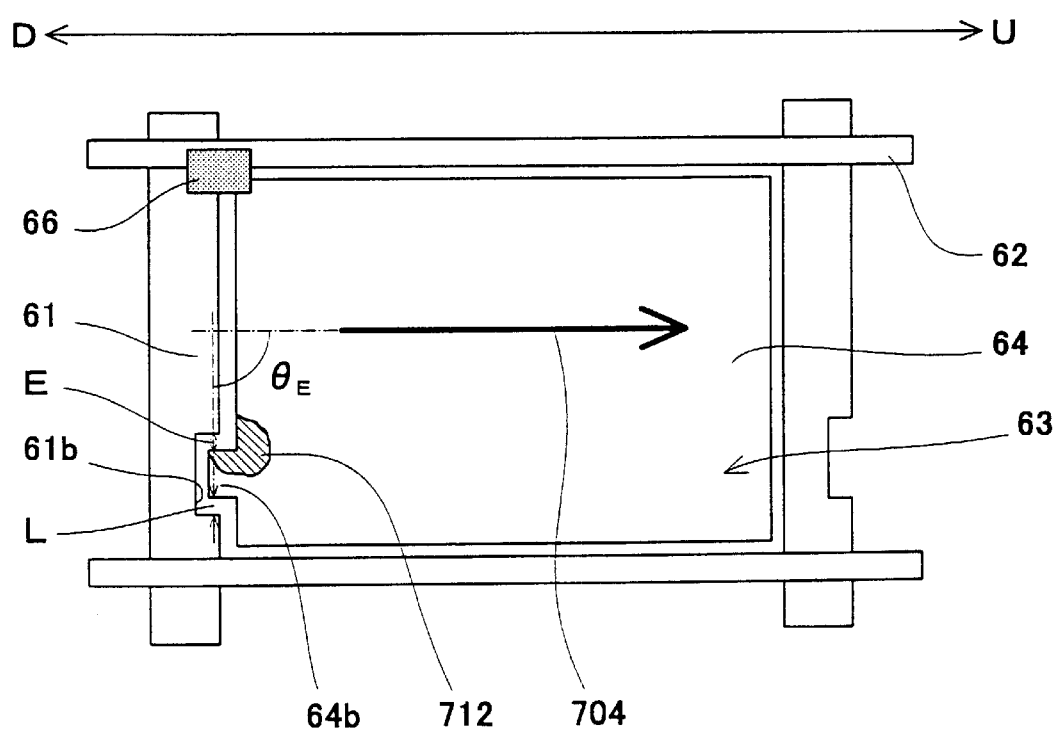
FIG. 64 is a plan view for each pixel schematically showing a structure of a liquid crystal display element according to a fourteenth example of the twenty-third embodiment of the present invention.

FIG. 64 is a plan view for each pixel showing a structure of a liquid crystal display element according to a fourteenth example of the present embodiment.

The fourteenth example is identical to the twelfth example except that a rectangularly recessed gate-side lateral electric field electrode portion 61b is formed on an edge portion of the gate line 61 and a rectangular pixel-side lateral electric field electrode portion 64b is formed on an edge portion of the pixel electrode 64 that is opposite to the gate line 61 such that it protrudes in the electrode portion 61b. With such a configuration, the same effects as provided in the twelfth example is obtained.

While the intersection angle $\theta_E$ is 90 degrees in this example, the intersection angle $\theta_E$ of degrees$\leq \theta_E \leq$135 degrees is satisfactory. More preferably, the intersection angle $\theta_E$ is 80 degrees$\leq \theta_E \leq$100 degrees. Most preferably, the intersection angle $\theta_E$=90 degrees.

While the gap L between the gate-side lateral electric field electrode portion 61b and the pixel-side lateral electric field electrode portion 64b is 4 $\mu$m in this example, the range of 3 $\mu$m$\leq$L$\leq$15 $\mu$m is practical in view of the process and applied voltage.

EXAMPLE 15

A fifteenth example of the present embodiment will be described with reference to FIGS. 61 and 62. The voltage of the gate-side lateral electric field electrode portion 61a during the transition operation is made higher than the voltage of the twelfth example to make the lateral electric field E stronger to thereby twist liquid crystal molecules situated in a central portion of the liquid crystal layer 4 in a cell thickness direction as well as the liquid crystal molecules situated in the lower portion of the liquid crystal layer 4 toward a lateral direction with respect to the alignment treatment direction 704, and a high voltage is then applied across the counter electrode 79 and the pixel electrode 64 to cause the liquid crystal molecules to rise naturally by a longitudinal electric field, thereby transitioning the liquid crystal layer 4 to bend orientation. With such a configuration, the transition nucleus 712 is reliably generated in the pixel 63, causing the transition to the bend orientation to smoothly proceed, whereby transition is completed in a short time.

While the shapes of the lateral electric field electrode portions on the gate and pixel sides are rectangle, they may be a square, a semicircle, a triangle, etc.

Embodiment 24

In a twenty-fourth embodiment of the present invention, rubbing is performed on a substrate by using a steric obstacle under a specific condition to thereby form two twist orientations in clockwise and counter-clockwise directions as being contact with each other. This embodiment is aimed at more intensively studying the fourteenth embodiment in which the steric obstacle is water-repellent and the eighteenth embodiment in which the clockwise and counter-clockwise twist orientations are formed in shade portions of rubbing due to the steric obstacle as being contact with each other.

First, a principle of the invention according to this embodiment will be explained. In inventors' experiment, a relatively high voltage is applied to a simple cell of the conventional configuration to thereby transition it from the spray to the bend orientation. The transition from the spray to the bend orientation requires much time, for example, several seconds to several tens seconds. After application of the transition voltage, the spray orientation remains.

The inventors further studied to reduce the transition time and obtain the reliability of transition. In fabrication of the liquid crystal cell having the conventional configuration, on e substrate is processed so that the liquid crystal is locally oriented in a direction different from the rubbing direction. When the cell is thus fabricated, a portion in which the liquid crystal is oriented in the direction different from the rubbing direction has twist orientation. To this cell, the above voltage is applied and the transition is observed. It is found that the transition always occurs from the twist-oriented portion. The transition voltage is about 7V when the twist angle is about 75 degrees, it is about 5V when the twist angle is about 90 degrees, and it is about 3V when the twist angle is 120 degrees. When the twist angle of the twist orientation is larger, the transition voltage is lower, and reliability of transition is higher.

Subsequently, a cell provided with a plurality of twist-oriented areas having different twist angles is fabricated. The above voltage is applied to the cell and the transition is observed in detail. The following phenomenon is found.

The portion from which the transition always occurs is in the vicinity of a disclination line of a boundary between the twist orientations twisted in opposite directions. The transition occurs at a lower voltage and with higher reliability as compared with the conventional liquid crystal display element. For instance, when the twist orientation of 60 degrees and the twist orientation of 75 degrees twisted in the opposite directions are contact with each other, the transition voltage is about 3V.

The principle of the bend transition has been described in the eighth embodiment and will not be discussed herein. In brief, in the conventional configuration, the transition voltage is approximately 10–30V and an untransitoned portion remains, while it is possible to obtain a liquid crystal display element capable of transition at an extremely low voltage and with highest reliability by introducing the principle of the bend transition. What is important is that the twist orientations twisted in opposite directions are locally formed in the parallel-oriented area as being contact with each other.

However, it is impossible to locally form the twist orientations twisted in opposite directions in the parallel-oriented area only by application of the conventional alignment treatment to fabrication of the liquid crystal display element. Accordingly, the inventors have implemented this by providing a minute steric obstacle on the substrate and devising the rubbing.

EXAMPLE 16

Figure 65:
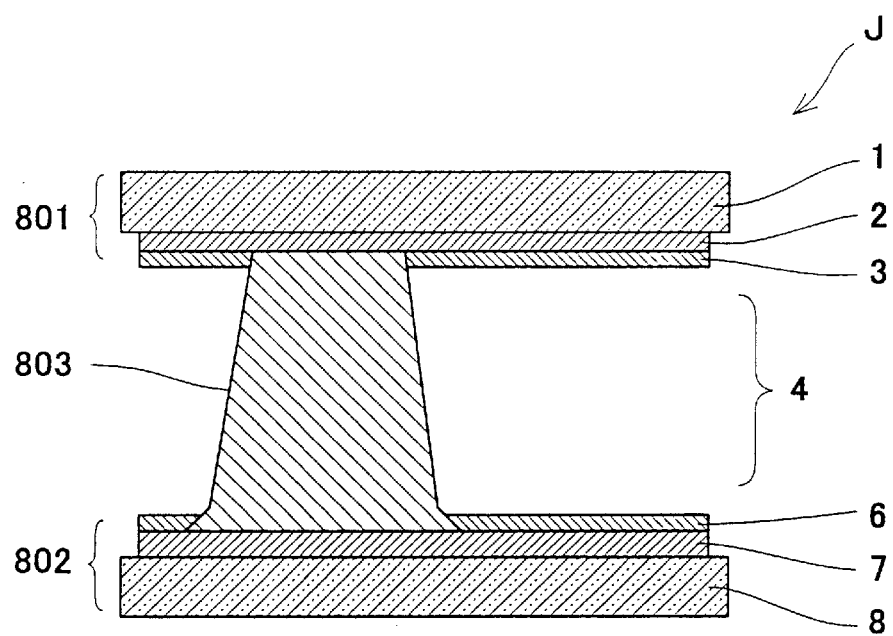
FIG. 65 is a cross-sectional view showing a basic structure of a liquid crystal display element according to a sixteenth example of a twenty-fourth embodiment of the present invention.

FIG. 65 is a cross-sectional view showing a basic structure of a liquid crystal display element according to a sixteenth example of the twenty-fourth embodiment of the present invention. Referring to FIG. 65, a liquid crystal display element J of this example is structured such that an upper substrate 801 and a lower substrate 802 are disposed opposite to each other and the liquid crystal layer 4 is disposed between the upper and lower substrates 801, 802. The upper substrate 801 is structured such that the transparent electrode 2 and the alignment layer 3 are laminated on the inner surface of the glass substrate 1 in this order. The lower substrate 802 is structured such that the transparent electrode 7 and the alignment layer 6 are laminated on the inner surface of the glass substrate 8 in this order and a steric obstacle 803 is provided on the transparent electrode 7. The steric obstacle 803 has a tip end portion abutting against the upper substrate 801 and has no alignment layer formed on a surface thereof. The steric obstacle 803 has a rhombic cross section and is of a column shape having an inclined side surface increased from the end portion thereof to a base portion thereof in this example. The steric obstacle 803 is constituted by photoresist in this example. The steric obstacle 803 is water-repellent to repel an orientation agent in the fabrication process, and therefore it has no alignment layer on the surface thereof.

Subsequently, a rubbing treatment in the fabrication process of the liquid crystal display element J will be described in detail.

Figure 66:
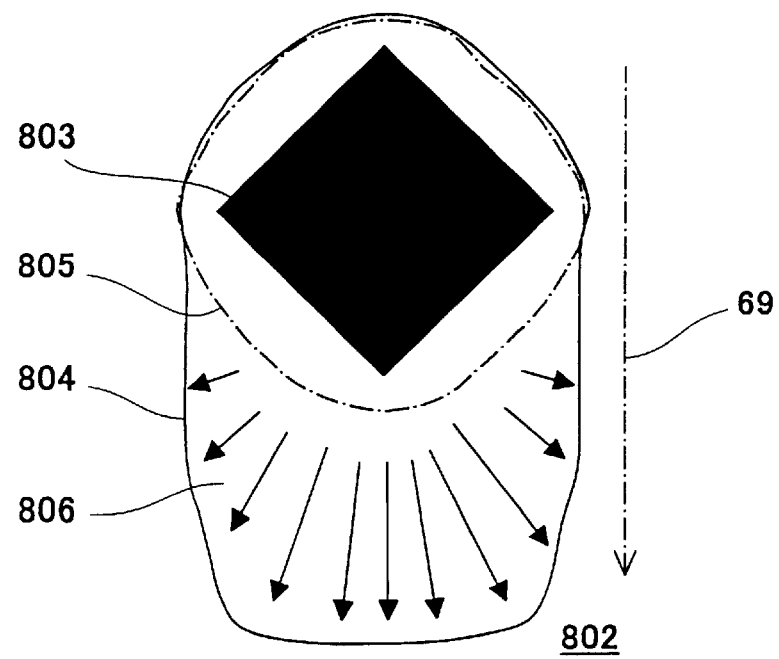
FIG. 66 is a plan view schematically showing alignment treatment of a lower substrate of the liquid crystal display element of FIG. 65.

FIG. 66 is a plan view showing an alignment treatment of the lower substrate of the liquid crystal display element of FIG. 65.

Referring to FIGS. 65, 66, the steric obstacle 803 is formed on the lower substrate 802 such that a diagonal line of the rhombic cross section thereof is substantially parallel to the rubbing direction 69. Rubbing is performed on the lower substrate 802 as indicated by the reference numeral 69. Then, the following knowledge is obtained. In a portion around the steric obstacle 803 on the lower substrate 802, a downward-rubbing portion of rubbing (referred to as a rubbing shade portion, see the eighteenth embodiment) 804 due to the steric obstacle 803 is formed. In the rubbing shade portion 804, a no-rubbing area 805 is formed in a portion closer to the steric obstacle 803 and a different direction rubbing area 806 rubbing-processed in a direction different from the normal rubbing direction 69 is formed in a portion slightly distant from the steric obstacle 803.

In this embodiment, since the rubbing cloth (not shown) passes over the steric obstacle 803, an area of the substrate 802 with which the rubbing cloth does not make contact, corresponding to the no-rubbing area 805, is generated. Also, since the rubbing cloth is repelled, an area rubbing-treated in the direction different from the normal rubbing direction 69, corresponding to the different direction rubbing area 806, is generated.

Rubbing is performed on the upper substrate 801 in the normal rubbing direction 69.

As shown in FIG. 66, in the liquid crystal display element J so alignment-treated, the liquid crystal layer 4 is oriented to have an angle with respect to the rubbing direction 69 according to its alignment treatment in the different direction rubbing area 806 and is oriented according to water-repellency or hydrophilicity of the steric obstacle 803 in the no-rubbing area 805. The liquid crystal layer 4 is parallel-oriented in areas of the liquid crystal display element J other than these areas. That is, twist orientations twisted in opposite directions with respect to the rubbing direction 69 are formed in the different direction rubbing area 806 as being contact with each other and are locally present in the parallel-oriented area. As compared to the simple cell of the conventional configuration, portions transitioning to the bend orientation are greatly increased, and consequently, the transition takes place at a lower transition voltage and with higher reliability. Further, the portion in which the twist orientations twisted in opposite directions with respect to the rubbing direction 69 are contact with each other can be efficiently formed by rubbing.

Figure 67:
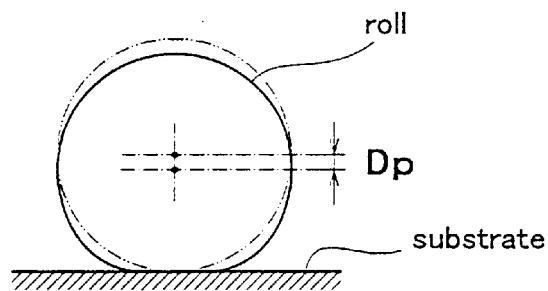
FIG. 67 is a view for explaining a pushing depth of a rubbing cloth.

The length of the rubbing shade portion 804 in the rubbing direction 69 varies according to the pushing depth Dp of the cloth (see FIG. 67). For instance, when the pushing depth Dp=0.3 mm, the length of the area 804 is approximately 15–30 μm and when Dp=0.7 mm, the length is approximately 10–20 μm. That is, the length of the rubbing shade portion 804 can be controlled by varying the pushing depth Dp.

While the side surface of the steric obstacle 803 is inclined inward from the base portion thereof toward the tip end portion thereof. Such inclination of the side surface allows the steric obstacle 803 to exhibit water-repellency. The water-repellency of the steric obstacle 803 is stronger as an inclination angle of the side surface thereof is increased. The steric obstacle 803 first exhibits water-repellency when the side surface thereof has an inclination angle of about 30 degrees and continues to exhibit water-repellency until it has an inclination angle of about 90 degrees. The steric obstacle 803 may be structured such that a base portion thereof is smaller than a tip end portion. Thereby, water-repellency is obtained. The effect of water-repellency of the steric obstacle 803 will be described in greater detail in a nineteenth example.

While the liquid crystal display element J has the basic structure as described above, this example is applicable to the liquid crystal display element of the active matrix type and the other type because this example is applicable to a liquid crystal display structured to apply the voltage to the steric obstacle and its surrounding area.

EXAMPLE 17

Figure 68:
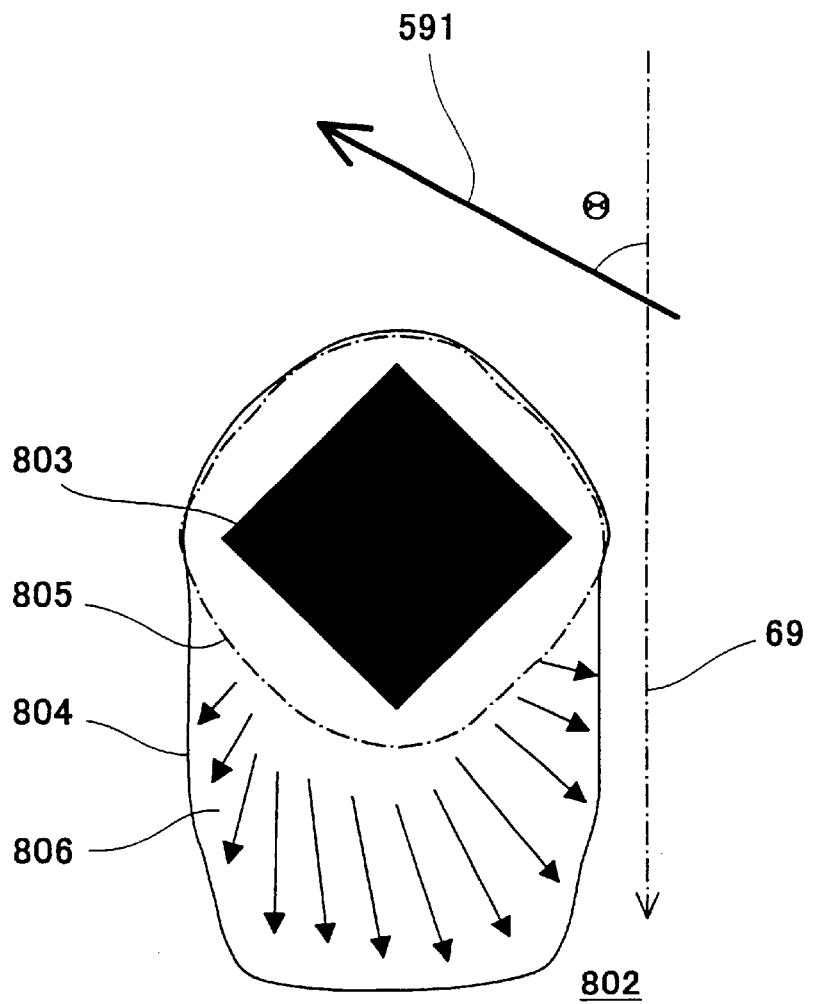
FIG. 68 is a plan view schematically showing alignment treatment of a lower substrate of a liquid crystal display element according to a seventeenth example of the twenty-fourth embodiment of the present invention.

FIG. 68 is a plan view showing an alignment treatment of a lower substrate of a liquid crystal display element according to a seventeenth example of the twenty-fourth embodiment.

While the angle made between the rubbing direction 69 and the movement direction 591 of the substrate 802 with respect to the rubbing roller, i.e., the bias angle Θ is set to substantially zero degree in the sixteenth example, the bias angle Θ is changed and the alignment treatment in the rubbing shade portion 804 due to the steric obstacle 803 is carefully observed in this example, as shown in FIG. 68. The result is that the different direction rubbing area 806 can be alignment-treated in an asymmetric manner seen from the rubbing direction 69 when the bias angle Θ is greater than an angle, as shown in the Figure. Specifically, when the bias angle Θ is increased from zero degree, asymmetry becomes noticeable when the bias angle Θ is about 15 degrees and becomes great when the bias angle Θ is about 30–45 degrees. When the asymmetry of the alignment treatment in the different direction rubbing area 806 is thus greater, a plurality of steric obstacles are provided such that the respective rubbing shade portions 804 overlap with one another, thereby stably forming the two twist orientations twisted in opposite directions as will be described in detail in the twentieth example.

EXAMPLE 18

Figure 69:
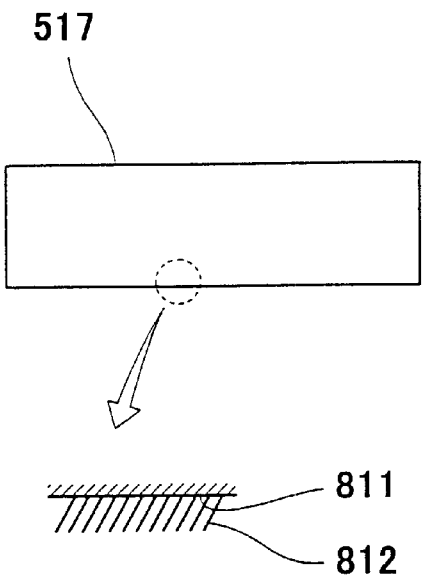
FIG. 69 is a view showing a configuration of a rubbing roller used for fabricating a liquid crystal display element according to an eighteenth example of the twenty-fourth embodiment of the present invention.

FIG. 69 is a view showing a structure of a rubbing roller used for fabricating a liquid crystal display element according to an eighteenth example of the twenty-fourth embodiment.

Referring to FIG. 69, the rubbing roller 517 has a texture surface 811 in which buff hairs (fibers) 812 of the rubbing cloth are transplanted such that they are inclined in a rotary axis direction of the roller. Since such buff hairs 812 are contact with the substrate with an angle relative to the same, asymmetry of the alignment treatment of the shade potions becomes great.

Thus, according to this example, the asymmetry of the alignment treatment of the shade portion due to the steric obstacle can be made greater.

By using the roller having the texture surface 811 in which the buff hairs 812 are transplanted as being inclined with respect to the rotary axis direction thereof and rubbing is performed with the bias angle with respect to a run-over direction of the substrate, the asymmetry of the alignment treatment in the different direction rubbing area can be made significantly great.

EXAMPLE 19

Figure 70:
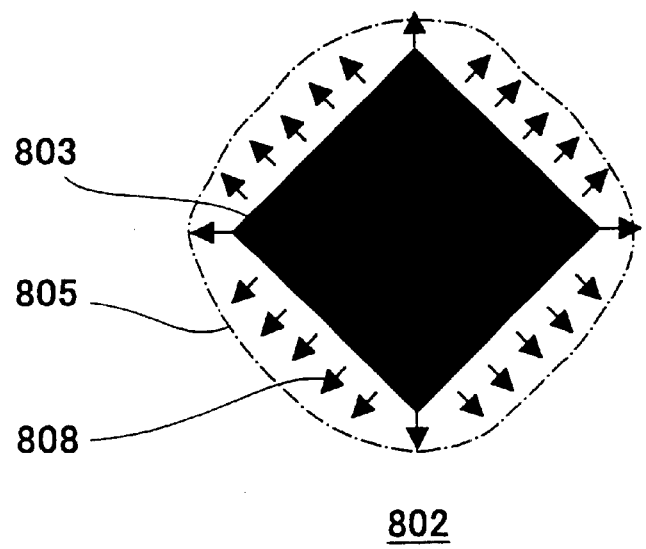
FIG. 70 is a plan view schematically showing orientation of a liquid crystal in a no-rubbing area of a lower substrate of a liquid crystal display element according to a nineteenth example of the twenty-fourth embodiment of the present invention.

FIG. 70 is a plan view showing orientation of a liquid crystal in a no-rubbing area of a lower substrate of a liquid crystal display element according to a nineteenth example of the twenty-fourth embodiment.

Referring to FIG. 70, the nineteenth example is identical to the sixteenth example except that the steric obstacle 803 formed on the lower substrate 802 is made of a water-repellent material.

With such a configuration, the liquid crystal molecules can be oriented in a direction 88 different from the rubbing direction 69 (see FIG. 66) in the no-rubbing area 805 around the steric obstacle 803. This is because the liquid crystal molecules is oriented vertically to the side surface of the steric obstacle 803 by the water-repellency of the steric obstacle 803.

The water-repellency resulting from inclination of the side surface of the steric obstacle 803 described in the sixteenth example provides the same effect of water-repellency of this example. In this example, the side surface of the steric obstacle 803 is inclined like the sixteenth example. It is revealed that very strong water-repellency is obtained by thus forming the side surface of the steric obstacle 803 made of the water-repellent material as being inclined inward from the base portion thereof toward the tip end portion thereof.

As described above, the water-repellency of the steric obstacle 803 and formation of the no-rubbing area 805 around it allow the liquid crystal molecules to be oriented vertically to the side surface of the steric obstacle 803 in the no-rubbing area 805, thereby forming a radial orientation seen in a plan view. Therefore, it is possible to form the two twist orientations twisted in opposite directions and contact with each other efficiently in the parallel-oriented area.

EXAMPLE 20

Figure 71:
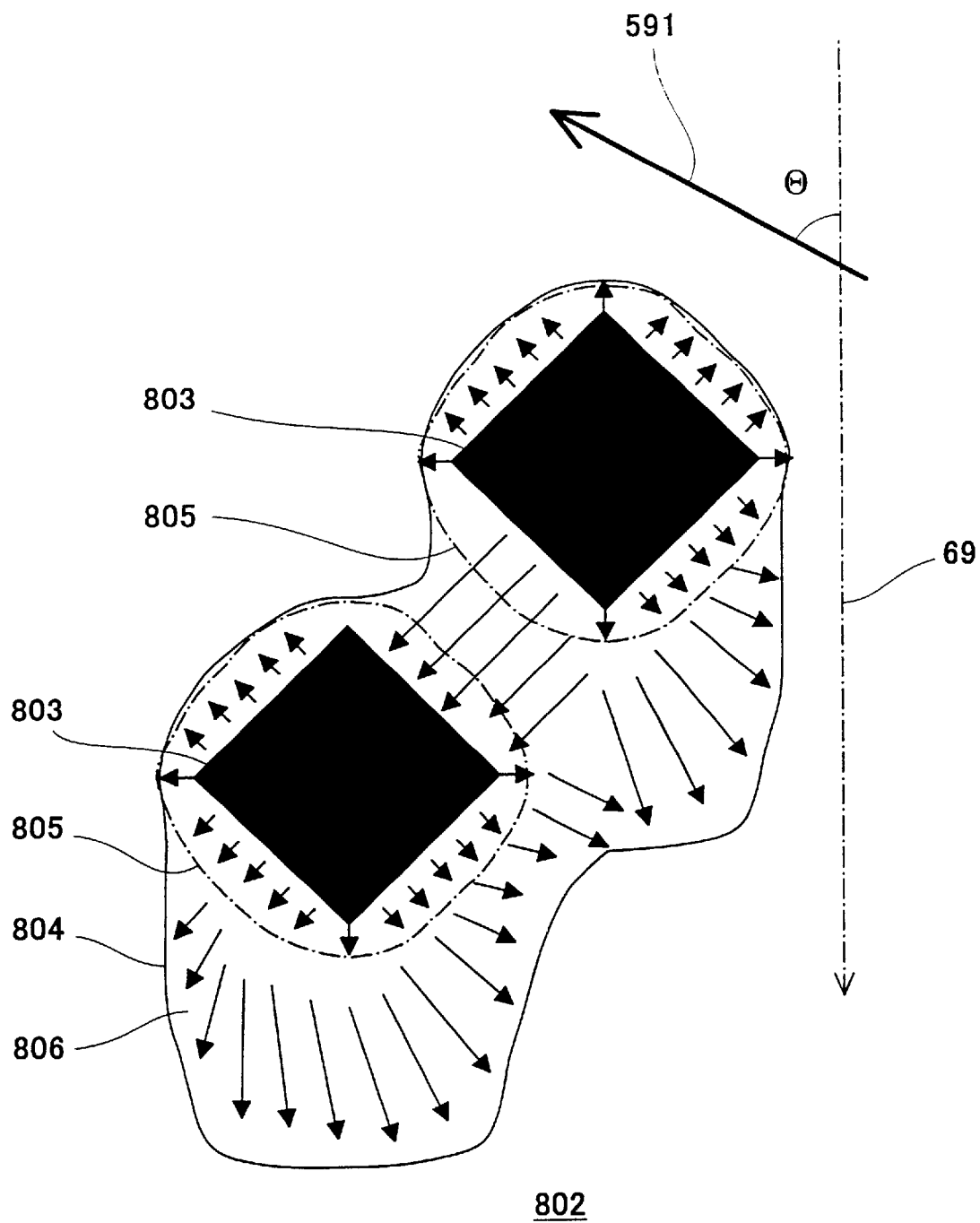
FIG. 71 is a plan view schematically showing an orientation state of a liquid crystal of a liquid crystal display element according to a twentieth example of the twenty-fourth embodiment of the present invention.

FIG. 71 is a plan view showing an orientation state of a liquid crystal of a liquid crystal display element according to a twentieth example of the twenty-fourth embodiment.

Referring to FIG. 71, unlike the sixteenth example, in this example, a plurality of (two in the Figure) steric obstacles 803 are provided on the lower substrate 802 such that the rubbing shade portions 804 overlap with one another, rubbing is performed on the lower substrate 802 with the bias angle Θ with respect to the run-over direction 591, and the respective steric obstacles 803 are made of the water-repellent material.

With such a configuration, since the different direction rubbing areas 806 of the plurality of steric obstacles 803 overlap with one another and the rubbing with the bias angle Θ provides asymmetry to the orientation of the different direction rubbing area 806, it is possible to form the twist orientations twisted in opposite directions with further stability as compared with the case where one steric obstacle 803 is provided independently. When the distance between steric obstacles 803 is 10–30 μm, the effect of stably forming the twist orientations twisted in opposite directions is greatly enhanced. Further, in this example, the effect is further enhanced because of the water-repellency of the respective steric obstacles 803. When the transition voltage is applied to the liquid crystal display element, the portions from which transition occurs are significantly increased and the entire liquid crystal panel transitions at an extremely low voltage and in a significantly reduced time as compared to the conventional simple cell.

EXAMPLE 21

The steric obstacles of the sixteenth to twentieth examples have rhombic cross sections. In this example, the obstacles may have cross sections of another shapes (not shown), including a circle, a square, etc. When the steric obstacles have cross sections of these shapes, the effect of forming the twist orientations twisted in opposite directions is reduced but formation of the steric obstacles is easier as compared with a case using the steric obstacles having rhombic cross sections.

EXAMPLE 22

The steric obstacles of the sixteenth and nineteenth examples are water-repellent. In this example, they are hydrophilic (not shown). The other respects are identical to those of the sixteenth example. With such a configuration, since the orientation direction of the liquid crystal in the no-rubbing area around the steric obstacle only changes, it is possible to form the twist orientations twisted in opposite directions efficiently like the sixteenth example. Moreover, this example is advantageous in that the orientation of the parallel-oriented area formed around the steric obstacles is less disordered because the alignment layer is formed on the surface of the steric obstacle due to less tendency of the hydrophilic material to repel the orientation agent.

EXAMPLE 23

In a twenty-third example of the twenty-fourth embodiment, the steric obstacle is constituted by the column spacer keeping the spacing between the substrates. When the steric obstacle is constituted by the column spacer, it is possible to easily fabricate the liquid crystal display element without the necessity of providing the steric obstacle. There are many types of materials of the column spacer, including a highly water-repellent material, a hydrophilic material, etc, and it is therefore relatively easy to control the orientation of the liquid crystal around the steric obstacle.

EXAMPLE 24

A twenty-fourth example of the twenty-fourth embodiment uses the liquid crystal display element of the active matrix type and utilizes steps of the array structure of the array substrate. In a process for forming the array of the array substrate, steps of 2 µm at maximum can be formed. The rubbing is controlled by utilizing the steps to enable the formation of the different direction rubbing area (see sixteenth example) serving as the transition nucleus. In this example, the probability that the transition nucleus is generated is reduced but the steric obstacle can be easily formed because it is formed by the mere change of the array process generally used for fabricating the array substrate.

EXAMPLE 25

In the sixteenth and nineteenth examples 16 and 19, the surface of the steric obstacle has vertical orientation as water-repellency and in the twenty-second example, the surface of the steric object has horizontal direction as hydrophilicity.

In the twenty-fifth example, the alignment layer is tapered around the column spacer to control the orientation direction.

Figure 72A:
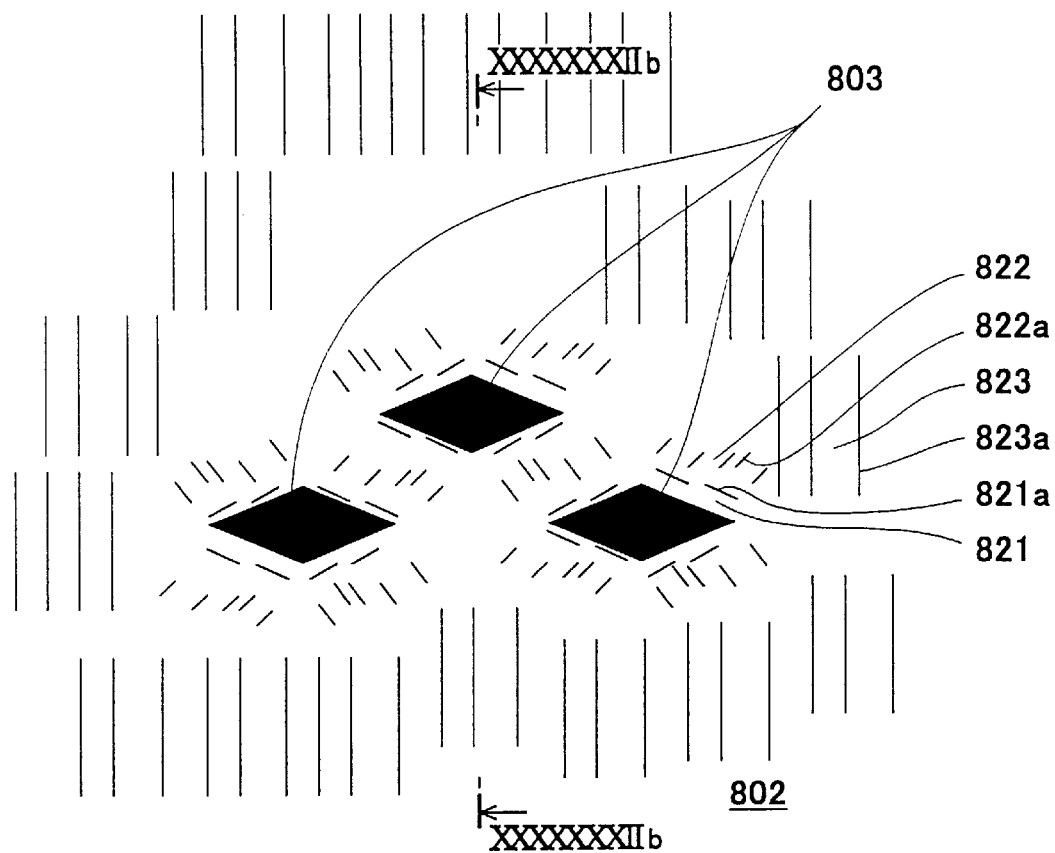
Figure 72B:
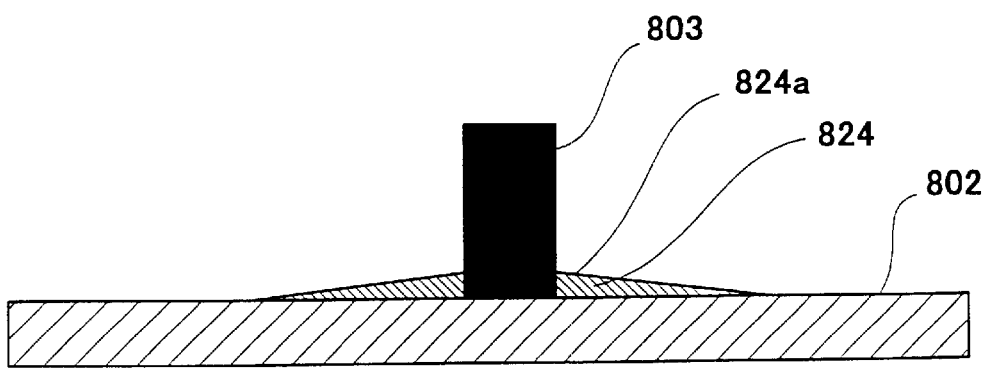

FIGS. 72(a) and 72(b) are conceptual views schematically showing orientation of a liquid crystal of a lower substrate of a liquid crystal display element according to a twenty-fifth example of the present embodiment, wherein FIG. 72(a) is a plan view and FIG. 72(b) is a cross-sectional view in the direction of arrow XXXXXXXIIb—XXXXXXXIIb of FIG. 72(a).

Referring to FIGS. 72(a) and 72(b), three column spacers 803 constituting the complex column spacer are formed on the lower substrate 802. The lower substrate 802 has an alignment layer 824 formed on the surface thereof but the respective column spacers 803 have no alignment layer formed on the surface thereof. The alignment layer 824 is tapered around the column spacer 803 as indicated by 824a such that it has a thickness reduced as it is away from the column spacer. The lower substrate 802 has been rubbing-treated as shown in FIG. 22 of the second embodiment.

As a result, as shown in FIG. 72(a), liquid crystal molecules 821a in an area 821 around the column spacer 803 has orientation parallel with respect to a side surface of the column spacer 803. In an area 822 outside of the area 821, liquid crystal molecules 822a are oriented in a direction of taper and in an area 823 outside of the area 822, liquid crystal molecules 823a are oriented according to the rubbing direction.

In this example, the alignment layer 824 is thus tapered as indicated by 824a to enable the orientation in which the liquid crystal molecules extend radially from the column spacer 803 as described in the nineteenth example. Thereby, the transition nucleus is formed during transition of the liquid crystal from the spray to the bend orientation.

The tapered structure is not limited to formation using the alignment layer. For instance, the taper may be formed by coating using resin or by photoresist. The simple and easy way to form the taper is to form it by using the alignment layer.

A satisfactory inclination angle of the tapered structure is 0.2 degree or larger and is in a considerably wide range.

While the inclined structure around the column spacer 803 is linearly inclined, it may be curved.

EXAMPLE 26

In a twenty-sixth example, the different orientation direction area is a vertically oriented area.

Since the bend orientation has a configuration in which a liquid crystal rises in the central portion of the panel in the cell thickness direction, transition preferably occurs by forming a state in which the liquid crystal molecules rise or a state with higher pretilt on one of the substrates.

In this example, the column spacer is used as the steric obstacle for shading rubbing and the substrate having the column spacer is subjected to rubbing to thereby form a rubbing shaded area having vertical orientation.

A film with strong vertical orientation as the alignment layer is applied to the substrate having the column spacer and cured. The substrate is subjected to rubbing. So, the rubbing shade area which is not subjected to rubbing is generated in a portion rearward of the column spacer. This phenomenon is substantially identical to the phenomenon shown in FIG. 36(b). The different between this example and the example of FIG. 36(b) is that the rubbing shade portion has vertical orientation (orientation vertical to the substrate surface). In transition of the liquid crystal from the spray to the bend orientation, the transition occurs from the vertically oriented area as the nucleus.

The vertically oriented area need not have vertical, orientation in a strict sense. The vertically oriented area partially having pretilt of 20 degrees or larger is satisfactory. Preferably, the pretilt is 40 degrees or larger. With the pretilt of 40 degrees or larger, the vertically oriented area keeps the bend orientation after disconnection of power supply.

The vertically oriented area may be formed on one or both of the substrates.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A liquid crystal display element comprising: a pair of opposed substrates and liquid crystal interposed between the substrates, wherein source lines, gate lines, switching elements, and pixel electrodes are formed on one of the substrates, and the switching elements are each connected to the gate line, the source line, and the pixel electrode, a counter electrode is formed on the other substrate, the liquid crystal has an initial orientation state in a power off state and a display orientation state in a display state and requires initialization for changing the initial orientation state to the display orientation state before an image is displayed, the pixel electrode has a zigzag-shaped edge portion, and in the initialization, a different orientation area of an orientation direction locally different from an orientation direction of the other area is formed by applying voltages of different polarities to adjacent source lines, respectively.

2. The liquid crystal display element according to claim 1, wherein the source line has a zigzag-shaped edge portion engaged with the zigzag-shaped edge portion of the pixel electrode.

3. The liquid crystal display element according to claim 2, wherein a transverse electric field is formed between the edge portion of the source line and the edge portion of the pixel electrode.

4. A liquid crystal display element comprising: a pair of opposed substrates and liquid crystal interposed between the substrates, wherein source lines, gate lines, switching elements, and pixel electrodes are formed on one of the substrates, and the switching elements are each connected to the gate line, the source line, and the pixel electrode, a counter electrode is formed on the other substrate, the liquid crystal has an initial orientation state in a power off state and a display orientation state in a display state and requires initialization for changing the initial orientation state to the display orientation state before an image is displayed, the pixel electrode and the gate line respectively have zigzag-shaped edge portions engaged with each other, and in the initialization, a different orientation area of an orientation direction locally different from an orientation direction of the other area is formed by generating a transverse electric field between the edge portion of the pixel electrode and the edge portion of the gate line.

* * * * *